United States Patent
Noma et al.

(10) Patent No.: US 7,295,959 B2
(45) Date of Patent: Nov. 13, 2007

(54) PROGRAM, METHOD, APPARATUS, AND SYSTEM FOR SUPPORTING PLANNING OF VEHICLE

(75) Inventors: Kohji Noma, Hiroshima-ken (JP); Teruhisa Yamamoto, Hiroshima-ken (JP); Toshinori Sakamoto, Hiroshima-ken (JP); Mitsuru Fujinaka, Hiroshima-ken (JP); Akira Fushimi, Hiroshima-ken (JP); Takashi Mizuma, Hiroshima (JP); Jun Takemura, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 765 days.

(21) Appl. No.: 10/608,080

(22) Filed: Jun. 30, 2003

(65) Prior Publication Data

US 2004/0010398 A1    Jan. 15, 2004

(30) Foreign Application Priority Data

Jul. 10, 2002    (JP)    ............... 2002-201706

(51) Int. Cl.
G06G 7/48    (2006.01)
(52) U.S. Cl. .................................... 703/8
(58) Field of Classification Search .................... 703/8
See application file for complete search history.

(56) References Cited

U.S. PATENT DOCUMENTS 5,761,063 A    6/1998 Jannette et al.
6,036,345 A *    3/2000 Jannette et al. ................ 700/97
6,096,086 A *    8/2000 Weber et al. ................... 703/8
6,113,643 A    9/2000 Weber et al.
6,760,693 B1 *    7/2004 Singh et al. .................... 703/8

FOREIGN PATENT DOCUMENTS

| EP | 0 401 900 A1 | 12/1990 |
|---|---|---|
| GB | 2 369 467 A | 5/2002 |
| JP | 6-52265 | 2/1994 |
| JP | 8-273003 | 10/1996 |
| JP | 10-240791 | 9/1998 |
| JP | 10-289262 | 10/1998 |
| JP | 11-34089 | 5/1999 |
| JP | 11-134089 | 5/1999 |

OTHER PUBLICATIONS

Koichi Matsuda, "Application of human body dimension in ergonomic study in developing a vehicle", Measurement and Control, The Society of Instrument and Control Engineers, Feb. 10, 1997, vol. 36, No. 2, p. 112-113.

(Continued)

Primary Examiner—Hugh Jones

(57) ABSTRACT

This invention has as its object to efficiently and effectively plan a vehicle. To accomplish this, this invention has an exterior model building program (63) for building an exterior model having information associated with the exterior of a vehicle, a reference model building program (64) for building a reference model having information associated with reference components of the vehicle, and information associated with the sitting positions and postures of passengers, and a display program (65) for superimposing the built exterior model and reference model on the basis of a predetermined rule.

6 Claims, 35 Drawing Sheets

OTHER PUBLICATIONS

Masaru Yoshida, "The Virtual human begins to fight on a virtual factory", Nikkei Digital Engineering, Nikkei Business Publications. Inc., Sep. 15, 2000, vol. 34, p. 126-131.

Masaru Yoshida, "Assessing operationality with designing on a CAD", Nikkei Digital Engineering, Nikkei Business Publications. Inc., Feb. 15, 2001, vol. 39, p. 35.

"Automotive Engineering Handbook", First Edition, The Society of Automotive Engineers of Japan, 1991, p. 20.

Antonino Gomes De Sa et al., "Virtual reality as a tool for verification of assembly and maintenance process", Computers & Graphics, vol. 23, No. 3, Jun. 1, 1999, pp. 389-403.

* cited by examiner

FIG. 20

PROGRAM, METHOD, APPARATUS, AND SYSTEM FOR SUPPORTING PLANNING OF VEHICLE

FIELD OF THE INVENTION

The present invention relates to a program, method, apparatus, and system for supporting planning of a vehicle.

BACKGROUND OF THE INVENTION

Conventionally, upon planning of a vehicle, two-dimensional (2D) drawings that represent an outline of that vehicle are prepared, and the feasibility of the plan is determined based on the drawings. When there are changes in the plan, drawings are prepared from the beginning.

Therefore, in the conventional planning process, much labor is spent for preparing the drawings, thus requiring much time and cost. Furthermore, it is difficult to grasp an image of the vehicle on the 2D drawings.

Conventionally, in the drawing preparation process, an acceptable exterior shape which should have a large degree of freedom tends to be adopted while being restricted by factors with a small degree of freedom such as an interior for passengers and the like, and it is harder to produce a vehicle with a daring design.

SUMMARY OF THE INVENTION

In order to solve the above problem, the present invention has as its object to efficiently and effectively plan a vehicle. One aspect of the present invention provides a planning support program for implementing an exterior model building step of building an exterior model that expresses an outer appearance of the vehicle by reading out an exterior parameter group associated with an exterior shape of a vehicle, and changing exterior parameters included in the readout exterior parameter group, an interior model building step of building an interior model that expresses interior comfort of passengers by inputting passenger parameters associated with sitting states of the passengers in the vehicle, and a display step of superimposing the exterior model built in the exterior model building step, and the interior model built in the interior model building step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 20 exemplifies exterior models defined by vehicle types and the number of pillars;

DETAILED DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Note that an exterior model, interior model, and structure model in this specification are sets of coordinate data which respectively represent the outer appearance, the states of seats and passengers, and the framework structure of a vehicle. Also, specification values indicate dimensions which determine the vehicle shape, and include, e.g., the total height, total width, total length, and the like, but do not include passenger parameters which determine an interior. Furthermore, a vehicle type indicates the types of vehicles such as sports, sedan, truck, and the like, and a vehicle model indicates the brand (brand name) of a manufactured vehicle.

(Overall System Arrangement)

The overall arrangement of a planning support system of this embodiment will be described first.

Figure 1:
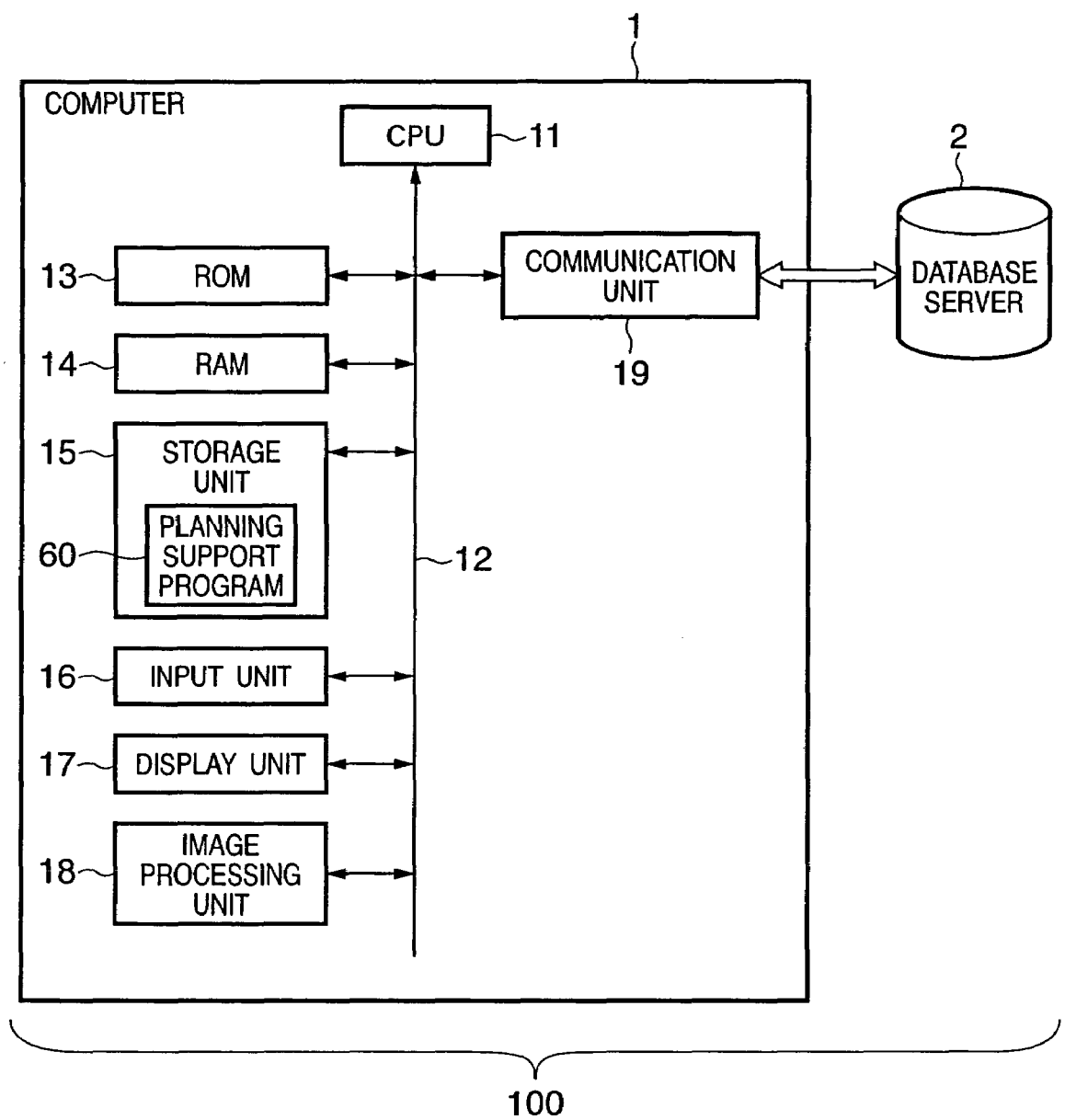
FIG. 1 is a block diagram showing an example of the arrangement of a computer system to which an apparatus, method, and program for supporting planning of a new model vehicle according to an embodiment of the present invention can be applied.

FIG. 1 shows an example of the arrangement of a planning support system according to this embodiment.

A planning support system 100 shown in FIG. 1 includes a computer 1 as a planning support apparatus, and a database server 2, which are connected via a network. The computer 1 comprises a CPU 11, ROM (Read Only Memory) 13, RAM (Random Access Memory) 14, external storage unit 15, input unit 16, display unit 17, image processing unit 18, and communication unit 19, which are connected via a system bus 12.

The CPU 11 executes arithmetic processes as a general computer, and information processes that support planning of a vehicle.

The ROM 13 stores at least a boot program for starting up the computer system. The RAM 14 has a program area which temporarily stores a program that runs on the computer system, and a data area used to read/write data. The external storage unit 15 stores a planning support program 60 that supports planning and verification of a new model vehicle. As the external storage unit 15, devices such as a hard disk drive, flexible disk drive, magnetooptical disk drive, CD-ROM drive, CD-R drive, CD-RW drive, DVD (DVD-ROM, DVD-R) drive, and the like may be used. In this case, when a storage medium such as a CD-ROM or the like which is detachable from each drive stores the planning support program, and the computer 1 reads out the program stored in the storage medium and executes various processes to be described below, such storage medium itself is included in the scope of the present invention.

The input unit 16 comprises devices such as a keyboard, mouse, and the like used to externally input commands, data, and the like. The display unit 17 comprises a device such as a liquid crystal display, CRT, or the like, which outputs text and image data that have undergone the arithmetic processes in the image processing unit 18 on the basis of control commands from the CPU 11. The image processing unit 18 executes arithmetic processes of image data to be output from the display unit 17. The communication unit 19 communicates with another computer system and the database server 2 via a wireless or wired communication line (e.g., the Internet, portable telephone network) to exchange programs, data, and the like with a remote place.

Figure 2:
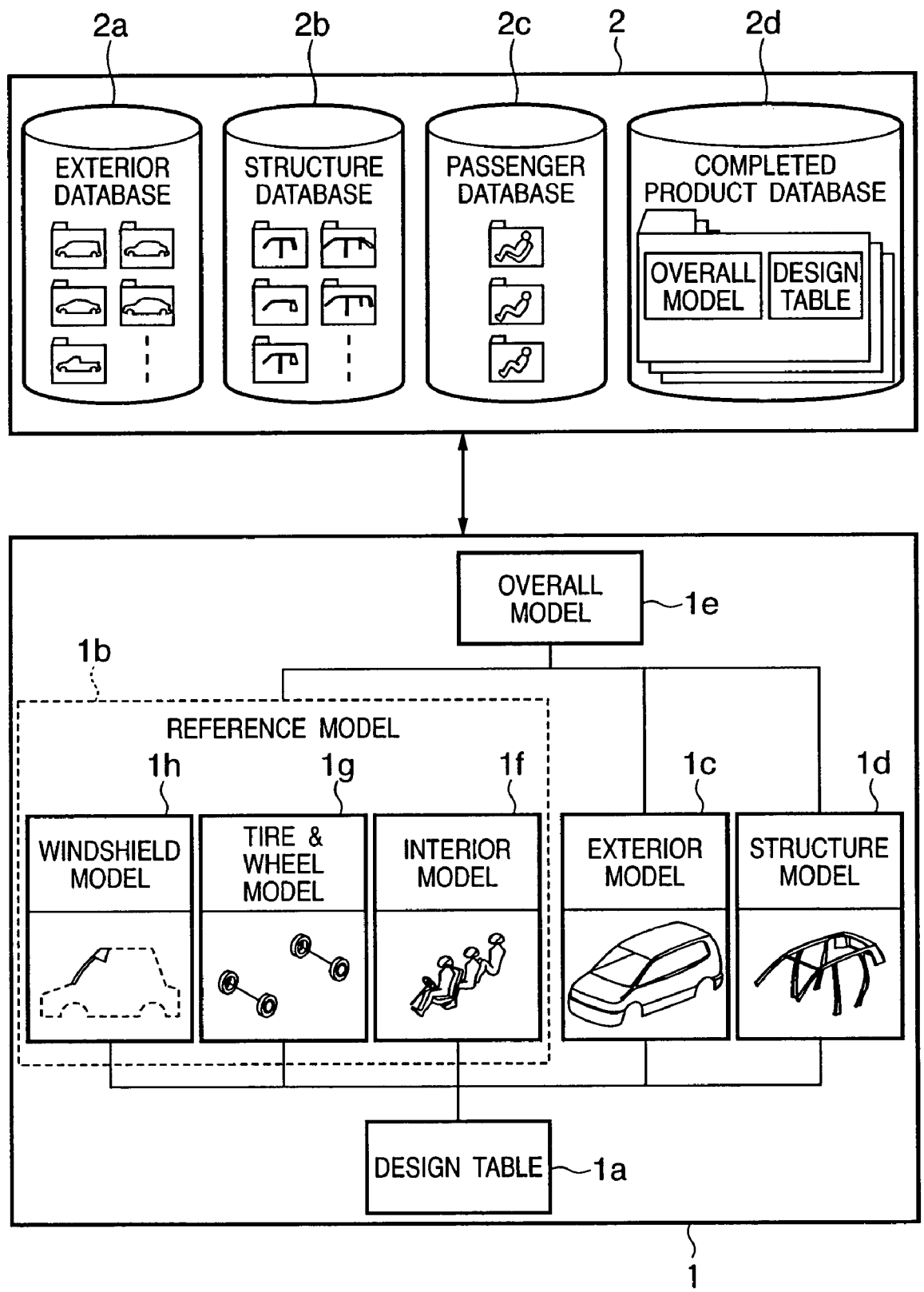
FIG. 2 hierarchically shows the detailed structure of a vehicle type database.

FIG. 2 shows data which are contained in the computer 1 and database server 2 included in the planning support system.

As shown in FIG. 2, the database server 2 includes an exterior database 2a, which stores exterior parameter groups that are associated with the 3D exterior shapes of vehicles and are classified for respective vehicle types, a structure database 2b, which stores structure parameter groups that are associated with the 3D structures and sectional shapes of frameworks of vehicles and are similarly classified for respective vehicle types, a passenger database 2c, which stores some types of human type models and seat models, which are defined by passenger sizes (standards of measure of adults and children) complying with the domestic and foreign standards, and a completed product database 2d, which stores parameters of completed vehicles.

More specifically, the exterior database 2a stores and manages exterior base models, which express typical exterior shapes of vehicles using exterior parameter groups as 3D data and are classified for respective models. The exterior base models are expressed by 3D data of most common shapes having no exterior features for respective vehicle types such as hatchback, minivan, sedan, sports, open, and truck. The structure database 2b stores and manages structure base models, which express typical frameworks of vehicles using structure parameter groups as 3D data, and are similarly classified for respective vehicle types. The passenger database 2c stores and manages passenger base models, which express passenger shapes using 3D data, and seat base models, which express seat shapes using 3D data.

The computer 1 creates a design table 1a that contains various specification values, passengers' sitting position information, and the like associated with a vehicle to be planned, on the basis of user's inputs. The computer 1 accesses the database server 2 on the basis of the design table 1a, reads out and deforms desired base models (parameter groups) to build three models called a reference model 1b, exterior model 1c, and structure model 1d, and then builds an overall model 1e by superimposing these three models.

The design table 1a stores passengers' sitting positions (hip points) and a seat arrangement (the number of seats such as one, two, or three rows of seats and the like) as passenger parameters associated with the sitting states of passengers in a passenger room. The computer 1 combines and deforms human type models and seat models read out from the passenger database 2c on the basis of these passenger parameters so as to build an interior model 1f that expresses the interior comfort of passengers. This interior model 1f is not influenced by vehicle specification values input to build the exterior model 1c, and the exterior model 1c and interior model 1f never deform in conjunction with each other.

Also, the computer 1 builds a tire & wheel model 1g, which specifies the position of this interior model 1f in the vehicle, on the basis of the total length, total width, total height, wheel base, and the like of the vehicle input to the design table 1a. Furthermore, the computer 1 builds a windshield model 1h which has an upper end that is determined on the basis of an eye point indicating the driver's eye position, and a minimum driver's field of view to be assured, and a lower end as a cowl top point determined based on the input specification values. The computer 1 builds a reference model 1b by combining the interior model 1f, tire & wheel model 1g, and windshield model 1h.

The computer 1 can render the reference model 1b on a 3D space to display it on the display unit 17. Also, the computer 1 allows the user to adjust passengers' sitting postures and the like contained in the reference model 1b on that 3D space using the input unit 16 such as a pointing device and the like.

The computer 1 selects and reads out, on the basis of the vehicle type (one of hatchback, minivan, sedan, sports, open, and truck) stored in the design table, an exterior parameter group of that vehicle type from the exterior database 2a. The computer 1 changes predetermined exterior parameters (the coordinate positions of a bumper leading end position, roof top, and the like) contained in the exterior parameter group using various specification values (total length, total width, total height, wheel base, front and rear overhangs) stored in the design table 1a, thus building a rough exterior model 1c according to the specification values. The computer 1 can render the exterior model 1c on the 3D space to display it on the display unit 17. Also, the computer 1 allows the user to adjust the exterior model 1c on that 3D space using the input unit 16 such as a pointing device and the like.

The computer 1 selects and reads out a structure parameter group from the structure database 2b on the basis of the vehicle type and vehicle framework structure stored in the design table 1a. The computer 1 changes predetermined structure parameters (the exterior shape of the framework that forms an outer appearance, the sectional shape of the framework) contained in the structure parameter group using various specification values (sectional shapes, materials, weights, mechanical strengths, and the like) stored in the design table 1a, thus building a structure model 1d according to the specification values. Furthermore, the computer 1 can render the structure model 1d on the 3D space to display it on the display unit 17.

Moreover, the computer 1 builds an overall model 1e by combining the built reference model 1b, exterior model 1c, and structure model 1d, and can render the overall model 1e on the 3D space to display it on the display unit 17.

Programs included in the computer 1 will be described below.

Figure 40:
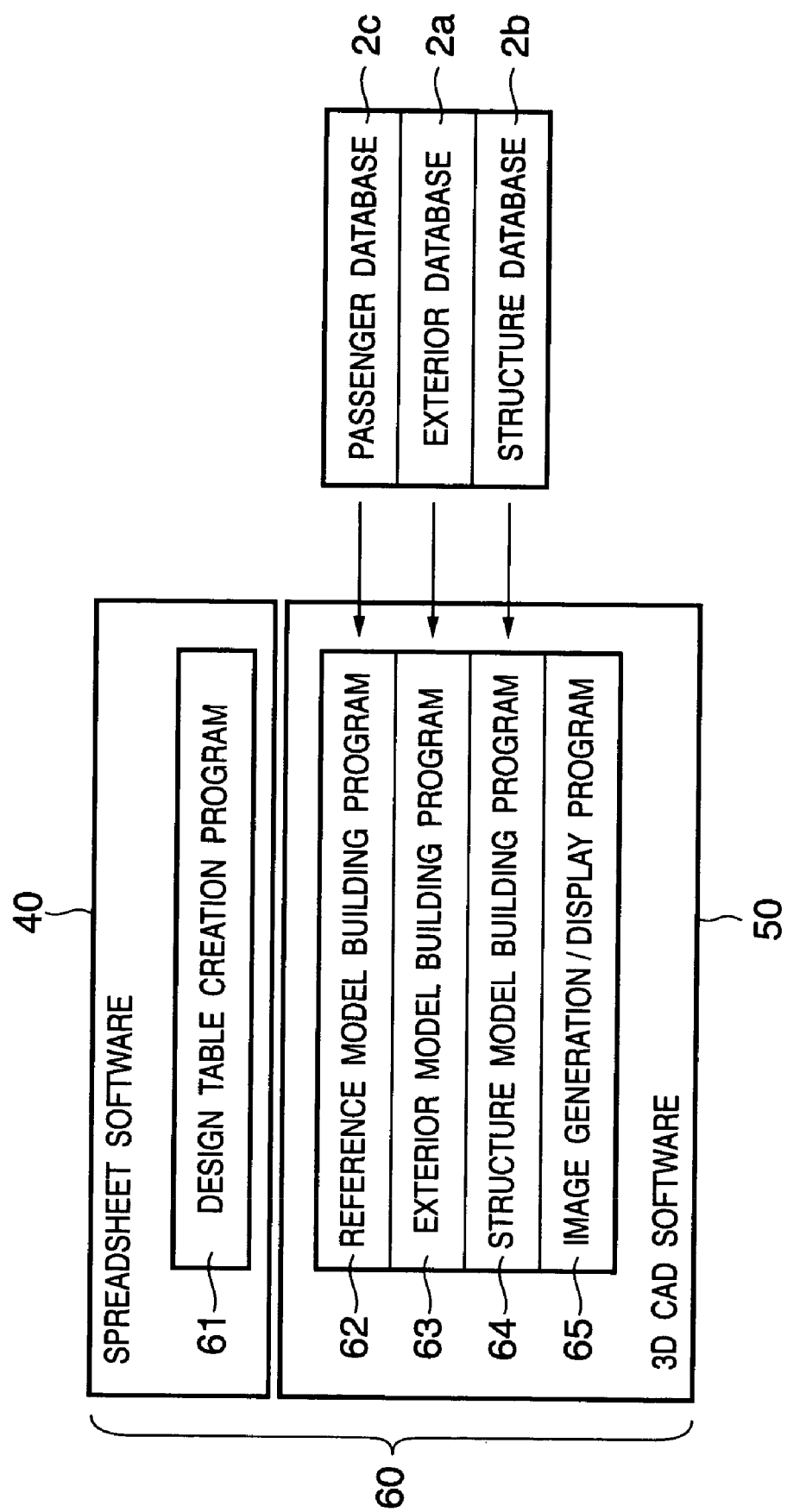
FIG. 40 is a diagram showing the configuration of a planning support program of this embodiment.

FIG. 40 shows the configuration of a planning support program that implements the planning support system of this embodiment.

The design table 1a can be created using spreadsheet software 40 which runs on the operating system. Also, the respective models 1b, 1c, and 1d can be created using 3D CAD software 50 which extracts and calculates values from the design table 1a created using the spreadsheet software 40.

That is, a planning support program 60 that implements this system includes a design table creation program 61 incorporated in the spreadsheet software 40, a reference model building program 62, an exterior model building program 63, a structure model building program 64, and a 3D image generation/display program 65 which are incorporated in the 3D CAD software.

The design table creation program 61 includes a function of displaying a graphical user interface, which prompts the user to input specification values and the like. With this interface, the user can easily input various specification values, passengers' sitting positions and postures, and the like.

Each of the model building programs 62 to 64 has a function of looking up the design table 1a created by the design table creation program 61, and also a function of reading out a corresponding parameter group stored in the passenger database 2c, exterior database 2a, and structure database 2b on the basis of the contents of the design table 1a, and automatically changing predetermined parameters.

Note that the design table creation programs and other programs run on different software programs in this embodiment. However, the present invention is not limited to such specific configuration, and the planning support software may include all of the design table creation function, reference, exterior, and structure model building functions, and image generation/display function.

Figure 3:
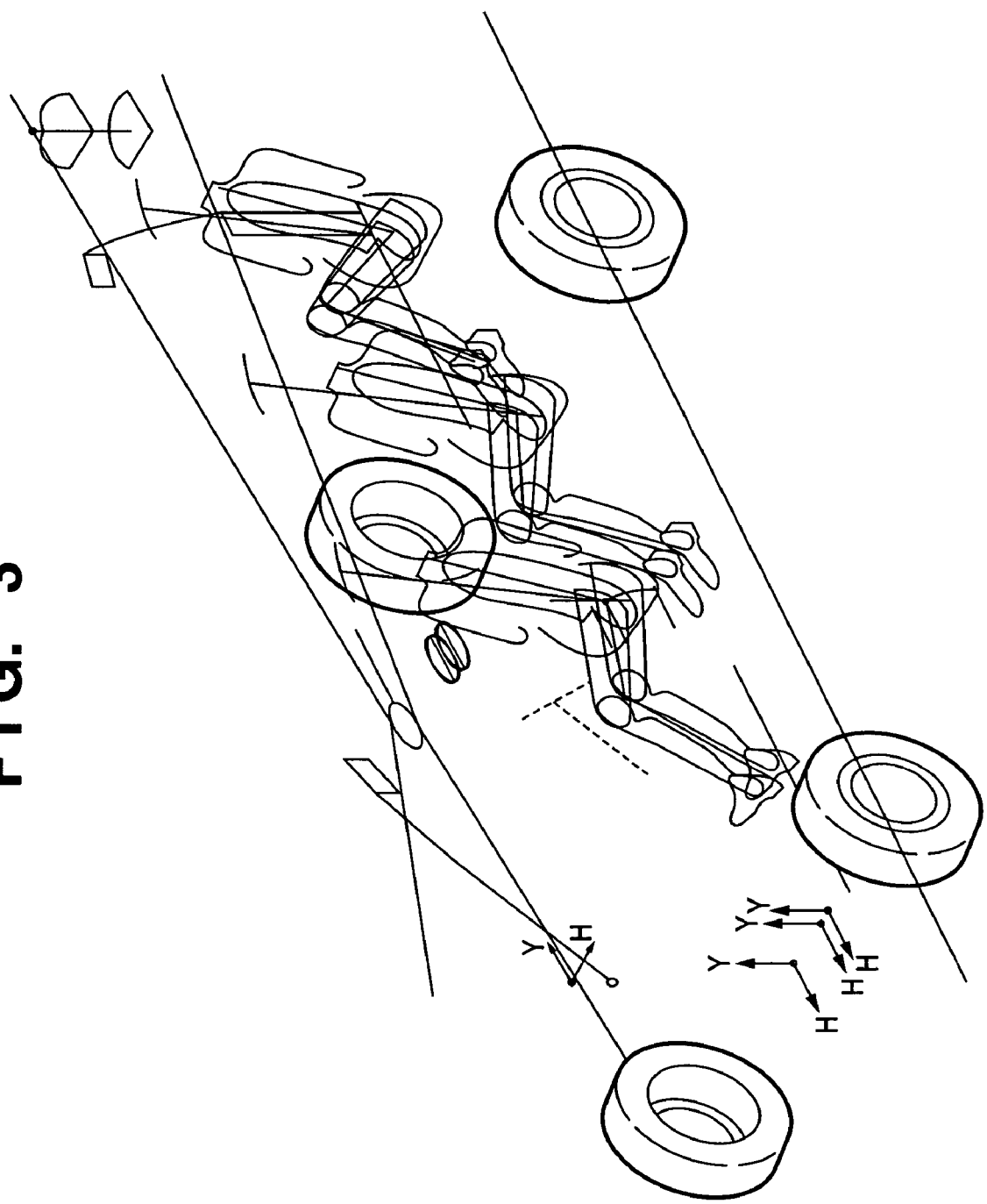
FIG. 3 shows one image display example of a reference model.

FIG. 3 shows a display screen example when a reference model built by the reference model building program 62 is displayed on the display unit 17 by the display program 65.

Figure 4:
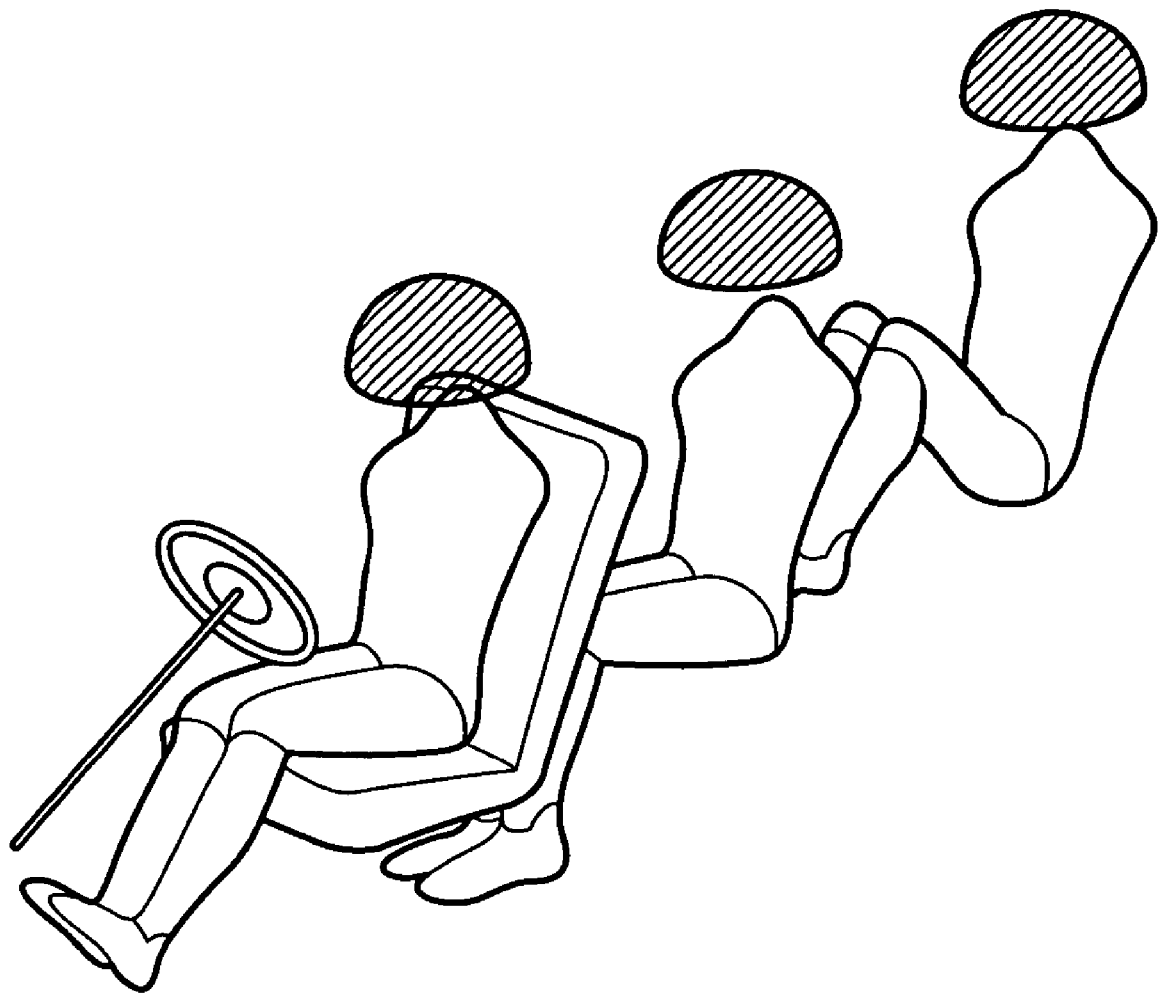
FIG. 4 shows one image display example of a passenger reference model.

FIG. 4 shows a display screen example of only an interior model extracted from the reference model. Note that the interior model is a set of coordinate data, which have the center of the left front wheel as an origin. On the other hand, a tire & wheel model is also a set of coordinate data which have the same point as an origin, and these models are superimposed, as shown in FIG. 3, with reference to this origin.

Figure 5:
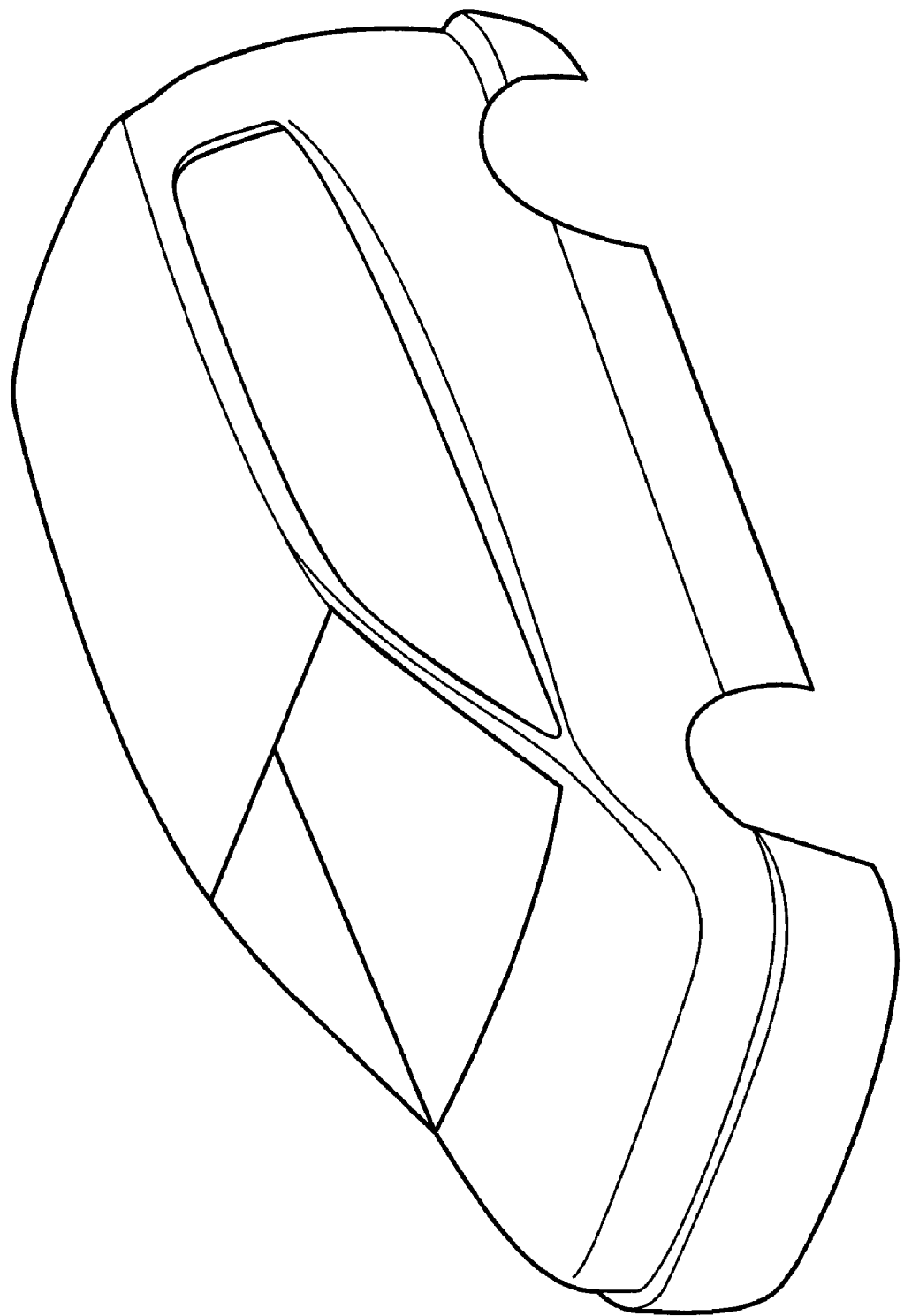
FIG. 5 shows one image display example of an exterior reference model.

FIG. 5 shows a display screen example when an exterior model built by the exterior model building program 63 is displayed on the display unit 17 by the display program 65. The exterior model is defined by specification values such as the total length, total width, total height, wheel base, and the like of a vehicle, and parameters such as a plurality of vehicle types (e.g., wagon, sedan, and the like), and 3D image data shown in FIG. 5 is automatically generated and displayed by an image process based on the input parameters.

Figure 6:
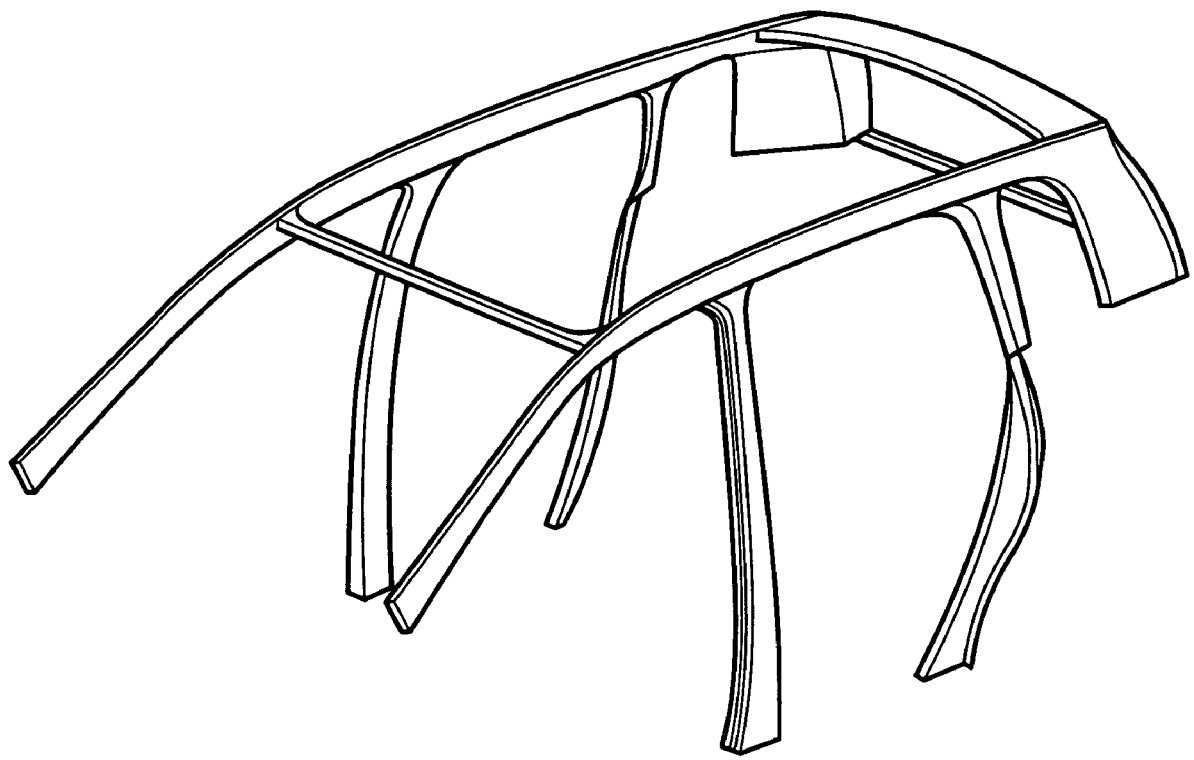
FIG. 6 shows one image display example of a structure model.

FIG. 6 is a display screen example when a structure model built by the structure model building program 64 is displayed on the display unit 17 by the display program 65. The structure model is defined by parameters indicating the framework structure and those indicating the sectional shapes of respective parts such as a front pillar, center pillar, and the like, which are input to the design table, and 3D image data shown in FIG. 6 is automatically generated and displayed by an image process based on the input parameters.

Figure 7:
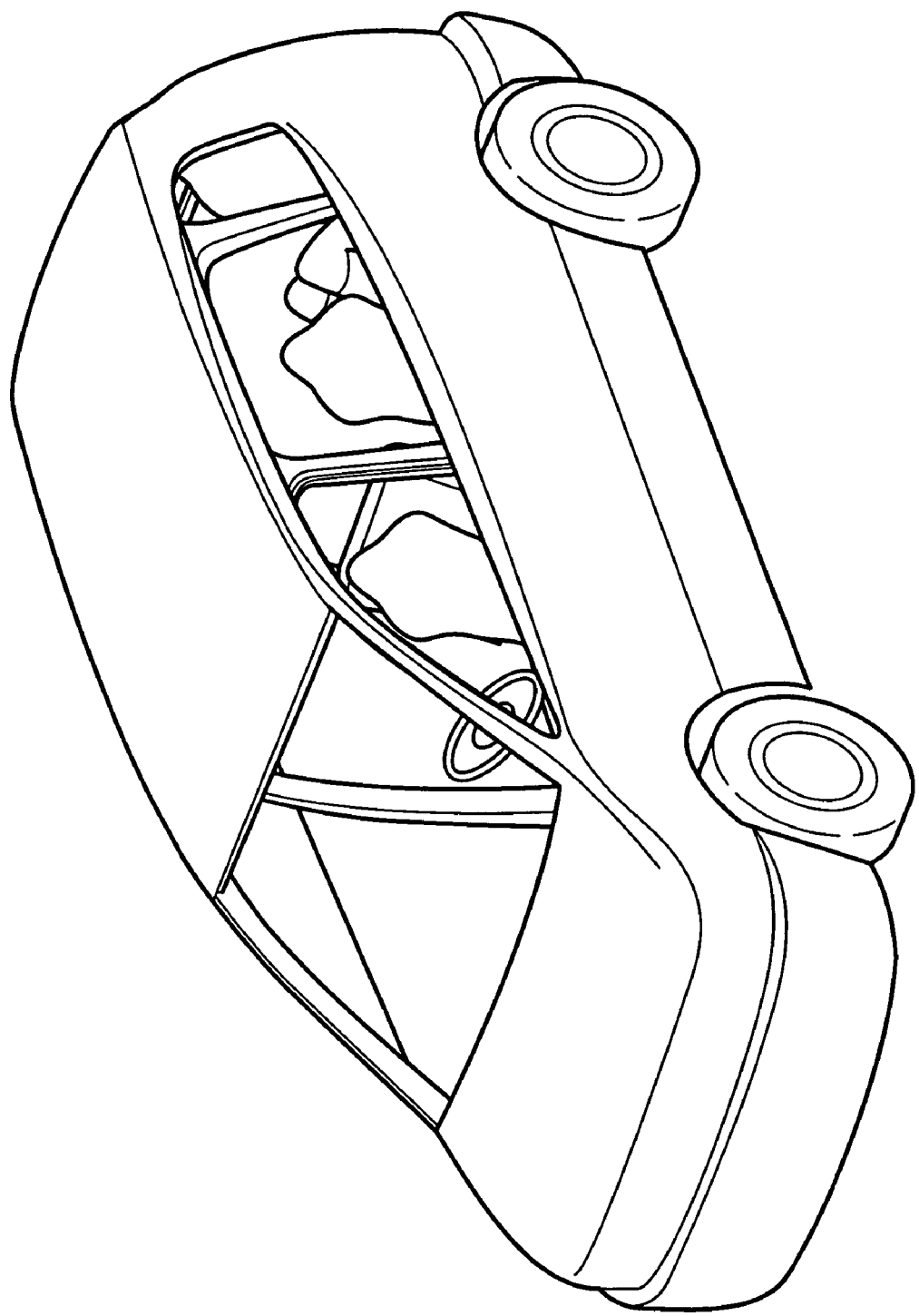
FIG. 7 shows an image display example of a complete model obtained by superimposing the reference models, exterior model, and structure model.
Figure 8:
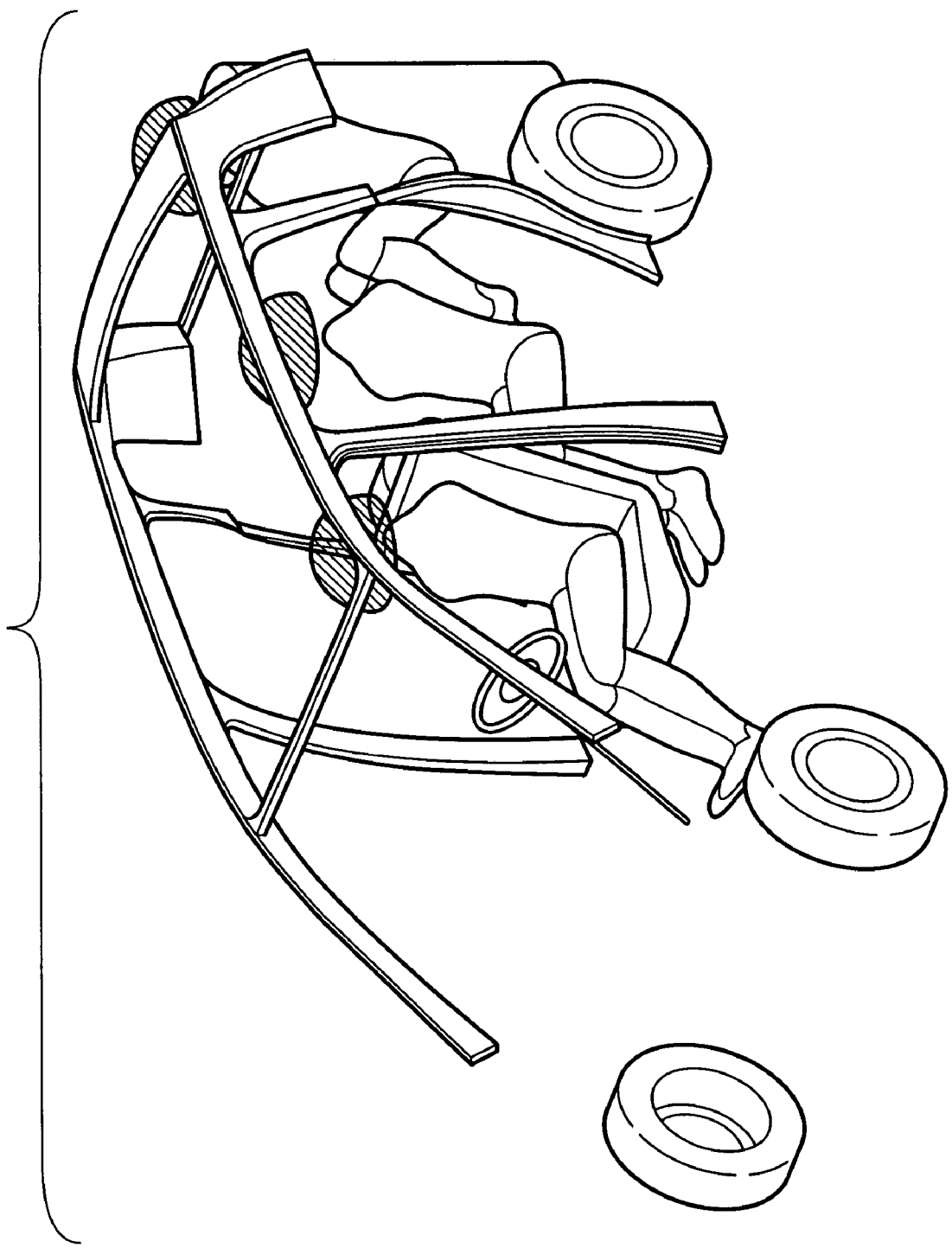
FIG. 8 shows an image display example of a complete model obtained by superimposing the reference models and structure model.

FIG. 7 shows an image display example of a complete model obtained by superimposing the reference model, exterior model, and structure model, and FIG. 8 shows an image display example when the reference model and structure model are superimposed. Respective models have reference points, and images shown in FIGS. 7 and 8 are displayed by superimposing these reference points. Note that the reference points to be superimposed will be described in detail later in the paragraphs of "reference points of model superimpose display".

By superimposing the reference model and exterior model, the packaging state (the head clearance and oppressive feeling of passengers) and visibility of the vehicle can be verified. When the structure model is further superimposed, crash performance, vehicle body rigidity, and the like can be verified, and the driver's visibility range viewed from the passenger room side and the like can be evaluated in detail.

The tire & wheel model and exterior model have common parameters, and deform in conjunction with each other upon changing these parameters. On the other hand, the interior model does not have any parameters common to the exterior model and structure model, and does not deform in conjunction with changes in exterior model and structure model. In this manner, the exterior model can be built independently of the interior model, and an exterior can be effectively set with free ideas without being restricted by the interior. Conversely, the interior can be planned with free ideas without being restricted by the exterior shape.

Figure 9:
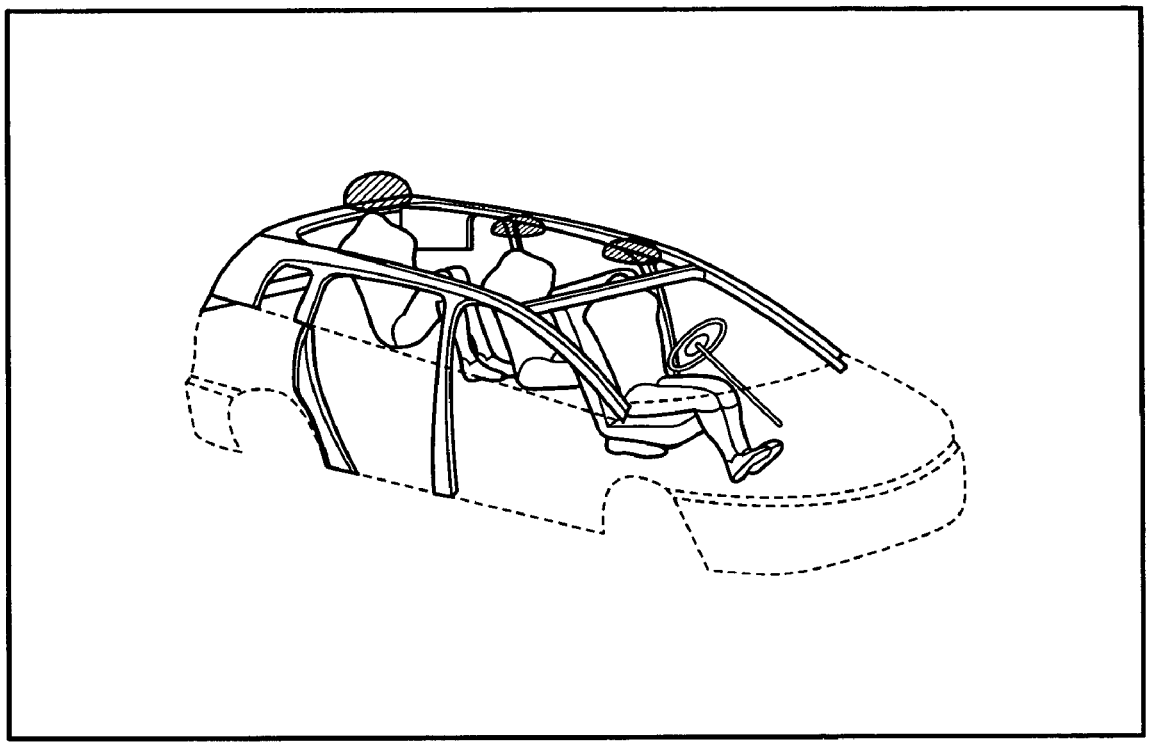
FIG. 9 shows an image display example of a complete model obtained by superimposing the reference models, exterior model, and structure model.
Figure 10:
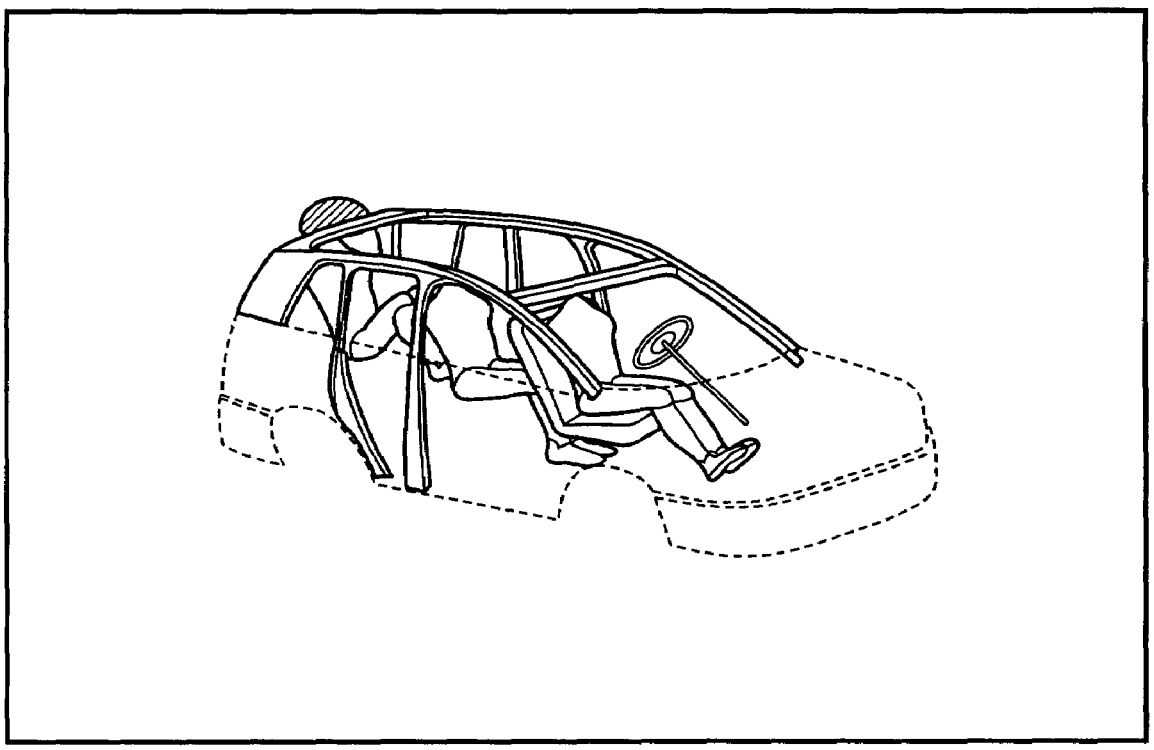
FIG. 10 shows an image display example of a complete model obtained by superimposing the reference models, exterior model, and structure model.

FIGS. 9 and 10 show other image display examples of a complete model obtained by superimposing the reference model, exterior model, and structure model. Unlike in FIG. 7, the display example of FIG. 9 semi-transparently displays the exterior model, and that of FIG. 10 fully transparently displays the exterior model.

In these examples, since the input parameters such as the total height, total length, and the like are too small to house the interior model, the heads of passengers project from the vehicle exterior. In these figures, only interference portions are displayed in a different color so as to clearly determine such interference state between the interior model and exterior model.

In this manner, it is visually verified that the head clearance of passengers, driver's field of view to be assured, and the like are insufficient, and the respective models can be changed based on this verification result. That is, when the passengers' sitting positions and postures determined by the interior model are strained with respect to the passenger room space set by the exterior model and structure model, the user can make adjustment (e.g., he or she can shift these sitting positions, change the sitting postures, raise the roof position, and so forth) on the screen of FIG. 9. Such adjustment process will be described in detail later in the paragraphs of <local deformation rules> and the like.

Note that the method of identifiably displaying the interference portions includes methods of displaying arrows to call user's attention, generating an alert tone, and the like in addition to the method of displaying those portions in different color.

(Program Configuration)

The functions of the programs included in the planning support program 60 according to this embodiment will be described below.

[Design Table Creation Program]

Parameters input to the design table include the tire wheel dimensions, under floor dimensions, passenger layout condition, and the like in addition to the exterior dimensions and vehicle type as exterior parameters, the number of sheets, interior dimensions, and visibility condition as passenger parameters.

Note that all parameters in the length and vertical directions to be input in the following table are values used to derive coordinate positions of respective portions when the axle of the front wheels is used as an origin. Also, parameters in the width direction to be input in the following table are set with reference to the central plane of the vehicle. That is, when all parameters are appropriately input to the design table, models of an exterior, interior (passengers and seats), windshield, and the like of a vehicle can be rendered on the 3D coordinate system having the axle of front wheels and the central plane of the vehicle as the origin.

<Vehicle Type Selection>

Figure 20:
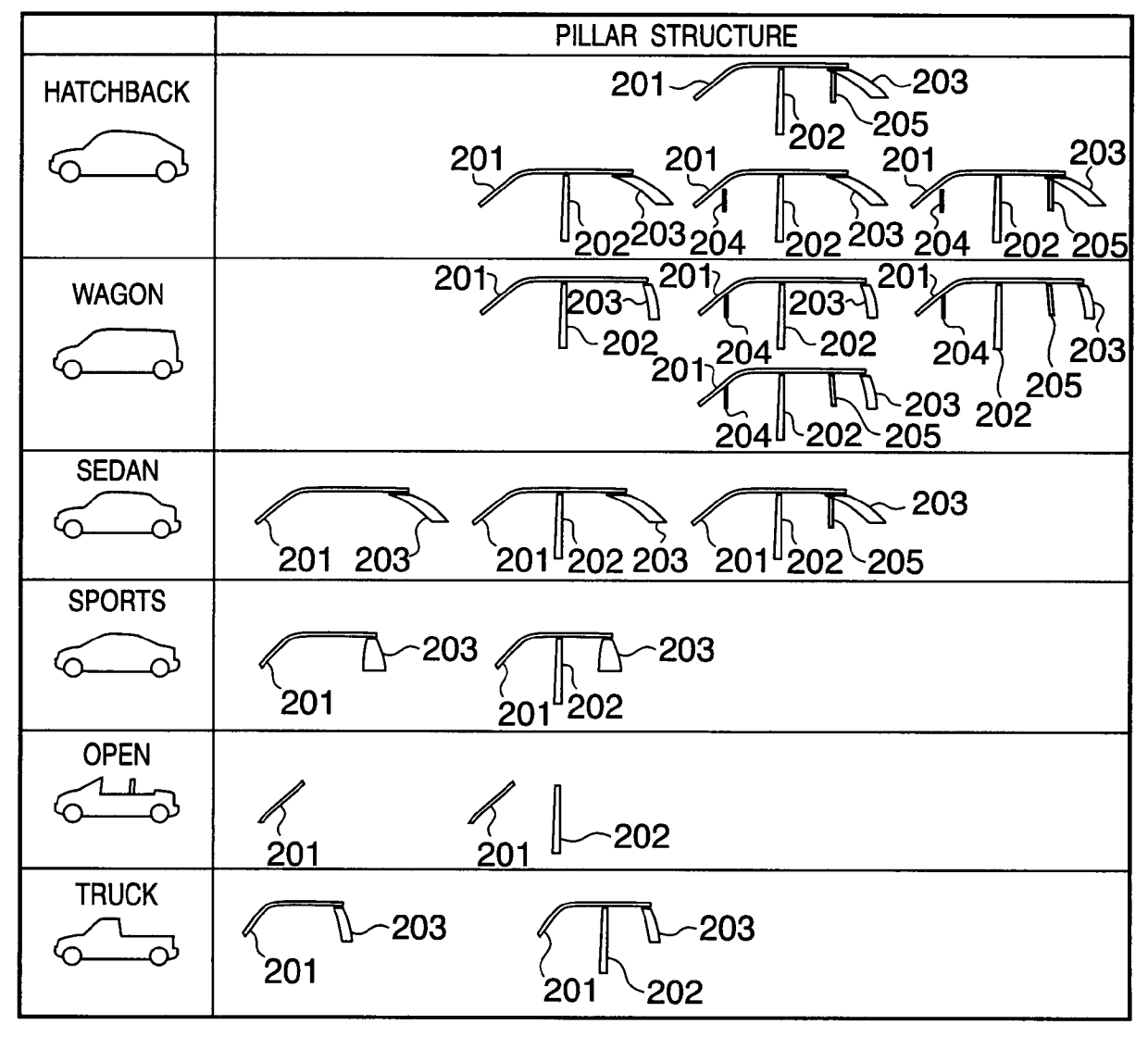

FIG. 20 shows an example of a model & type select interface included in the design table creation program 61. That is, an exterior model is built on the basis of a vehicle type selected from this interface, and a structure model is built on the basis of the pillar structure selected from this interface.

A plurality of pillar structures as structure parameter groups are prepared in the database for respective vehicle models, as shown in FIG. 20.

The vehicle type preferably includes at least two of minivan, station wagon, and sedan. In this example, the vehicle type is classified into a total of six types: hatchback, minivan/wagon (station wagon), sedan, sports, open, and truck.

Exterior parameter groups (3D coordinate data that form exteriors of corresponding vehicles) are stored in the database in correspondence with these vehicle types, and selection of a given vehicle type directly corresponds to selection of an exterior parameter group. Structure parameter groups (3D coordinate data that form corresponding frameworks) are stored in the database for respective pillar structures in the right column, and selection of a given vehicle type and selection of a given pillar structure directly correspond to selection of a structure parameter group.

In this case, by selecting one of pillar structure icons displayed on the right column, a vehicle type is selected at the same time. Also, an interface that allows the user to select a vehicle type and pillar structure in independent steps may be adopted. In either case, when an external parameter group (vehicle type) is selected, a structure parameter group (a pillar structure corresponding to that vehicle type) that belongs to the same class as the selected vehicle type is automatically selected from the structure database.

In this case, selection of the vehicle type narrows down the selection range of pillar structures. Alternatively, the selection range of pillar structures may be narrowed down in accordance with parameters (e.g., the total length and the like) input to another input table. In this case, the structure database stores pillar structures in correspondence with vehicle sizes.

The pillar structure will be described in detail below. Referring to FIG. 20, as vehicle types "hatchback" and "wagon", with reference to a vehicle type which has a front pillar 201, center pillar 202, and rear pillar 203, vehicle types each of which further has a front auxiliary pillar 204 between the front pillar 201 and center pillar 202, vehicle types each of which further has a rear auxiliary pillar 205 between the center pillar 202 and rear pillar 203, and vehicle types each of which has the auxiliary pillars 204 and 205 between the front pillar 201 and center pillar 202 and between the center pillar 202 and rear pillar 203 are defined.

As vehicle type "sedan", with reference a vehicle type which has a front pillar 201, center pillar 202, and rear pillar 203, a vehicle type (hardtop type) which has no center pillar 202, and a vehicle type which further has a pillar 205 between the center pillar 202 and rear pillar 203 are defined.

As vehicle types "sports" and "truck", with reference to vehicle types each of which has a front pillar 201, center pillar 202, and rear pillar 203, vehicle types each of which has no center pillar 202 are defined.

As vehicle type "open", a vehicle type which has only a front pillar 201 and a vehicle type which has a front pillar 201 and center pillar 202 are defined.

In this way, since the user can select a vehicle type to which a vehicle to be planned belongs, the number of steps required for shape deformation and the like of an exterior model can be reduced, and the verification precision can be improved, thus improving the user's work efficiency.

Since a structure model is built by selectively reading out one of a plurality of pillar structures prepared for respective vehicle types, the user can narrow down the selection range of structure parameter groups by selecting only a vehicle type, and the planning efficiency can be improved.

Although not shown, an interface that allows the user to input a seat structure in association with the selected vehicle type is also prepared. This interface may be a table used to input the numbers of passengers who can be seated in the first to third rows of seats. In this case, the numbers of seats can be input using three values. For example, two seats can be numerically expressed by (2, 0, 0); five seats for a general five-passenger car can be numerically expressed by (2, 3, 0); and seven seats can be numerically expressed by (2, 3, 2).

Furthermore, an interface that allows the user to input the number of doors may be prepared.

<Exterior Dimensions>

Figure 11:
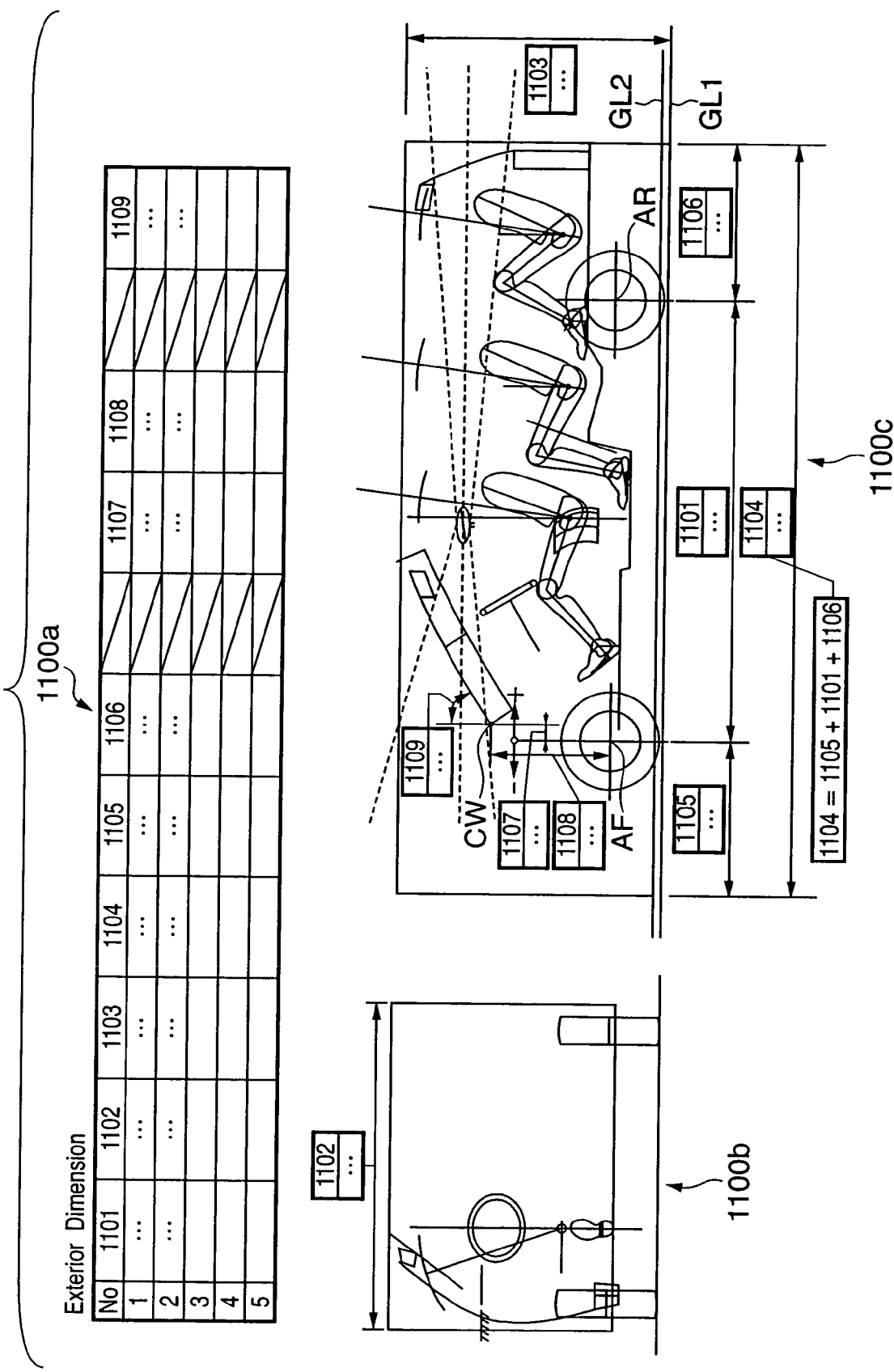
FIG. 11 exemplifies 2D images, which display a vehicle reference model in case of three rows of seats as front and side views, and an input window of exterior dimensions input as parameters to corresponding portions of the 2D images.

FIG. 11 shows an example of an exterior dimension input interface included in the design table creation program 61. Reference numeral 1100a denotes an input table of vehicle specification values; and 1100b and 1100c, front- and side-view images of a vehicle used to show corresponding portions of parameters to be input to the input table, respectively. Note that the vehicle specification values include a wheel base 1101, total width 1102, total height 1103, front overhang 1105, rear overhang 1106, horizontal and vertical positions 1107 and 1108 of a cowl point CW, and windshield slope 1109.

In the vehicle specification values, the front overhang 1105 is the distance between the front end of the vehicle, which overhangs forward from a front axle AF, and the front axle AF. The rear overhang 1106 is the distance between the rear end of the vehicle, which overhangs backward from a rear axle AR, and the rear axle AR. The horizontal position 1107 of the cowl point CW is the distance in the horizontal direction between the central position of the lower end of a windshield in the vehicle width direction, and the front axle AF. The vertical position 1108 of the cowl point CW is the distance in the vertical direction between the central position of the lower end of a windshield in the vehicle width direction, and the front axle AF. Furthermore, the windshield slope 1109 is the slope angle a vertical line that passes the cowl point position makes with the windshield.

A total length 1104 can be automatically calculated by summing up the wheel base 1101, front overhang 1105, and rear overhang 1106 (1104=1101+1105+1106). Note that the total height 1103 is not a height with reference to a ground plane GL2 of a loaded vehicle, but is a height with reference to a ground plane GL1 of an empty vehicle. Basically, a reference model and exterior model other than the total height are set on the basis of GL2.

Note that the upper and lower end reference positions (parameters common to points C1 and D1 of the exterior model; to be described later) specified by a given standard such as domestic and foreign crash safety standards may be able to be input as the exterior dimensions. In this case, a bumper layout reference range corresponding to these positions is displayed (see 2200c in FIG. 22).

<<Restriction on Cowl Point>>

Figure 17:
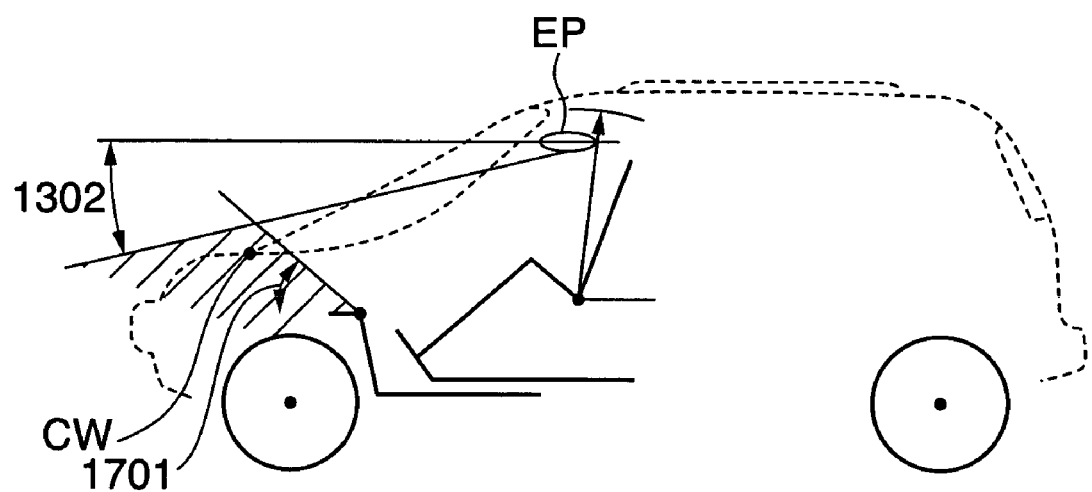
FIG. 17 is a view for explaining a method of determining a cowl point CW of a vehicle reference model.

FIG. 17 is a view for explaining the restrictions on the horizontal and vertical positions 1107 and 1108 of the cowl point CW of the reference model. The horizontal and vertical positions 1107 and 1108 of the cowl point CW can be input in FIG. 11, but cannot always be set at fully arbitrary positions and are restricted by the visibility and the like.

Figure 13:
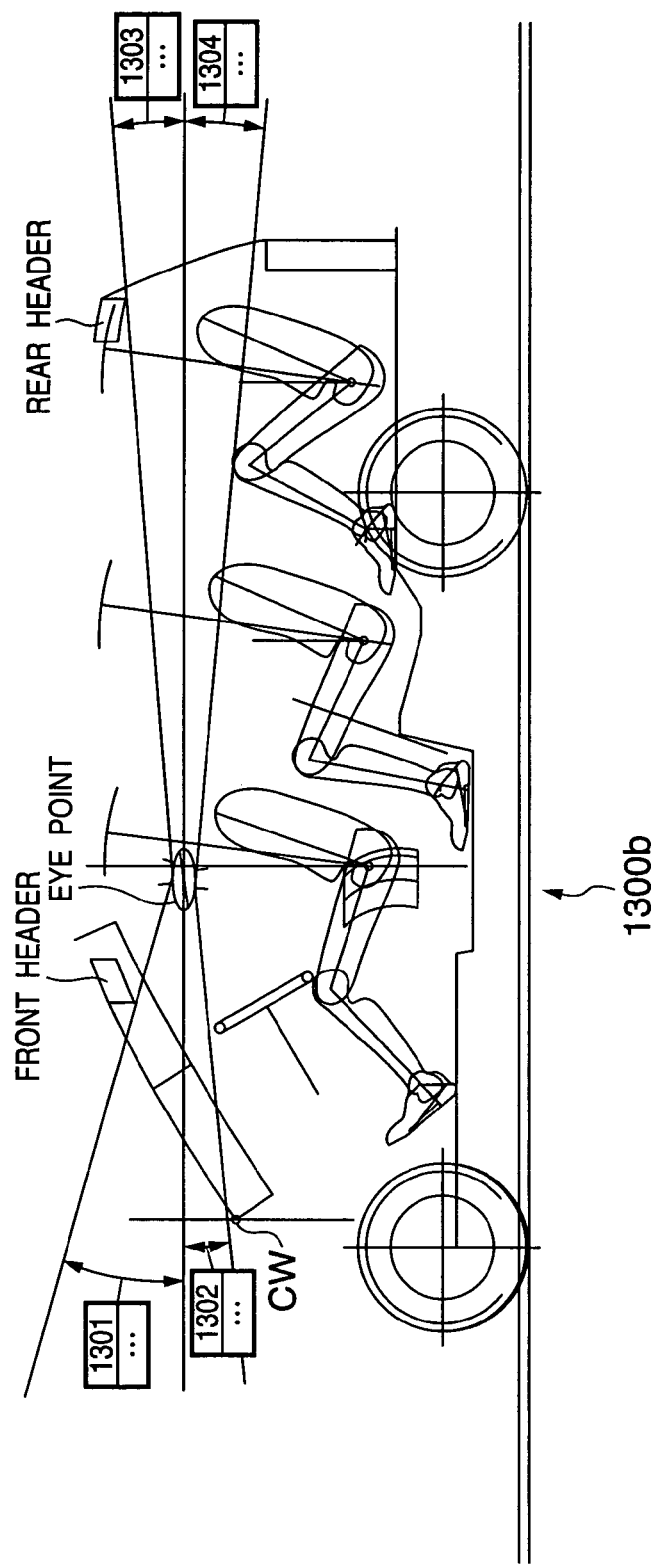
FIG. 13 exemplifies a 2D image, which displays a vehicle reference model in case of three rows of seats as a side view, and an input window of visibility-related dimensions input as parameters to corresponding portions of the 2D image.

More specifically, as the first condition, these positions must not interfere with a forward and downward visibility 1302 of the visibility conditions input in FIG. 13.

As the second condition, these positions must be located below a line that makes a predetermined acute angle 1701 forward and upward from a dash panel upper end position DP specified by 1200a in FIG. 12.

<Interior Dimensions>

Figure 12:
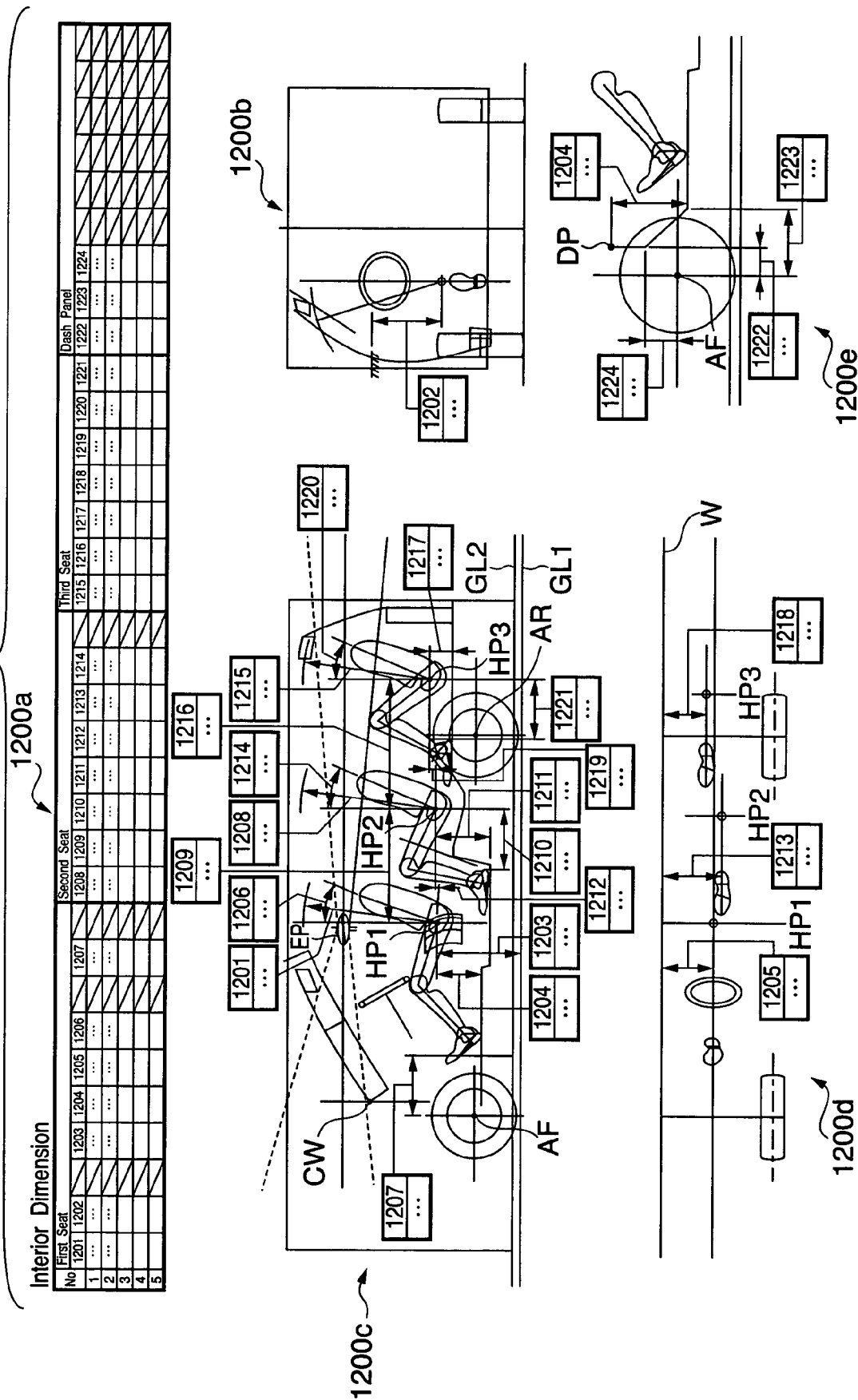
FIG. 12 exemplifies 2D images, which display a vehicle reference model in case of three rows of seats as a front view, side view, plan view, and enlarged view around a dash panel, and an input window of interior dimensions input as parameters to corresponding portions of the 2D images.

FIG. 12 shows an example of an interior dimension input interface included in the design table creation program 61. Reference numeral 1200a denotes an input table of interior dimensions; and 1200b, 1200c, and 1200d, front-, side-, and bottom-view images to show corresponding portions of parameters input to the input table, respectively. Also, reference numeral 1200*e* denotes an image that displays a dash panel and its surrounding portion in an enlarged scale to show positions of dimensions required to determine the dash panel position.

Dimensions that determine the interior comfort can be classified into parameters associated with a front-row seat passenger, those associated with a second-row seat passenger, those associated with a third-row seat passenger, and those associated with the dash panel. If the second and third rows of seats are not available, parameters associated with second- and third-row seat passengers need not be input. Assume that parameters that indicate the number of seats=three rows of seats have already been input.

Of these parameters, the parameters associated with the front-row seat passenger include:

- 1201: a vertex position of the front-row seat passenger (the length of a line which extends upward from a front-row seat hip point HP1 and slopes backward a predetermined infinitesimal angle with respect to the vertical direction);
- 1202: a vertical distance between the front-row seat hip point HP1 and cowl point CW;
- 1203: a vertical distance between the front-row seat hip point HP1 and ground plane GL2 of the loaded vehicle;
- 1204: a vertical distance between the front-row seat hip point HP1 and a floor panel;
- 1205: a distance between the front-row seat hip point HP1 and a vehicle width center W;
- 1206: a front-row seat torso angle; and
- 1207: a horizontal distance between the front axle AF and the upper end of an accelerator pedal;

The parameters associated with the second-row seat passenger include:

- 1208: a vertex position of the second-row seat passenger (the length of a line which extends upward from a second-row seat hip point HP2 and slopes backward a predetermined infinitesimal angle with respect to the vertical direction);
- 1209: a horizontal distance between the front-row seat hip point HP1 and second-row seat hip point HP2;
- 1210: a horizontal distance between the second-row seat hip point HP2 and a second-row seat passenger's heel;
- 1211: a vertical distance between the second-row seat hip point HP2 and floor panel;
- 1212: a vertical distance between the front-row seat hip point HP1 and second-row seat hip point HP2;
- 1213: a distance between the second-row seat hip point HP2 and vehicle width center; and
- 1214: a second-row seat torso angle.

Note that the driver's eye position (eye point) EP is automatically derived from the vertex position 1201 of the front-row seat passenger.

Furthermore, the parameters associated with the third-row seat passenger include:

- 1215: a vertex position of the third-row seat passenger (the length of a line which extends upward from a third-row seat hip point HP3 and slopes backward a predetermined infinitesimal angle with respect to the vertical direction);
- 1216: a horizontal distance between the second-seat hip point HP2 and third-row seat hip point HP3;
- 1217: a vertical distance between the second-row seat hip point HP2 and third-row seat hip point HP3;
- 1218: a distance between the third-row seat hip point HP3 and vehicle width center;
- 1219: a vertical distance between the second-row seat hip point HP2 and third-row seat hip point HP3;
- 1220: a third-row seat torso angle; and
- 1221: a distance between the third-row seat hip point HP3 and a third-row seat passenger's heel.

The parameters associated with the dash panel include:

- 1222: a horizontal distance between the front axle AF and the front end of a dash panel DP;
- 1223: a horizontal distance between the front axle AF and the rear end of the dash panel DP; and
- 1224: a vertical distance between the front axle AF and the front end of the dash panel DP.

By inputting the interior dimensions as described above, the respective seat positions can be individually set on the absolute space of the interior model with reference to the front-row seat to third-row seat hip points HP1 to HP3.

<<Determination Method of Hip Point>>

On the interface shown in FIG. 12, the positions of the driver's hip point HP1 in the height and width directions are respectively specified by 1203 and 1205. However, no field used to directly input the position in the total length direction of the vehicle (horizontal position) is prepared.

In this embodiment, the position in the length direction is derived by calculations from other parameters which are directly input in FIG. 12, and the calculation method will be explained below.

Figure 16:
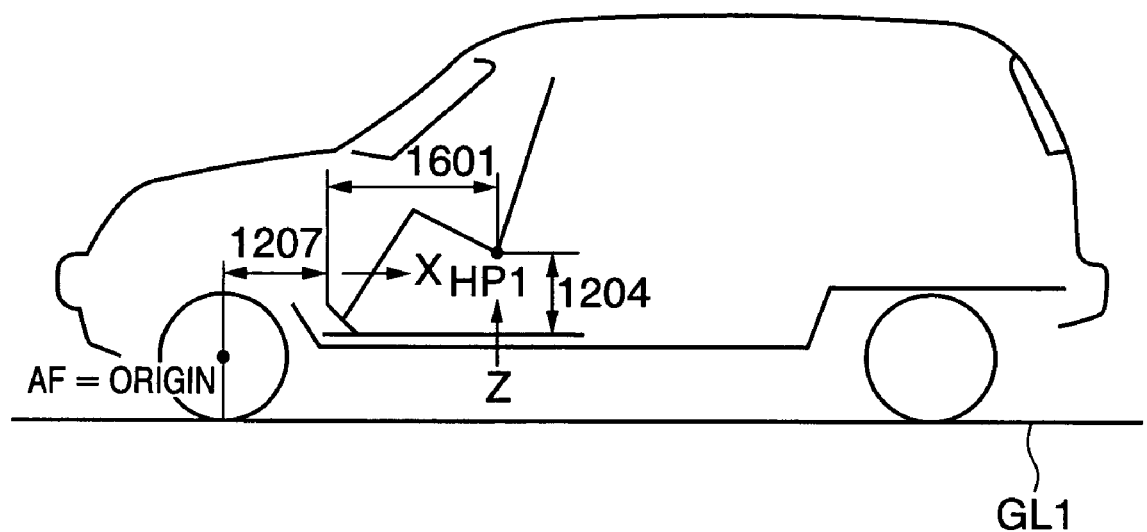
FIG. 16 is a view for explaining a method of determining the horizontal position, vehicle widthwise position, and vertical position of a hip point of a passenger in a front seat with respect to a vehicle reference model.

FIG. 16 is a view for explaining the method of determining the horizontal position of the driver's hip point HP1.

The table shown in FIG. 12 specifies the horizontal distance 1207 between the front axle AF as the origin and the upper end position (ball point) of the accelerator pedal. Also, the table shown in FIG. 12 specifies the height 1204 of the driver's hip point HP1 from the heel point. This embodiment adopts a program configuration that derives 1601 in FIG. 12 by substituting 1204 in Z of:

$$1601 = k1 + k2 \times Z - k3 \times Z^2$$

where k1, k2, and k3 are predetermined coefficients. This embodiment adopts the above formula from empirical rules. However, the present invention is not limited to such specific formula, and 1601 may be calculated using other formulas, or a program configuration that allows to directly input 1601 in the table of FIG. 12 may be adopted.

<Visibility Condition>

FIG. 13 shows an example of a visibility condition input interface included in the design table creation program 61. Reference numeral 1300*a* denotes an input table of visibility conditions; and 1300*b*, a side-view image of the interior of the vehicle to show corresponding portions of parameters to be input to the input table.

The parameters associated with the visibility conditions include:

- 1301: an angle (forward) to be assured upward from the horizontal plane that passes through the driver's eye point EP;
- 1302: an angle (forward) to be assured downward from the horizontal plane that passes through the driver's eye point EP;
- 1303: an angle (rearward) to be assured upward from the horizontal plane that passes through the driver's eye point EP; and
- 1304: an angle (rearward) to be assured downward from the horizontal plane that passes through the driver's eye point EP.

The angle 1301 automatically defines and displays the lowest position where a front header (a panel that supports the upper end of the windshield) can be mounted. Likewise, the angle 1303 automatically defines and displays the lowest position where a rear header (a panel that supports the upper end of a rear window) can be mounted.

<Tire & Wheel Dimensions>

Figure 14:
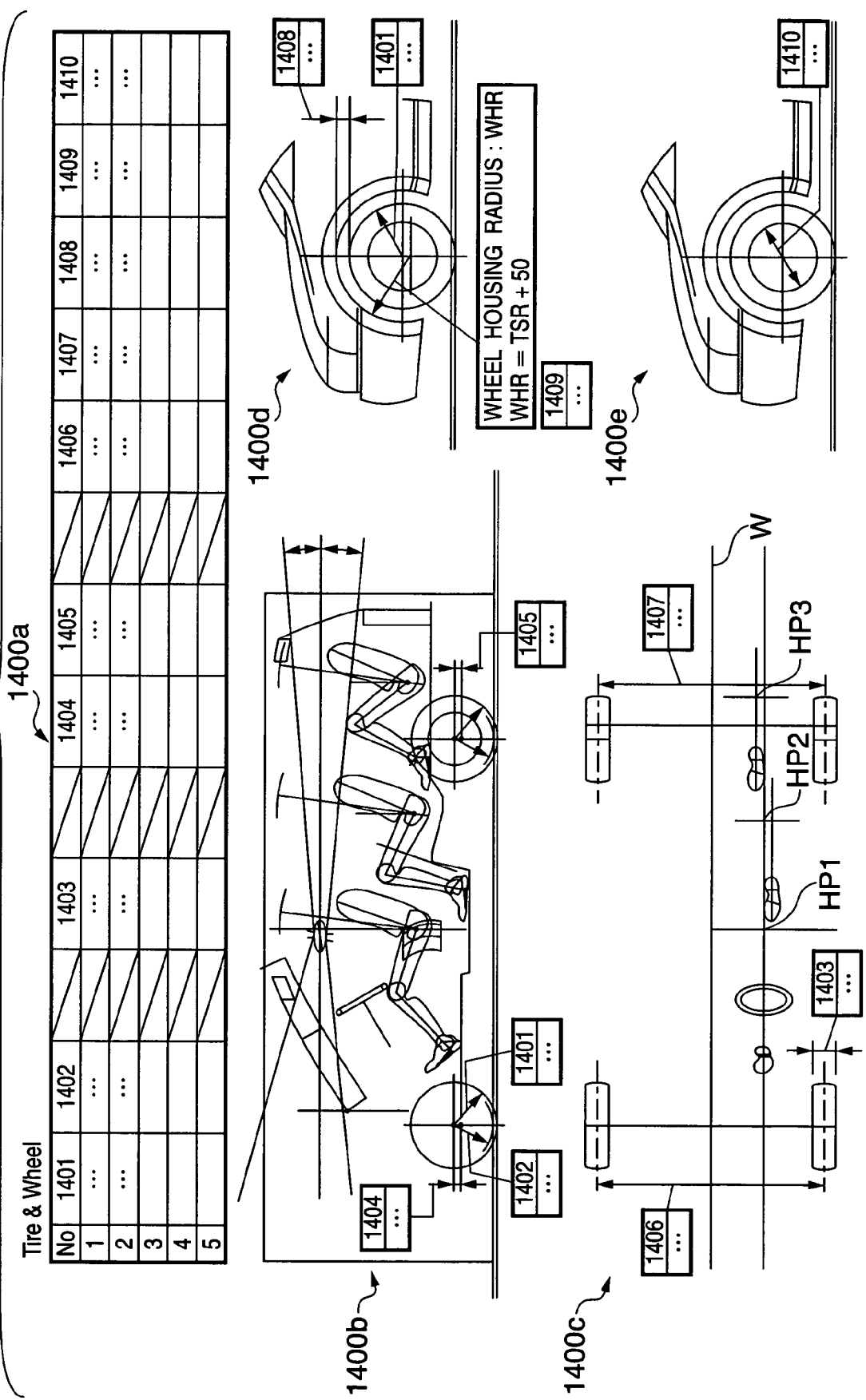
FIG. 14 exemplifies 2D images, which display a vehicle reference model in case of three rows of seats as a side view, plan view, and side view around a wheel housing, and an input window of tire-related dimensions input as parameters to corresponding portions of the 2D images.

FIG. 14 shows an example of a tire & wheel specification input interface included in the design table creation program 61. Reference numeral 1400*a* denotes an input table used to input tire and wheel dimensions; and 1400*b* and 1400*c*, side- and plan-view images of the interior of the vehicle to show corresponding portions of parameters to be input to the input table. Also, reference numerals 1400*d* and 1400*e* denote side-view images around a wheel housing.

Tire & wheel-related dimensions input to this table include:
- 1401: a tire outer diameter;
- 1402: a tire effective diameter;
- 1403: a wheel width;
- 1404: a vertical distance between the front wheel center of the empty vehicle and that of the loaded vehicle;
- 1405: a vertical distance between the rear wheel center of an empty vehicle and that of the loaded vehicle;
- 1406: a distance between the right and left front wheels;
- 1407: a distance between the right and left rear wheels;
- 1408: a distance between the wheel outer diameter and wheel housing;
- 1409: a wheel housing diameter; and
- 1410: a tire wheel outer diameter.

<Under Floor Dimensions>

Figure 15:
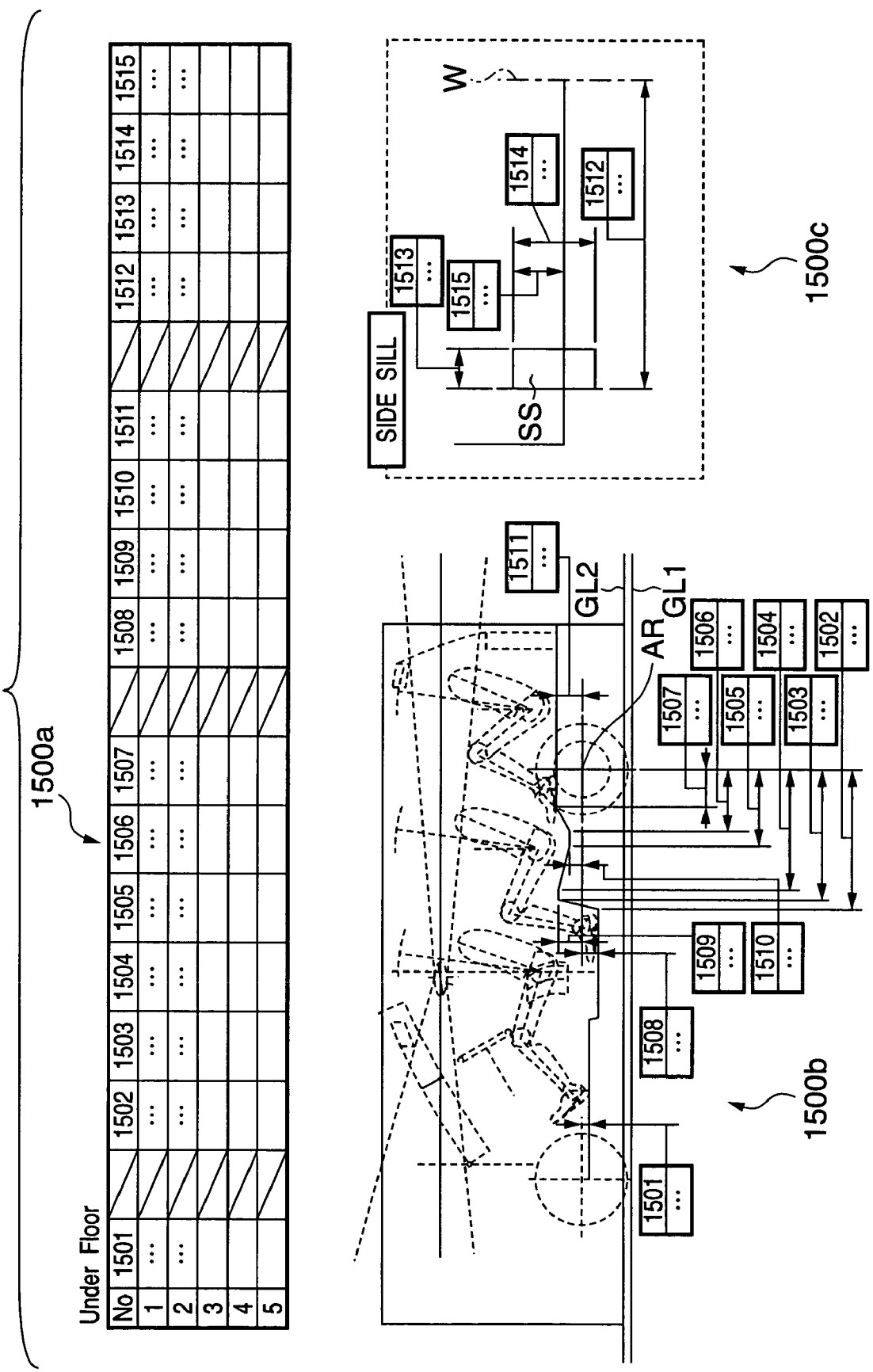
FIG. 15 exemplifies 2D images, which display a vehicle reference model in case of three rows of seats as a side view and sectional view around a side sill, and an input window of under floor-related dimensions input as parameters to corresponding portions of the 2D images.

FIG. 15 shows an example of an under floor dimension input interface included in the design table creation program 61. This example shows an input interface for three rows of seats. Reference numeral 1500*a* denotes an input table used to input various under floor dimensions; and 1500*b* and 1500*c*, a side-view image of the interior of the vehicle and a sectional-view image around a side sill to show corresponding portions of parameters to be input to the input table, respectively.

Under floor-related dimensions to be input to this table include:
- 1501: a vertical distance between a front-row floor panel and the axle AF;
- 1502 to 1507: horizontal distances between the rear axle AR and floor panel bent portions;
- 1508: a vertical distance between a second-row floor panel and axle plane;
- 1509: a vertical distance between the upper end of the second-row floor panel and the rear axle AR;
- 1510: a distance between a recess of the second-row floor panel and the rear axle AR;
- 1511: a vertical distance between a third-row floor panel and the rear axle AR;
- 1512: a distance between a side sill SS and vehicle width center W;
- 1513: the width of the side sill SS;
- 1514: the height of the side sill SS; and
- 1515: a vertical distance between the side sill SS and floor panel.

<<Determination Method of Front and Rear Header Positions>>

Figure 18:
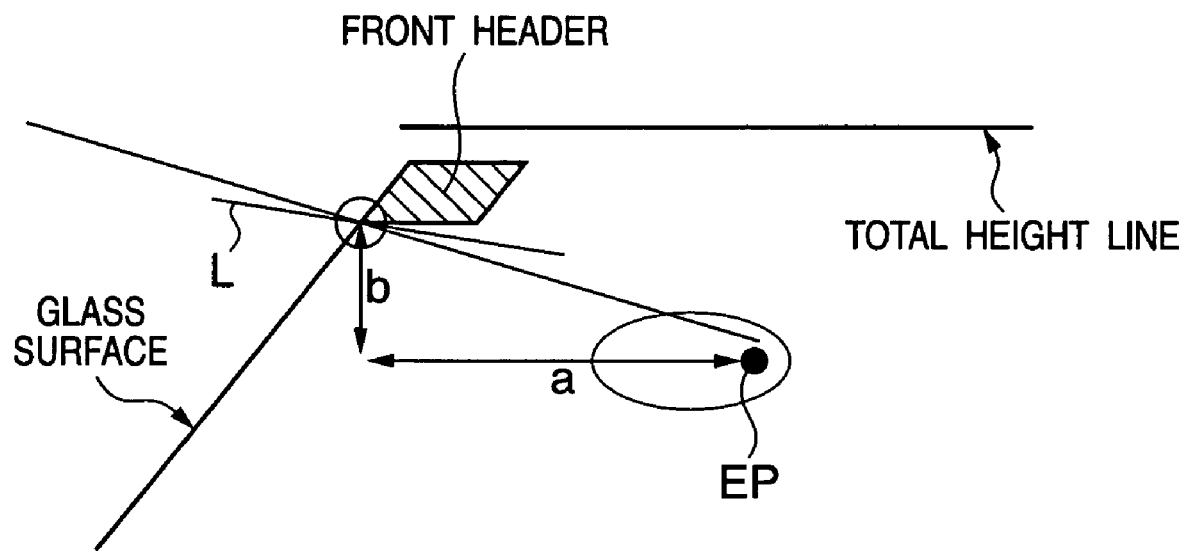
FIG. 18 is a view for explaining a method of determining the horizontal and vertical positions of a front header of a vehicle reference model.
Figure 19:
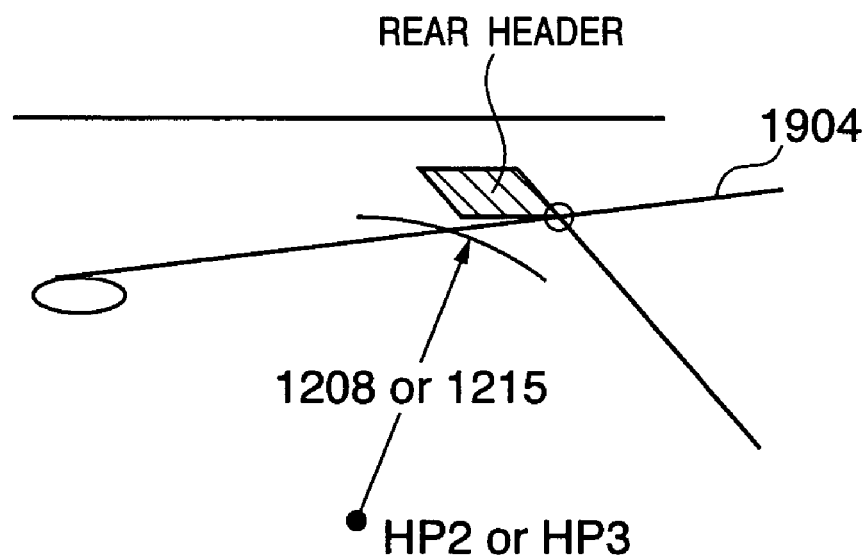
FIG. 19 is a view for explaining a method of determining the horizontal and vertical positions of a rear header of a vehicle reference model.

FIG. 18 is a view for explaining references for the horizontal and vertical positions of the front header of the reference model, and FIG. 19 is a view for explaining references for the horizontal and vertical positions of the rear header of the reference model. As shown in FIG. 18, the horizontal and vertical positions of the front header are determined to have, as one of vertices, an intersection between a line that makes the predetermined acute angle 1301 upward from the horizontal direction to have the eye point EP as the center, and a parallelogram having a glass plane as one side as the lowest position of the front header. At this time, the front header must be located above a line L as a reference for oppressive feeling. Note that the vehicle width direction position of the front header is set at the vehicle width center W.

Also, as shown in FIG. 19, the horizontal and vertical positions of the rear header are restricted to be located above a line 1904 which makes a predetermined infinitesimal acute angle upward from the horizontal direction to have the eye point EP as the center, and above a head clearance (the distance 1208 or 1215 from HP2 or HP3) of a rearmost-row seat passenger.

Note that the detailed sectional shapes of the front and rear headers are defined by the structure model to be described later.

In the aforementioned design table, parameters in the length and height directions having the front axle AF as the origin are input. However, the present invention is not limited to this, and respective pieces of position information (distances) may be input to have as an origin a point on the dash panel that divides an engine room and passenger room, a point on the bumper frontmost end, or the cowl point CW, or one of these points may be able to be selected as an origin.

Note that the reference for the interior position of the interior model varies depending on a point selected as the origin, and the degree of superimposing between the interior model and exterior model differs depending on that origin position.

That is, a point at which it is desired to minimize the interference between the interior model and exterior model upon superimposing on the exterior model is preferably selected as the origin.

<Pillar Section Input>

Figure 24:
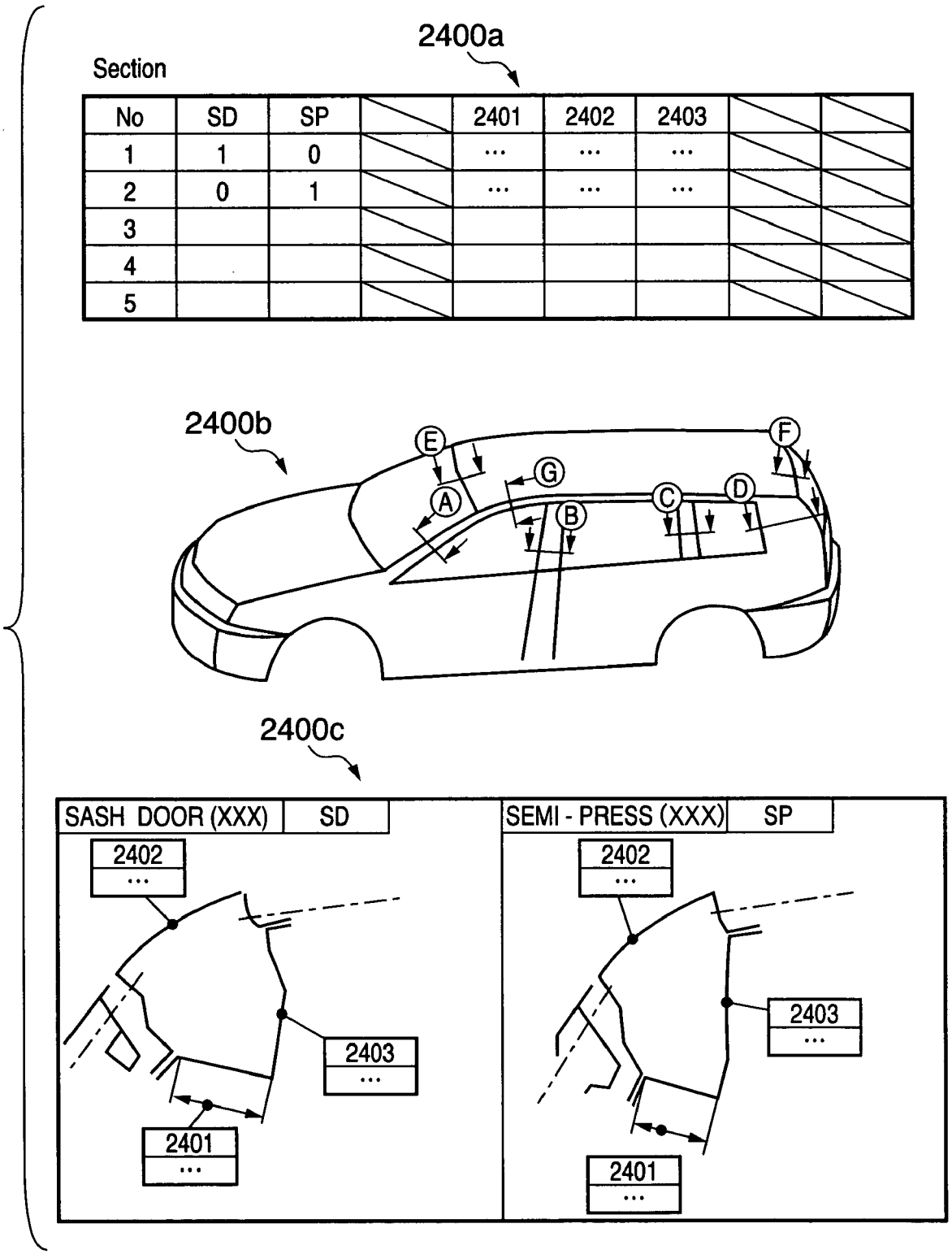
FIG. 24 exemplifies 2D and three-dimensional (3D) images that display an exterior view and sectional view of a structure model, and an input window of sectional dimensions input as parameters to the corresponding portions of these images.

FIG. 24 shows an example of a pillar sectional shape input interface included in the design table creation program 61. Reference numeral 2400*a* denotes an input table used to select a section and to input various dimensions; and 2400*b* and 2400*c*, a perspective view of the outer appearance of the vehicle and images of sections to show corresponding portions of parameters to be input to this input table, respectively.

When the vehicle type is a wagon type, as shown in FIG. 24, parameters such as a plate thickness, material, mechanical strength, weight, and the like can be input in addition to parameters 2401 to 2403 that determine the sectional shapes of the images 2400*c* for each of, e.g., a front pillar section A, center pillar section B, rear auxiliary pillar section C, rear pillar section D, front header section E, rear header section F, and side roof rail section G as a framework structure.

[Reference Model Building Program]

The reference model building program 62 generates an interior model by reading out the parameters associated with the interior dimensions, those associated with the visibility, and those associated with the under floor dimensions from the aforementioned design table. More specifically, the program 62 builds the interior model by inputting passenger parameters such as the number seats, hip point positions for respective seats, and the like, which are associated with the passengers' sitting states in the vehicle, and reading out and deforming human type models that express passengers, and seat models that express seats from the database in accordance with the input passenger parameters. In this case, the program 62 appends eye position information and visibility assurance reference range information to be assured as the visibility from the eye position to a human type model at the driver's seat position of the vehicle using the parameters associated with the visibility.

Also, the program 62 generates a tire & wheel model on the basis of the parameters associated with the exterior dimensions. Furthermore, the program 62 generates a windshield model, which has, as the lower end, the cowl point (CW) derived from the parameters associated with the exterior dimensions and, as the upper end, the front header derived based on the parameters (forward and upward visibility) associated with the visibility and the windshield angle 1109.

Then, the program 62 generates a reference model by combining these models.

The reference model building program passes the coordinate data of the generated models to the image generation/display program to display a 3D image on a display. In this state, the program receives user's inputs using the pointing device, determines a portion and its deformation contents designated by an input command, and changes coordinate data in accordance with the command.

That is, the user can deform a displayed image by selecting and moving a portion to be deformed of the 3D image displayed on the display using the pointing device such as a mouse or the like, and can simultaneously change the coordinate data in the memory in correspondence with that deformation.

In this way, the sitting posture of each passenger can be set and changed in correspondence with, e.g., the hip point and floor height. Therefore, after an optimal driving posture of a passenger, which varies depending on the category of the vehicle to be planned, is reproduced, the feasibility of packaging can be verified. Also, the driving posture can be easily tuned and verified to satisfy various requirements such as a visibility standard, safety standard, reduction of the load on the passengers, and the like.

Of course, the reference model can also be deformed by launching the design table creation program again and changing the values input to the design table.

The reference model building program can display a visibility assurance reference range determined from the driver's eye point EP in the reference model. Therefore, whether or not the visibility range as an important element upon verification of packaging feasibility of the vehicle is assured can be easily verified even from the vehicle planning stage. Hence, not only the work efficiency can be improved, but also the fear of any drastic revisions after planning can be wiped out.

The reference model building program can display at least one of the front header, rear header, pillars, and windshield lower end as an obstacle which influences assurance of the driver's field of view and that which influences the oppressive feeling of passengers in the reference model. These obstacles can be deformed and displayed in conjunction with changes in eye point EP and passenger positions to leave the visibility assurance reference range determined in advance based on the driver's eye pint EP, and the oppressive feeling suppression reference range determined in advance based on passengers. Therefore, whether or not the oppressive feeling suppression range as an important element upon verification of packaging feasibility of the vehicle is assured can be easily verified even from the vehicle planning stage. Hence, not only the work efficiency can be improved, but also the fear of any drastic revisions after planning can be wiped out.

Also, on the reference model, the bumper layout reference range corresponding to a change in front bumper upper/lower end reference position (points C1 and D1) upon changing parameters of an exterior model (to be described later) is displayed. Therefore, whether or not the upper/lower position range of the bumper as an important element upon verification of packaging feasibility of the vehicle is assured can be easily verified even from the vehicle planning stage. Hence, not only the work efficiency can be improved, but also the fear of any drastic revisions after planning can be wiped out.

Note that the interior model remains unchanged independently of an exterior parameter group selected by the exterior model building program.

[Exterior Model Building Program]

The exterior model building program 63 builds an exterior model by reading out base exterior coordinate data from the database on the basis of vehicle type data included in the design table created using the design table creation program 61, and changing the exterior coordinate data on the basis of exterior parameters (specification values) input to the design table and predetermined rules.

The exterior model building program passes the coordinate data of the generated exterior model to the image generation/display program to display a 3D image on a display. In this state, the program receives user's inputs using the pointing device, determines a portion and its deformation contents designated by an input command, and changes coordinate data in accordance with the command.

That is, the user can deform a displayed vehicle exterior image by selecting and moving a portion to be deformed of the 3D exterior model image displayed on the display using the pointing device such as a mouse or the like, and can simultaneously change the coordinate data of the exterior model in the memory in correspondence with that deformation.

That is, the exterior model building program has two deformation functions: i) comprehensive deformation for automatically deforming a comprehensive shape read out from the database on the basis of the values in the design table, and ii) local deformation for changing a local portion to be deformed designated on the display.

Rules used in these two deformation functions will be described below.

<Comprehensive Deformation Rules>

Figure 21:
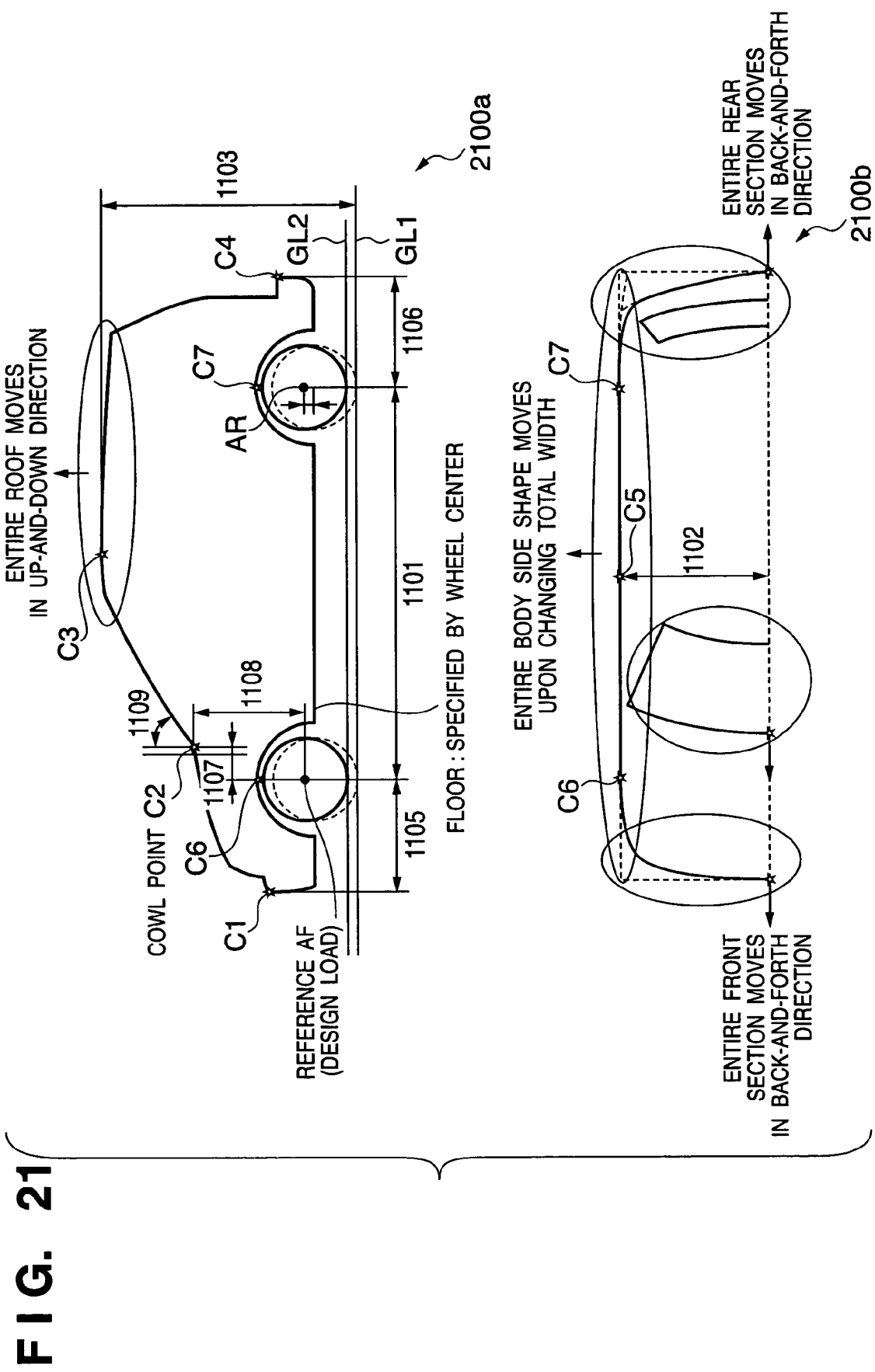
FIG. 21 is a view for explaining comprehensive deformation rules of an exterior model.

FIG. 21 is a view for explaining the comprehensive deformation rules of the exterior model.

The exterior model has a plurality of reference points C1 (bumper front end at the vehicle width center), C2 (cowl point), C3 (total height reference position at the vehicle width center (a front position about ⅓ of the roof in the back-and-forth direction)), C4 (bumper rear end at the vehicle width center), C5 (right and left wheel width reference positions), C6 front wheel housing on a vertical line that passes through the front axle), and C7 (rear wheel housing on a vertical line that passes through the rear axle). These positions are determined in accordance with exterior parameters input to the design table. The points C1 to C4 are set at the vehicle width center.

The reference points C1 and C4 are used as total length definition points upon defining the total length set at the center of the vehicle width direction and at the most projecting positions of the front and rear bumpers in the back-and-forth direction.

The reference point C2 is used as a cowl point definition point upon defining the cowl point (box) height set at the center in the vehicle width direction and at the lower end of the windshield.

The reference point C3 is used as a total height definition point upon defining the total height set at the center in the vehicle width direction and at a specific position on the roof panel.

The points C5 are used as total width definition points upon defining the total width set at the most projecting positions of the right and left side surfaces of the vehicle body in the vehicle width direction.

The points C6 and C7 are used as overhang definition points upon defining four front and rear overhangs set at the centers of the wheel housings of the right and left side surfaces of the vehicle body.

When the wheel base 1101, total width 1102, total height 1103, front overhang 1105, rear overhang 1106, horizontal and vertical positions 1107 and 1108 of the cowl point CW, and windshield slope 1109 are input or changed, these reference points C1 to C7 move in the up-and-down direction in conjunction with the external model in accordance with the changed parameters while movements in the back-and-forth direction are restricted as undeformable portions which are not interlocked with the exterior model.

That is, the exterior specification values input to the design table include values for determining the coordinate position of the definition point C3 which is set at the center in the vehicle width direction and at the specific position on the roof panel, those of the definition points C1 and C4 which are set at the most projecting positions of the front and rear bumpers in the back-and-forth direction, those of the definition points C5 which are set at the most projecting positions of the vehicle body side surfaces in the vehicle width direction, that of the definition point C2 (CW) which is set at the center in the vehicle width direction and at the lower end of the windshield, and those of the definition points C6 and C7 which are set at the centers of wheel housings formed on the vehicle body side surfaces in the back-and-forth direction.

In other words, the coordinates of only these definition points are directly determined in accordance with the specification values input to the design table, and the coordinates of other points included in the exterior model are obtained by calculations on the basis of these definition points, and rules prepared in advance for each vehicle. For example, the coordinates of the points C3 and C4 are defined by the total height 1103, wheel base 1101, and rear overhang 1106 input to the design table, and lines which connect among them are automatically derived by calculations.

When the total height 1103, total width 1102, or wheel base 1101 is changed as a parameter (specification value of the vehicle) of the reference model, as indicated by 2100a, the exterior model moves in the up-and-down direction while maintaining the roof panel shape. Whether or not the slope angle 1109 of the windshield and the length of the roof panel in the back-and-forth direction are changed upon movement and deformation of the roof panel is determined depending on the vehicle types.

That is, when the vehicle type=sports type is selected as the exterior model, and the specification value of the total height 1103 is changed, the lengths of the windshield and roof panel in the back-and-forth direction preferentially and automatically deform while maintaining the windshield slope angle 1109. When the vehicle type=minivan type is selected, and the specification value of the total height 1103 is changed, the lengths of the windshield and roof panel in the back-and-forth direction automatically deform while preferentially changing the windshield slope angle 1109.

Also, as indicated by 2100b, the entire windshield and rear window move in the back-and-forth direction in accordance with the total length (1101+1105+1106) and the horizontal position 1107 of the cowl point CW as the vehicle specification values, while maintaining the shapes of the entire front and rear sections and the windshield and rear window of the exterior base model corresponding to the vehicle type in the database.

When the upper end of the windshield is changed upon movement and deformation of the roof panel in the up-and-down direction, the front header defined in the reference model is set not to follow such input or change, so that the visibility assurance reference range and oppressive feeling suppression reference range, which are determined in advance for the head of a passenger (eye point EP) similarly defined in the reference model, can be verified. Also, portions which are not directly related to these verification items and portions which must be changed in correspondence with the deformation of the exterior model are set to automatically deform.

Figure 35A:
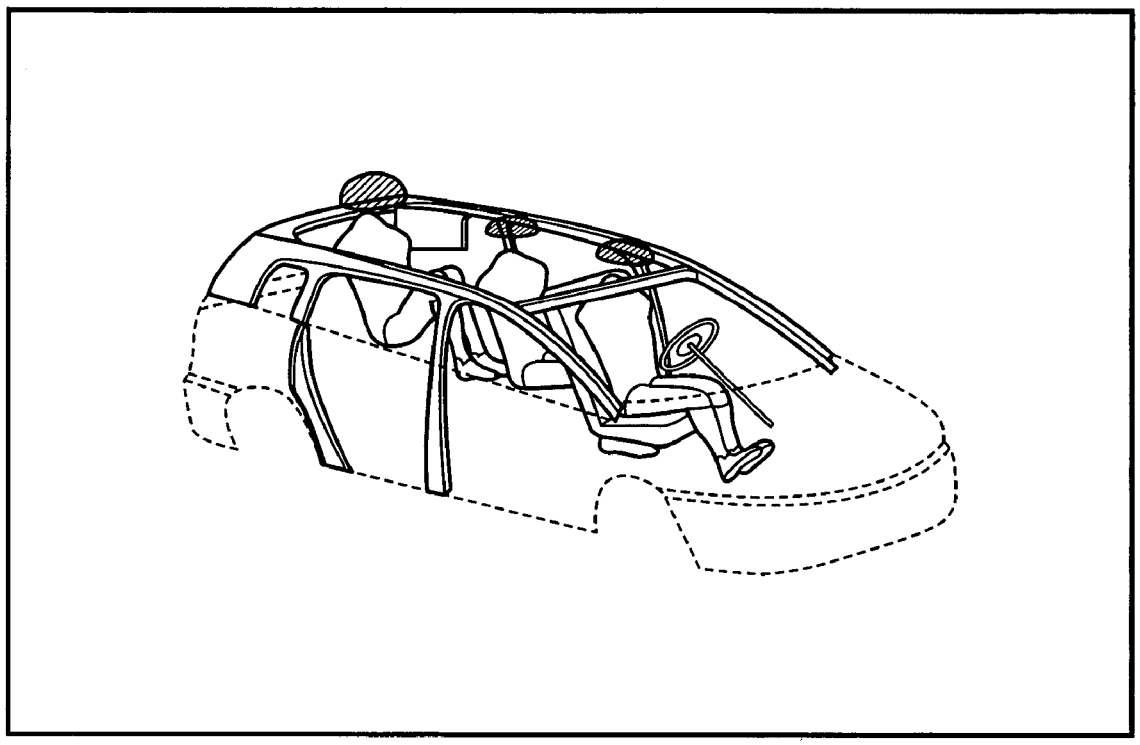
FIG. 35A shows a display screen example that displays an exterior model before its total height is changed as a front perspective view.
Figure 35B:
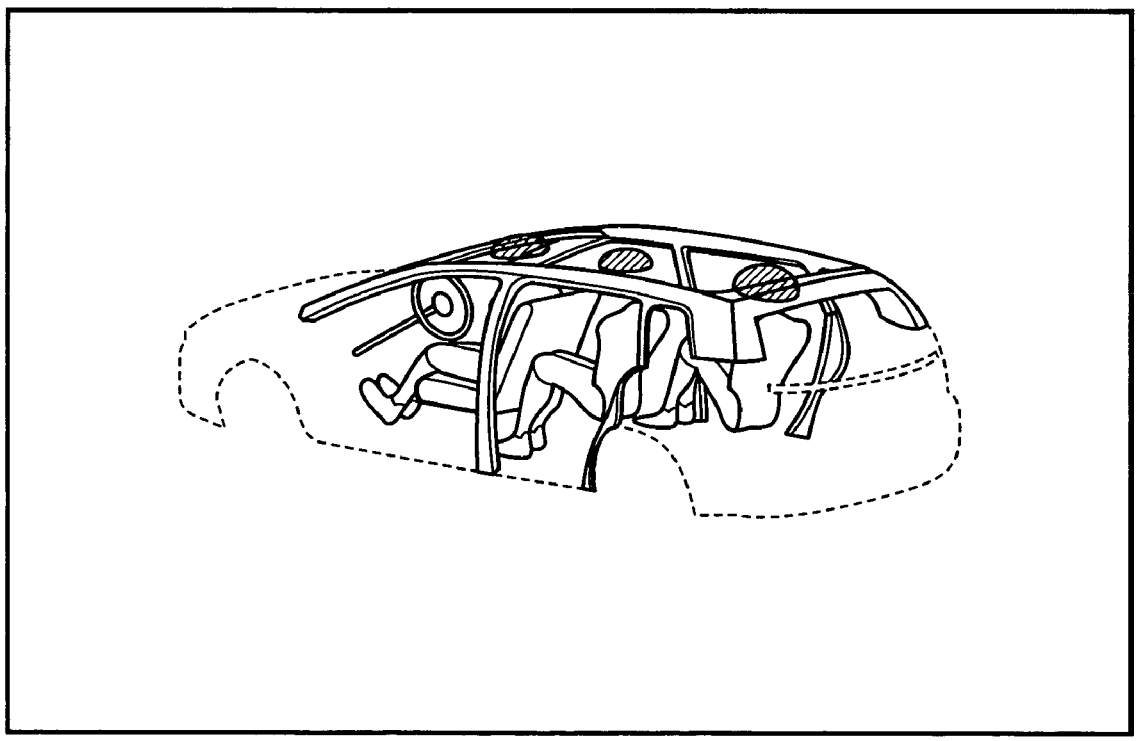
FIG. 35B shows a display screen example that displays an exterior model before its total height is changed as a rear perspective view.
Figure 36A:
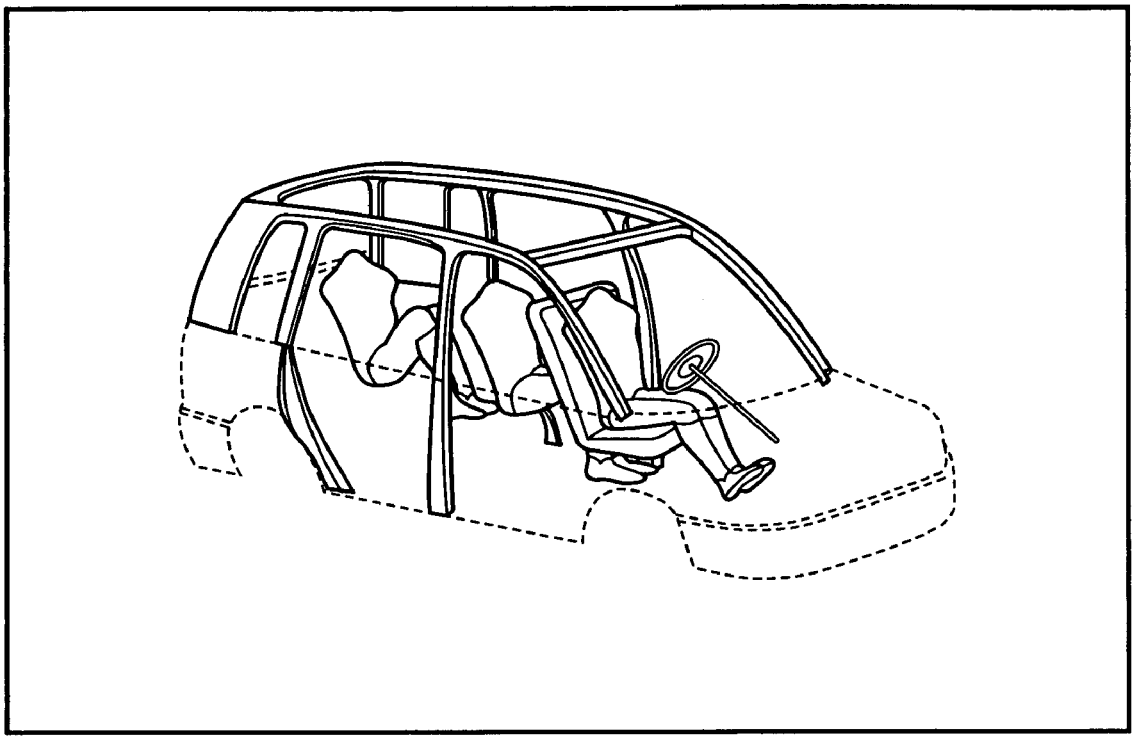
FIG. 36A shows a display screen example that displays an exterior model after its total height has been changed according to the deformation rules from the state shown in FIG. 35A as a front perspective view.
Figure 36B:
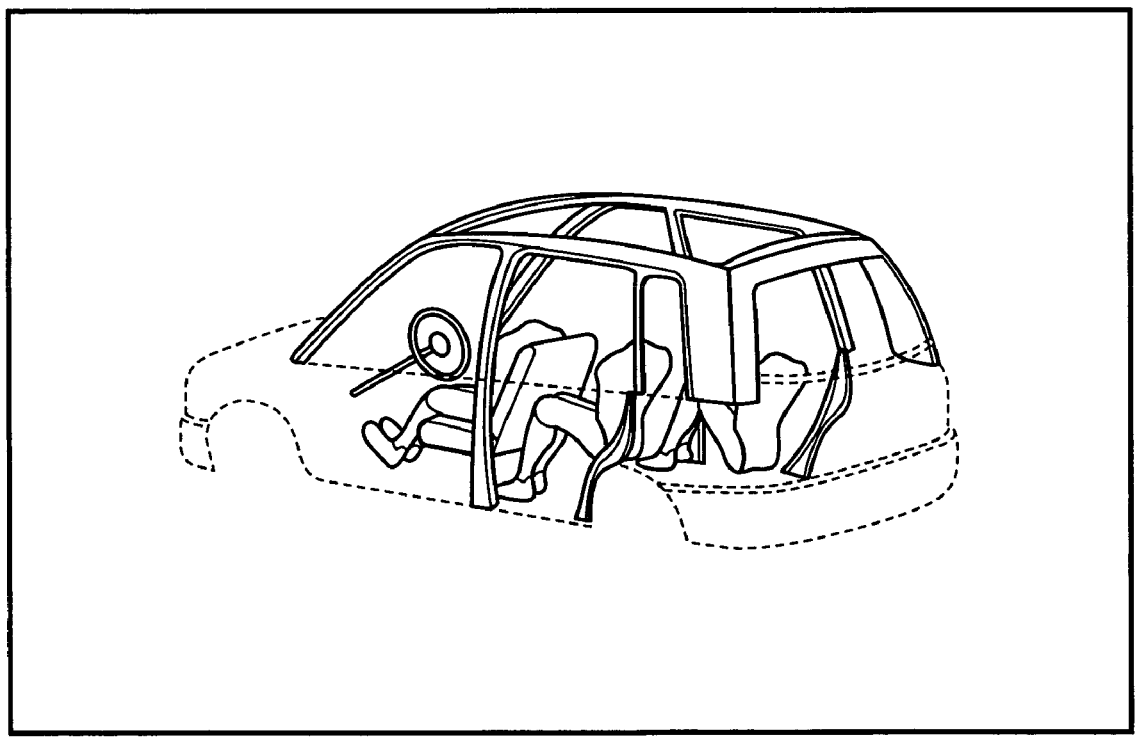
FIG. 36B shows a display screen example that displays an exterior model after its total height has been changed according to the deformation rules from the state shown in FIG. 35A as a rear perspective view.

FIGS. 35A and 35B show display screen examples that display the exterior model before its total height is changed as front and rear perspective views, and FIGS. 36A and 36B show display screen examples that display the exterior model after its total height has been changed according to the deformation rules from the states shown in FIGS. 35A and 35B as front and rear perspective views. For example, when the total height 1103 is increased (decreased), the exterior model is automatically deformed so that its entire roof moves upward (downward) together with the point C3 and the windshield slope 1109 decreases (increases) since the cowl point CW is fixed in position, in 2100a of FIG. 21. On the other hand, when the total width 1102 is increased (decreased), the exterior model is automatically deformed so that its entire body side surface moves in the vehicle width direction together with the points C5 to C7 and the entire body becomes large (small) in the width direction since the reference points C1 to C4 are fixed in position, in 2100b of FIG. 21.

Figure 31A:
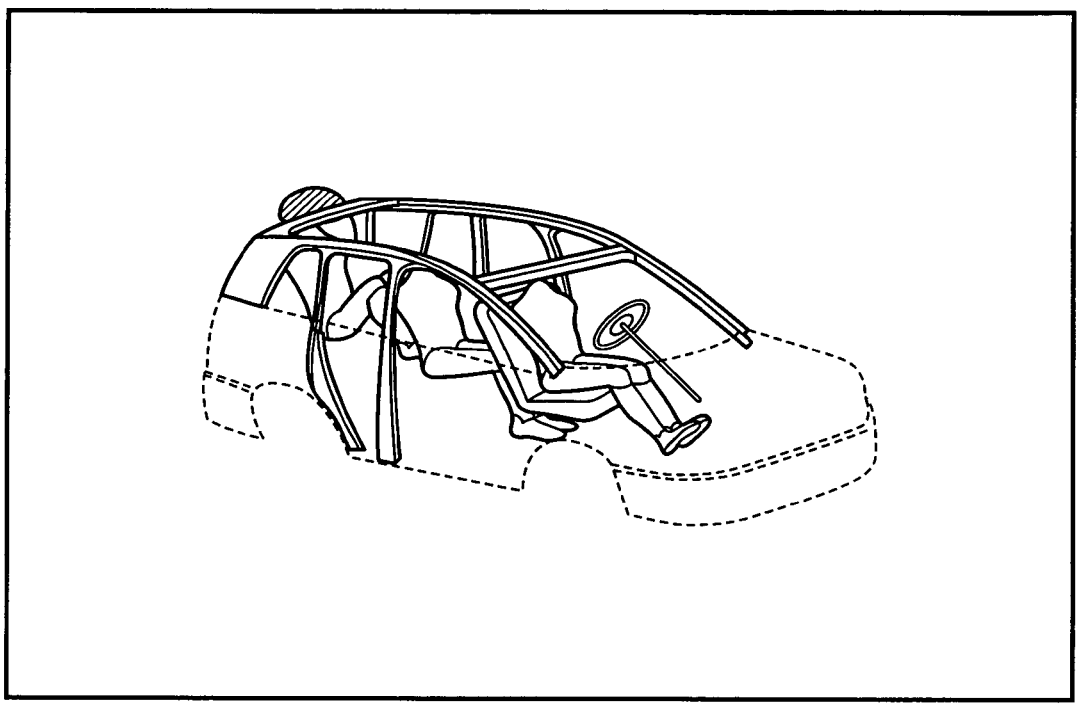
FIG. 31A shows a display screen example that displays an exterior model before its wheel base is changed as a front perspective view.
Figure 31B:
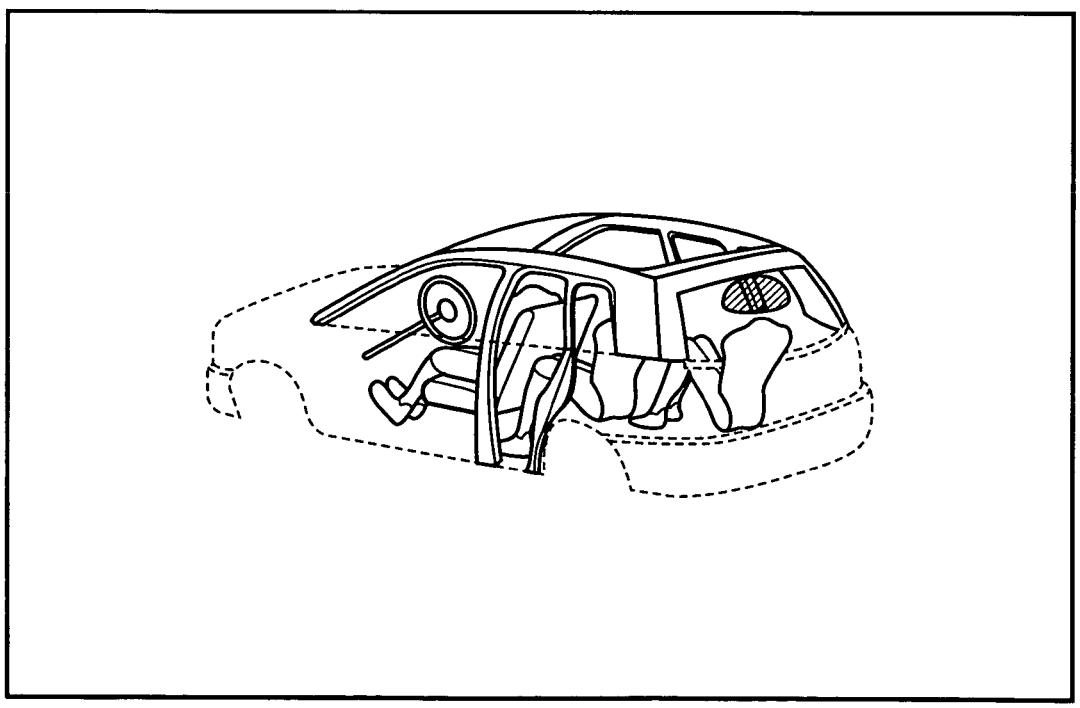
FIG. 31B shows a display screen example that displays an exterior model before its wheel base is changed as a rear perspective view.
Figure 32A:
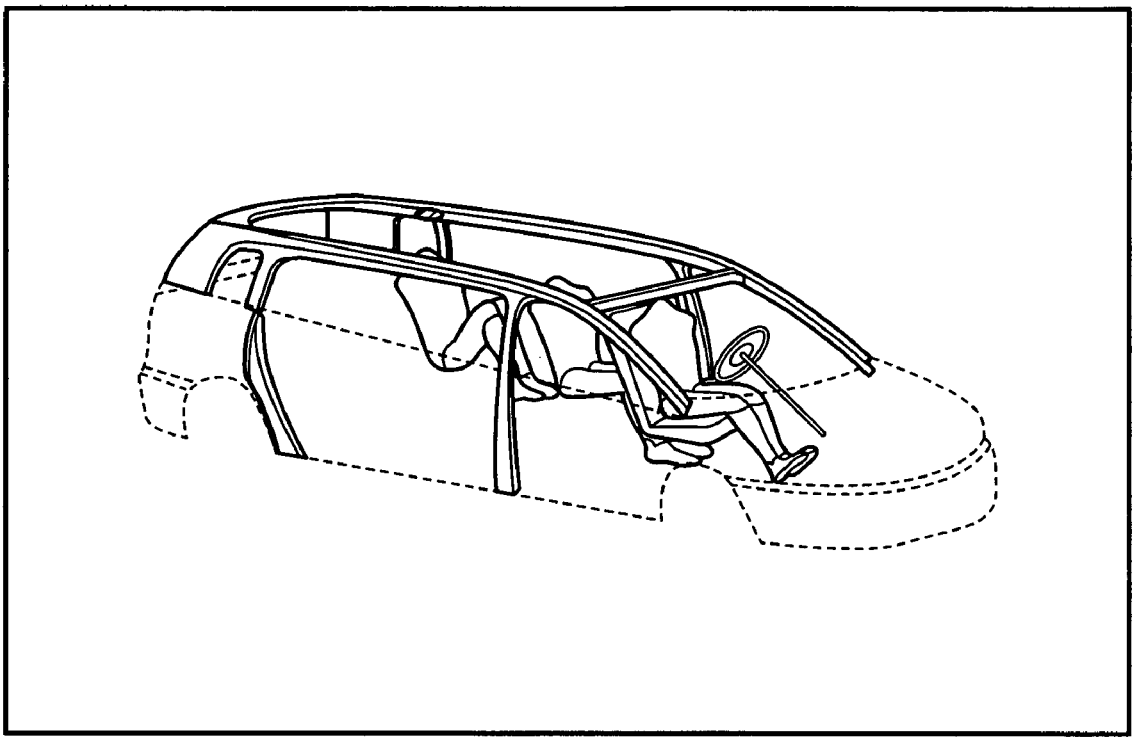
FIG. 32A shows a display screen example that displays an exterior model after its wheel base has been changed according to the deformation rules from the state shown in FIG. 31A as a front perspective view.
Figure 32B:
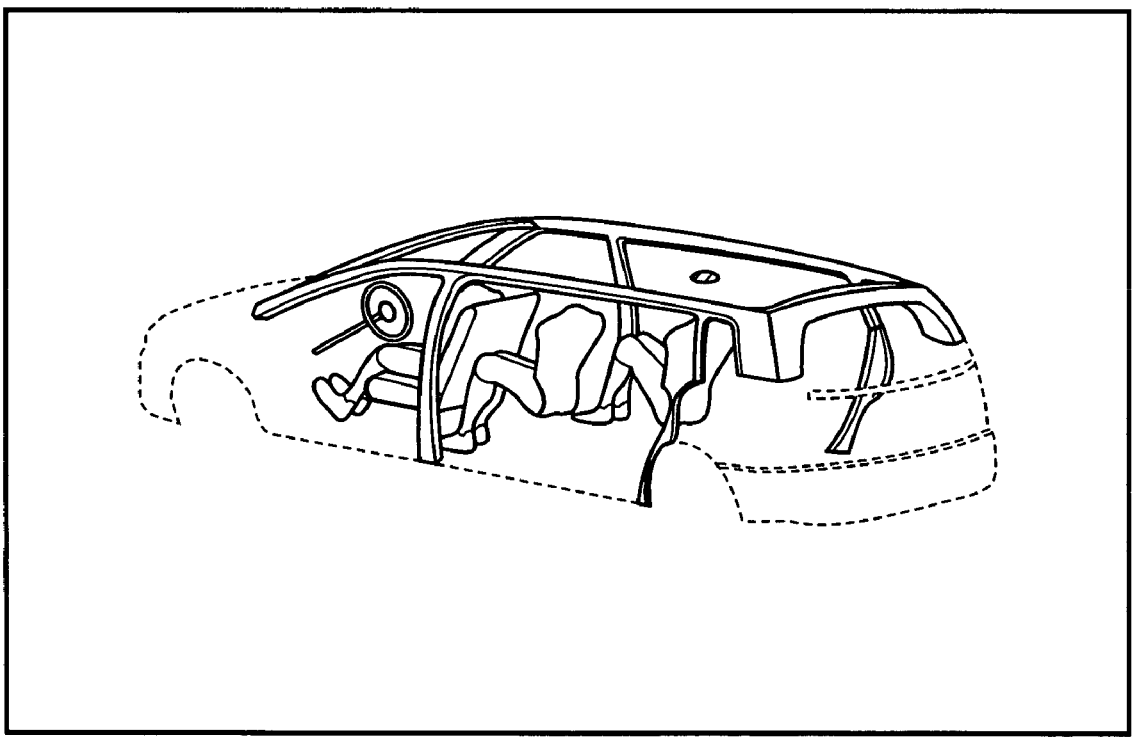
FIG. 32B shows a display screen example that displays an exterior model after its wheel base has been changed according to the deformation rules from the state shown in FIG. 31B as a rear perspective view.

FIGS. 31A and 31B show display screen examples that display the exterior model before its wheel base is changed as front and rear perspective views, and FIGS. 32A and 32B show display screen examples that display the exterior model after its wheel base has been changed according to the deformation rules from the states shown in FIGS. 31A and 31B as front and rear perspective views. For example, when the wheel base 1101, front overhang 1105, or rear overhang 1106 is increased (decreased), the exterior model is automatically deformed so that the front or rear section of the exterior model moves forward (backward) together with the reference point C1 or C4 and the entire body becomes large (small) in the back-and-forth direction since the cowl point CW is fixed in position, in 2100a and 2100b of FIG. 21.

Since the exterior model is automatically deformed and displayed by inputting only the specification values of the planned vehicle, the verification process can be easily and efficiently done.

Since deformation rules optimal to each vehicle type are set, the model shape upon deformation can be displayed as a practical one, thus improving the verification precision. In addition, manual changes in model shape can be reduced, thus greatly improving the work efficiency.

In the reference model, the front header, which is important upon evaluating the oppressive feeling and visibility, is set not to follow input or changed specification values, and portions which are not directly related to these verification items and portions which must be changed in correspondence with the deformation of the exterior model are set to automatically deform, thus improving the verification efficiency.

Also, since different deformation rules are adopted for respective vehicle types of exterior models, the automatically deformed model shape can more closely simulate a practical one, and manual corrections that may be required later can be reduced. More specifically, in the sports type, since the aerodynamics must be improved rather than the interior comfort, it is not practical to deform an exterior model with a relatively large windshield slope angle in correspondence with a change in specification value that increases the total height. However, in case of the minivan type, since it is practical to give priority to the interior over the aerodynamics, such change can assure high workability.

Upon deforming a model in correspondence with the input or changed specification values, a model fully reflecting an image of the vehicle to be planned can be automatically and easily created. On the other hand, since the definition points serve as minimum required specification values upon determining an overview of the vehicle, a vehicle close to an image can be automatically displayed upon deformation by only inputting these specification values.

More specifically, upon planning of a vehicle, since detailed specification values are not available, if the number of specification values to be input is large, not only the input operation itself becomes troublesome, but also a vehicle with a shape based on user's stereotypes is more likely to be designed, thus disturbing planning of a free, creative vehicle. The present invention allows the user to plan a creative vehicle free from any stereotypes, and can suppress manual corrections after display as much as possible.

Again, since the cowl point definition point is set, whether or not the cowl point and a bonnet are to synchronously deform upon deforming a model in correspondence with a change in, e.g., total height can be set due to the presence of this cowl point definition point. Hence, since the model automatically deforms in accordance with an image of the vehicle model, efficient planning and verification processes can be made.

Also, since the overhang definition points are set, whether the passenger room alone deforms or the overhangs deform together upon changing the total length can be selected. Hence, since the model automatically deforms in accordance with an image of the vehicle model, efficient planning and verification processes can be made.

<Local Deformation Rules>

<<Move by Designating Point>

Figure 22:
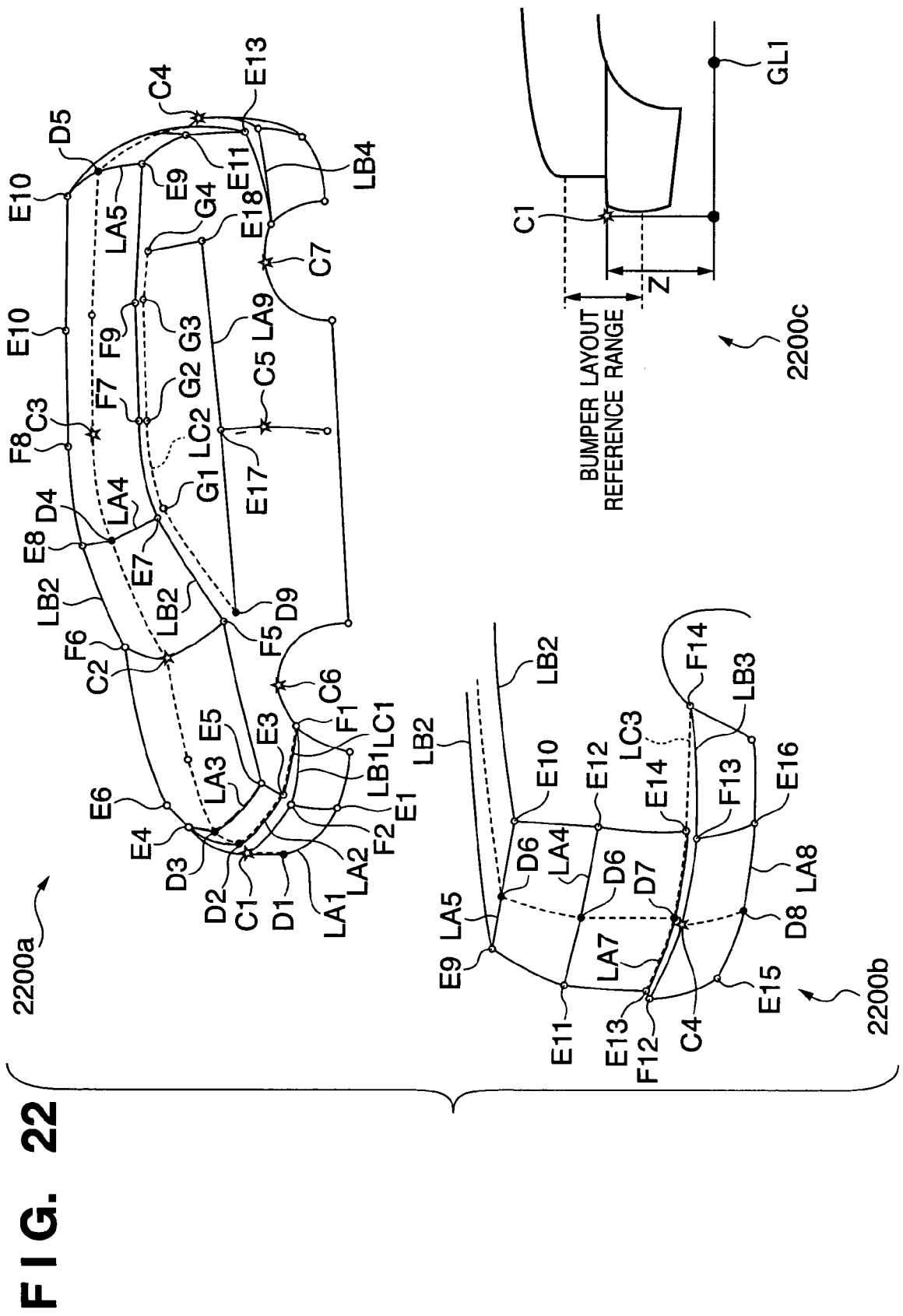
FIG. 22 is a view for explaining local deformation rules of an exterior model.

FIG. 22 is a view for explaining the local deformation rules of an exterior model. In addition to the above reference points C1 to C7 (points whose movement in the back-and-forth (horizontal) direction is restricted but movement in the up-and-down (vertical) direction is allowed), first local deformation points D1 to D9 which can arbitrarily move in the back-and-forth, right-and-left, and up-and-down directions, and second local deformation points E1 to E18 which move to follow arbitrary movements of the first local deformation points D1 to D9 in correspondence with their moving amounts while maintaining the relative positional relationships with the first local deformation points D1 to D9 are further set in the exterior model. The first local deformation points D1 to D9 are set at the vehicle width center.

The first local deformation point D1 is set at the lower end of the front bumper at the vehicle width center. The point D2 is set at the boundary between the front end face of the front bumper at the vehicle width center, and a front end face formed by a front grille and head lamps. The point D3 is set at the front end of the bonnet at the vehicle width center. The point D4 is set at the upper end of the windshield at the vehicle width center. The point D5 is set at the upper end of the rear window at the vehicle width center. The point D6 is set at the lower end of the rear window at the vehicle width center. The point D7 is set at the boundary between the upper end face of the rear bumper at the vehicle width center, and a rear end face formed by a rear panel and tail lamps. The point D8 is set at the lower end of the rear bumper at the vehicle width center. The points D9 are set at corner portions which form outlines of right and left side windows.

The second local deformation points E2 and E1 are set at right and left side portions which form an outline LA1 of the lower end of the front bumper to have the point D1 as the vehicle width center. The points E4 and E3 are set at right and left side portions which form an outline LA1 of the boundary between the upper end face of the front bumper and the front end face formed by the front grille and head lamps to have the point D2 as the vehicle width center. The points E6 and E5 are set at right and left side portions which form an outline LA3 of the front end portion of the bonnet to have the point D3 as the vehicle width center. The points E8 and E7 are set at right and left corner portions which form an outline LA4 of the upper end of the windshield to have the point D4 as the vehicle width center. The points E10 and E9 are set at right and left corner portions which form an outline LA5 of the upper end of the rear window to have the point D5 as the vehicle width center. The points E12 and E11 are set at right and left corner portions which form an outline LA6 of the lower end of the rear window to have the point D6 as the vehicle width center. The points E14 and E13 are set at right and left side portions which form an outline LA7 of the boundary between the upper end face of the rear bumper and the rear end face formed by the rear panel and tail lamps to have the point D7 as the vehicle width center. The points E16 and E15 are set at right and left side portions which form an outline LA8 of the lower end of the rear bumper to have the point D8 as the vehicle width center. The points E18 and E17 are set on lines which extend backward from the points D9 and form outlines LA9 of the lower ends of the right and left side windows.

In addition, when one of the pair of points E1 and E2 is moved, the other point symmetrically moves and deforms to follow it like a mirror image with reference to the point D1. Likewise, upon moving one point of each of the pairs of points E3 and E4, E5 and E6, E7 and E8, E9 and E10, E11 and E12, E13 and E14, and E15 and E16, the other point symmetrically moves and deforms to follow the moved point like a mirror image according to the same rule with reference to a corresponding one of the points D2, D3, D4, D5, D6, D7, and D8.

Also, the pairs of right and left points D9 and the points E17 and E18 on the lines LA9 symmetrically move and deform to follow one point like mirror images according to the same rule.

<<Move by Designating Line>>

Furthermore, in the local deformation rules, first local deformation lines LB1 to LB3 which can arbitrarily move in the back-and-forth, right-and-left, and up-and-down directions, a second local deformation line LC1 which moves to follow arbitrary movement of the first local deformation line LB1 of these first local deformation lines LB1 to LB3 in correspondence with its moving amount while maintaining the relative positional relationship with the first local deformation line LB1 and the line shape, and a third local deformation line LA3 which moves to follow arbitrary movement of the second local deformation line LC1 in correspondence with its moving amount while maintaining the relative positional relationship with the second local deformation line LC1 and the line shape are set.

Furthermore, second local deformation lines LC2 which move to follow arbitrary movements of the first local deformation lines LB2 in correspondence with its moving amount while maintaining the relative positional relationship with the first local deformation lines LB2 and the line shapes, and a second local deformation line LC3 which moves to follow arbitrary movement of the first local deformation line LB3 in correspondence with its moving amount while maintaining the relative positional relationship with the first local deformation line LB3 and the line shape are set.

When the second local deformation line LC1 is designated and moved, the third local deformation line LA3 moves to follow that movement, but the first local deformation line LB1 is fixed in position.

In this manner, by designating and moving the plurality of local deformation lines which are set in advance for specific portions of the exterior model, the exterior model deforms in correspondence with the moving amounts of the local deformation lines while maintaining the line shapes of the specific portions.

The first local deformation line LB1 forms an outline of the upper end of the front bumper to have the reference point C1 as the vehicle width center. On this line LB1, the reference point C1 and points F4 to F1 which define right and left side portions of the upper end of the front bumper are set.

The second local deformation line LC1 which moves to follow the first local deformation line LB1 forms an outline of the boundary between the upper end face of the front bumper, and the front end face formed by the front grille and head lamps to have the point D2 as the vehicle width center. On this line LC1, the point D2, and points E4, E3, F2, and F1 which define right and left side portions of this boundary are set.

The third local deformation line LA3 which moves to follow the second local deformation line LC1 forms an outline of the front end portion of the bonnet to have the point D3 as the vehicle width center. On this line LA3, the point D3, and the points E6 and E5 that define the right and left side portions of the front end portion of the bonnet are set.

The first local deformation lines LB2 form outlines of the right and left side roof rails. On the left line LB2, a point F5 which defines the left corner portion of the lower end portion of the windshield, the point E7 which defines the left corner portion of the upper end portion of the windshield, points F7 and F9 which define the left side roof rail of the roof panel, and the point E9 which defines the left corner portion of the upper end portion of the rear window are set.

Also, on the right first local deformation line LB2, a point F6 which defines the right corner portion of the lower end portion of the windshield, the point E8 which defines the right corner portion of the upper end portion of the windshield, points F8 and F10 which define the right side roof rail of the roof panel, and the point E10 which defines the right corner portion of the upper end portion of the rear window are set.

The right and left second local deformation lines LC2 which move to follow the first local deformation lines LB2 form outlines of the right and left side windows. On these right and left lines LC2, the points D9 and points G1 to G4 are respectively set.

Furthermore, the first local deformation line LB3 forms an outline of the upper end of the rear bumper to have the reference point C4 as the vehicle width center. On this line LB3, the reference point C4, and points F14 to F11 which define the right and left side portions of the upper end of the rear bumper are set.

The second local deformation line LC3 which moves to follow the first local deformation line LB3 forms an outline of the boundary between the rear bumper upper end face and the rear end face formed by the rear panel and tail lamps to have the point D7 as the vehicle width center. On this line LC3, the point D7, and points E14, E13, F14 and F1 which define the right and left side portions of this boundary are set.

When one of the points F1 and F4 is moved, the other point moves and deforms to follow it like a mirror image with reference to the point D1. Likewise, upon moving one point of each of the pairs of points F2 and F3, F5 and F6, F1 and F14, F12 and F13, and E15 and F16, the other point symmetrically moves and deforms to follow the moved point like a mirror image according to the same rule with reference to a corresponding one of the points C1, C2, C4, C4, and D8.

When one of the pair of local deformation lines LB2 which define the right and left roof rails is moved, the other line moves and deforms to follow it like a mirror image with reference to the points C2, C3, D4, and D5. Also, upon moving one of the local deformation lines LC2 which move to follow these local deformation lines LB2, the other line moves and deforms to follow it like a mirror image according to the same rule.

The point C1 (the vertical position of the front bumper) and point C4 (the vertical position of the rear bumper) move in the up-and-down direction in accordance with parameters set in the reference model.

In this way, by dragging and moving the first local deformation points and local deformation lines using a mouse pointer or the like, since the second and third local deformation points and local deformation lines move to follow them, the work efficiency can be improved upon partial model deformation after automatic deformation. That is, the outer appearance of the vehicle expressed on the planning level does not require so high outer appearance precision, and the overall image and layout need only be roughly verified. For this reason, in this embodiment, portions which are required to verify only the overall image and layout are selected, and functions of allowing the user to easily deform only these portions of the model are set. Hence, not only planning verification with precision as high as it is needed can be achieved, and its work efficiency can be greatly improved.

The aforementioned local deformation points and local deformation lines are set on portions which are significant for verifying the overall image of the vehicle to be planned, visibility, interior, and the like to deform the outer appearance shape of the model.

Since the functions, i.e., the first local deformation points and the second local deformation points which are interlocked with these points, are set, when the user wants to deform the entire upper end of a window, he or she need only move the first local deformation point to attain this deformation. When the user wants to deform only the two side portions, he or she need only move the second local deformation point. Hence, the work efficiency can be greatly improved.

Furthermore, since these functions are incorporated in only required portions, a program associated with the exterior model is simplified, and high-speed execution of the program is allowed.

As described above, since the exterior model undergoes comprehensive and local deformations according to the aforementioned deformation rules, the planning verification conditions can be easily changed. The aforementioned points and deformation rules are similarly defined for vehicle types other than the wagon.

Figure 23:
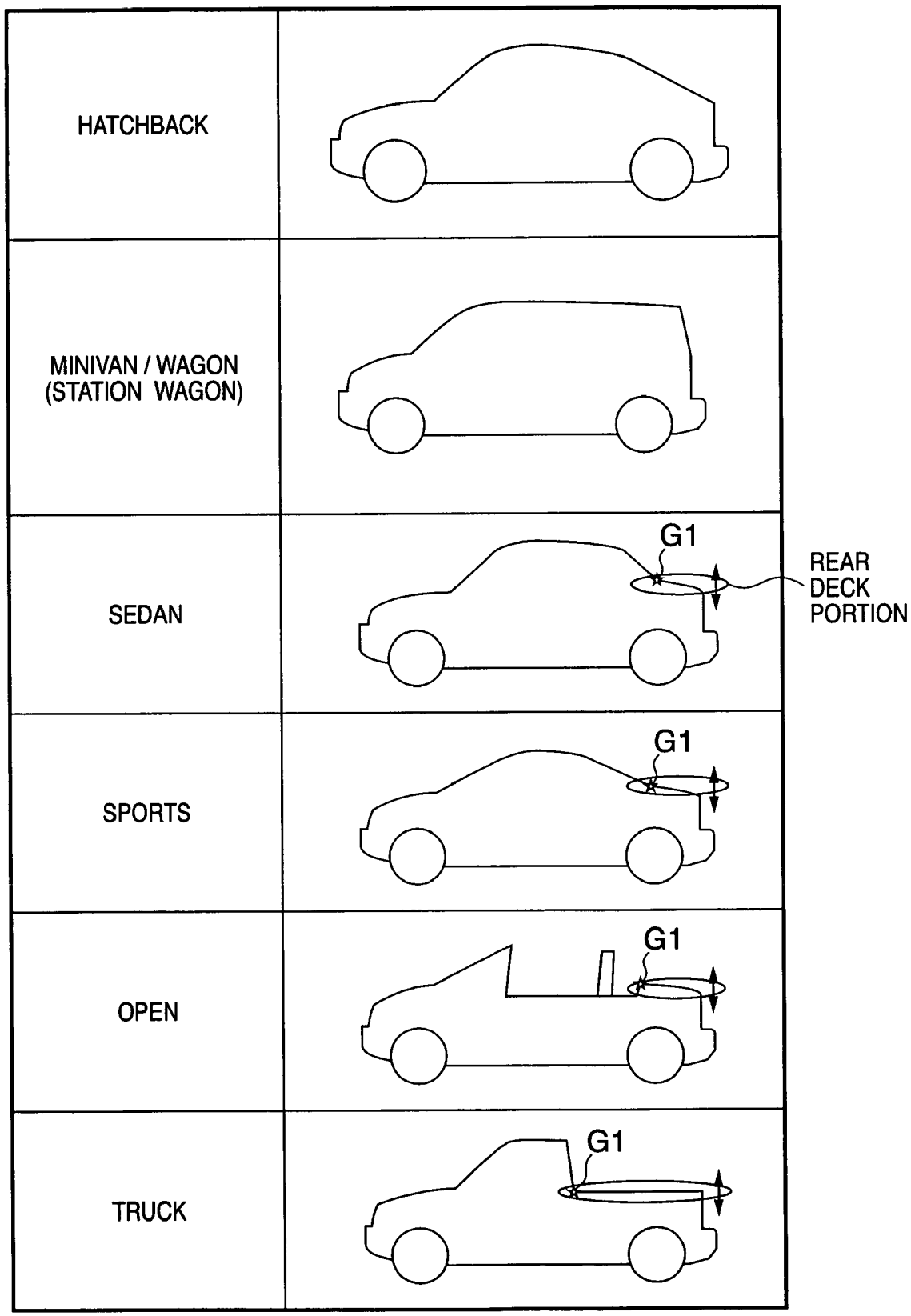
FIG. 23 is a view for explaining vehicle type deformation rules of exterior models.

In order to allow deformations suited to each vehicle type while assuring a high degree of freedom in model deformation, the deformation rules may be varied for respective vehicle types of exterior models. As exemplified in FIG. 23, as for sedan, sports, open, and truck, movement and deformation in the up-and-down direction may be effected using a rear window lower end position G1 as a reference point while holding the shapes of a rear deck portion in the back-and-forth and vehicle width directions.

According to the deformation rules, when the exterior model is to deform in synchronism with changes in parameters of the reference model, lines and planes to deform upon expressing one model must be individually defined in the conventional system. However, the need for such operations and programs can be obviated, thus improving workability and simplifying the program.

Since the exterior model automatically deforms upon changing parameters, packaging feasibility, visibility from the passenger room, and the like can be easily and quickly verified again and again under different conditions.

Note that the structure model to be described below has definition points set at the same positions as those of the exterior model, and the user's work efficiency can be improved. Also, since the mechanical strength and the like can be verified as those which nearly match the vehicle to be planned, the user need not finely change data of the mechanical strength and the like, thereby improving the verification efficiency.

[Structure Model Building Program]

The structure model building program generates 3D coordinate data of the framework structure of a vehicle by reading out the pillar structure and sectional shapes input to the design table, and passes that data to the image generation/display program to display a 3D image on the display. In addition, the program receives user's inputs using the pointing device, determines a portion and its deformation contents designated by an input command, and changes coordinate data in accordance with the command.

Since the framework shape that forms the structure model automatically deforms in correspondence with deformation of the exterior model, the structure and exterior models never deviate from each other when they are superimposed. Therefore, the interference problem between these models and the interior model can be verified with high precision.

Also, different contents of information associated with the sectional areas and mechanical strengths are set depending on size differences of the vehicle types of structure models.

Therefore, the user's work efficiency can be improved. Furthermore, since the mechanical strength and the like can be verified as those which nearly match the vehicle to be planned, the user need not finely change data of the mechanical strength and the like, thereby improving the verification efficiency.

Since the structure model has information associated with the sectional areas and mechanical strengths of the framework structure such as a vehicle body frame, pillars, and the like, packaging feasibility can be evaluated quickly. In addition, since the structure model has sectional area information of the pillars and the like, any oppressive feelings on passengers in the passenger room space may feel can be quickly verified.

Furthermore, since the structure model has mechanical strength information, the mechanical strength, crash performance, vibration evaluation, and the like of the vehicle to be planned can be quickly verified, and very high planning precision of the vehicle to be planned can be assured from the beginning of planning.

Moreover, since the structure model has information associated with the material, thickness, and weight of a steel plate, the total weight, weight balance, barycentric position, and the like of the vehicle to be planned can be verified, and the precision verification of the vehicle to be planned can be clarified in an initial stage of development, i.e., planning.

In addition, since the structure model has a plurality of framework structures of a front pillar, center pillar, rear pillar, side roof rail, front header, rear header, and the like, and at least one of the sectional area and mechanical strength (sectional shape) of each framework portion can be set and changed, the required mechanical strength, sectional area, and the like vary depending on the vehicle types (categories of vehicles such as wagon, sports, and the like). Since the sectional areas, mechanical strengths, and the like of the structure model are individually changeable, optimal packaging verification and mechanical strength verification suited to the vehicle to be planned can be made, thus assuring very high planning precision.

[Image Generation/Display Program]

<Reference Points of Model Superimpose Display>

Each of the model building programs 61 to 64 shown in FIG. 40 has a reference point designation program for designating reference positions upon superimposing respective models. With the function of the image generation/display program 65, the reference model, exterior model, and structure model are superimposed while matching their reference points (reference portions) which is set on a specific portion of the vehicle.

More specifically, the reference portion of the vehicle may be, e.g., one or a combination of the point C2 on the dash panel DP that divides the engine room and passenger room, the front wheel center, the point C2 on the frontmost end of the bumper at the vehicle width center, and the like, shown in FIG. 22.

Since the reference position upon superimposing the respective models is specified in this way, the respective models can be superimposed and verified.

Also, since the reference position upon superimposing is defined, the respective models are generated using identical references, and the verification precision upon superimposing can be improved.

If the reference portion is the point on the dash panel that divides the engine room and passenger room of the vehicle, the interference relationship between the interior and exterior shape to have the point on the dash panel as the center can be displayed, and the driver's field of view can be precisely verified.

If the reference portion is the front wheel center of the vehicle, the interference relationship between the interior and exterior shape to have the front wheel center as the center can be displayed, and the pedal positions of the driver seat which is located near the front wheel, the driver posture, and the like can be precisely verified.

If the reference portion is the frontmost end of the bumper, the interference relationship between the interior and exterior shape to have the frontmost end of the bumper as the center can be displayed, and the front portion of the vehicle can be precisely verified.

[Planning Verification Flow]

A simulation method of planning and verifying a new model vehicle using the reference model, exterior model, and structure model will be described below.

Figure 25:
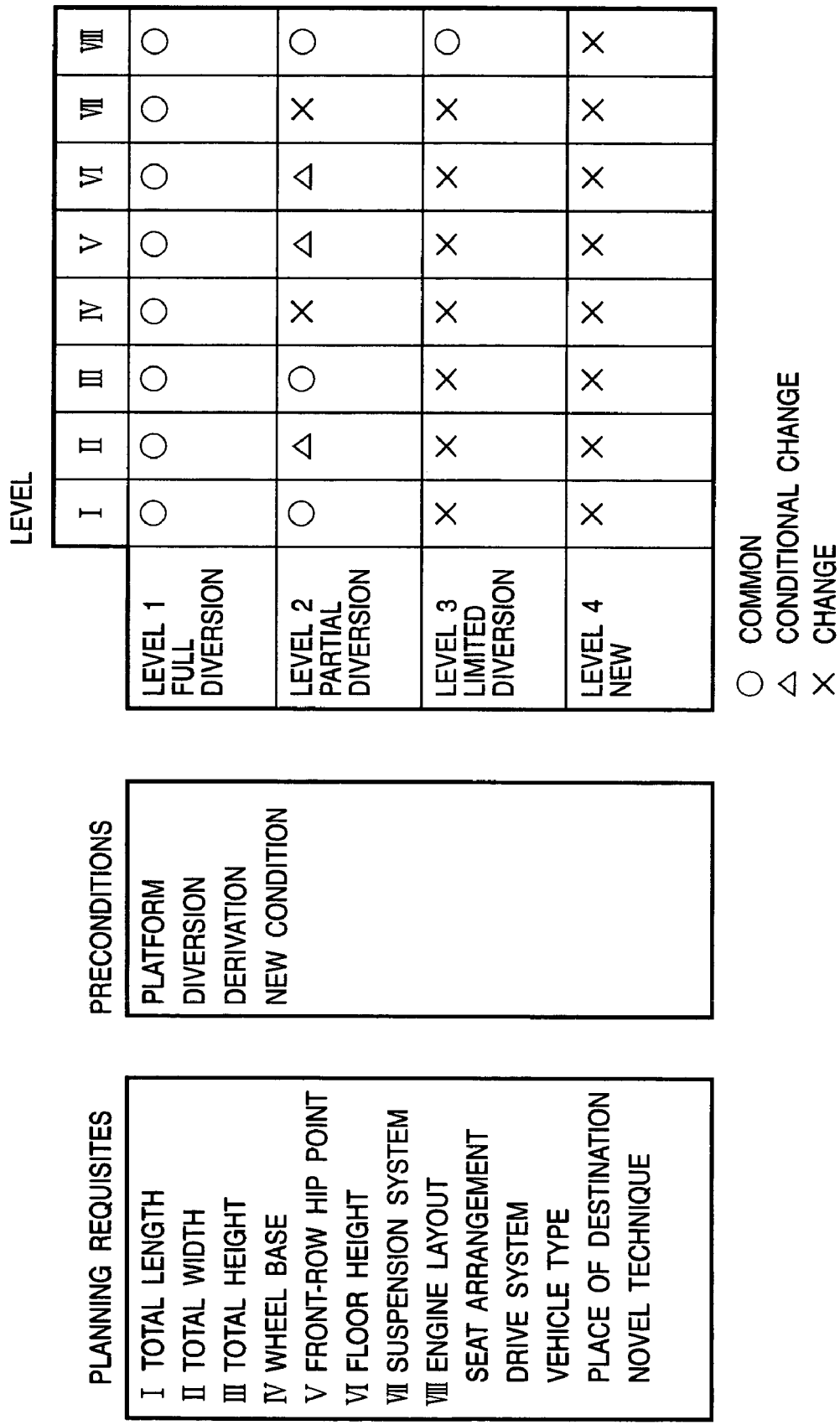
FIG. 25 is a view for explaining a planning process of a new model vehicle, which is determined before a simulation according to this embodiment.
Figure 26:
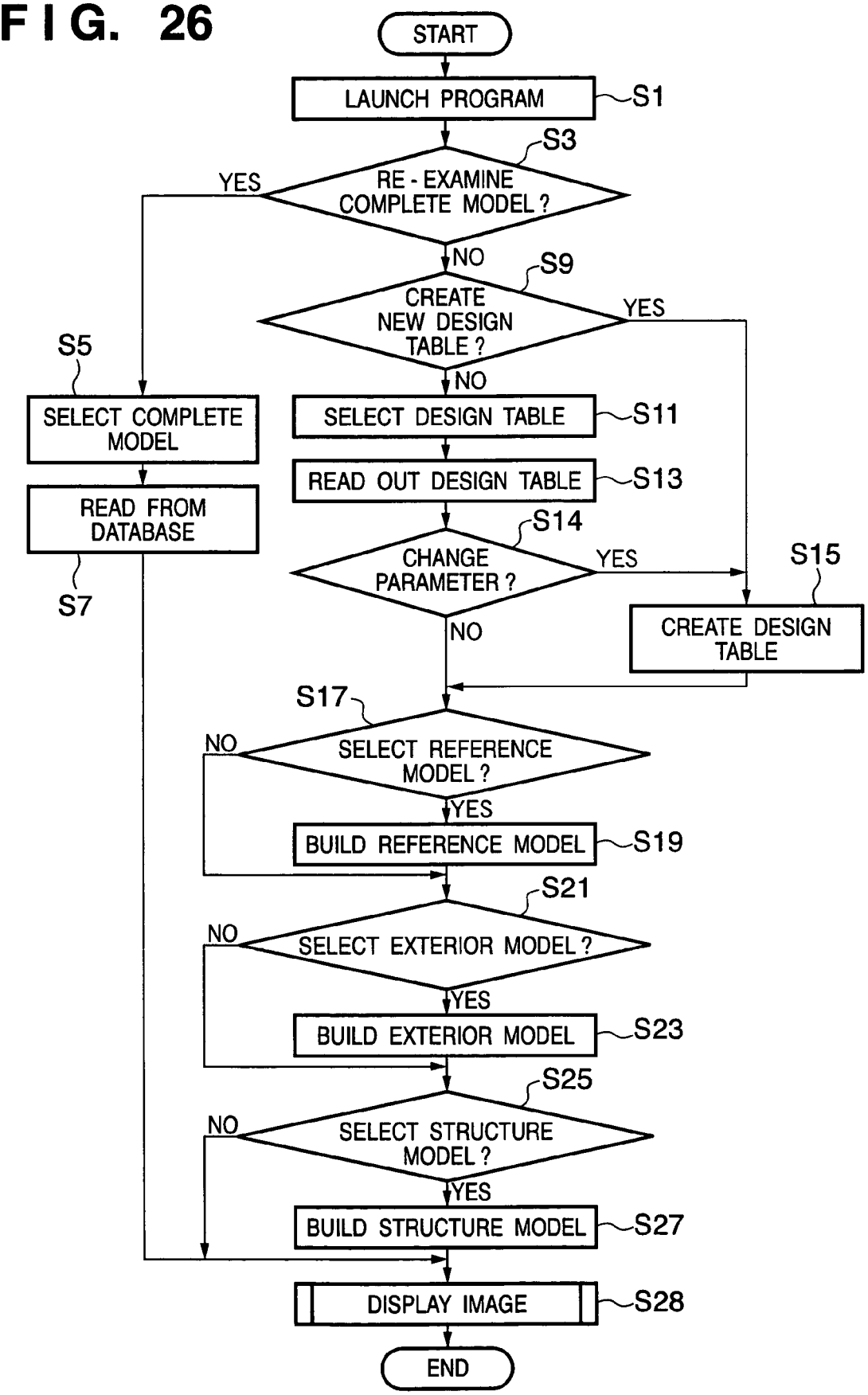
FIG. 26 is a flow chart showing a simulation method after the planning process is determined.
Figure 27:
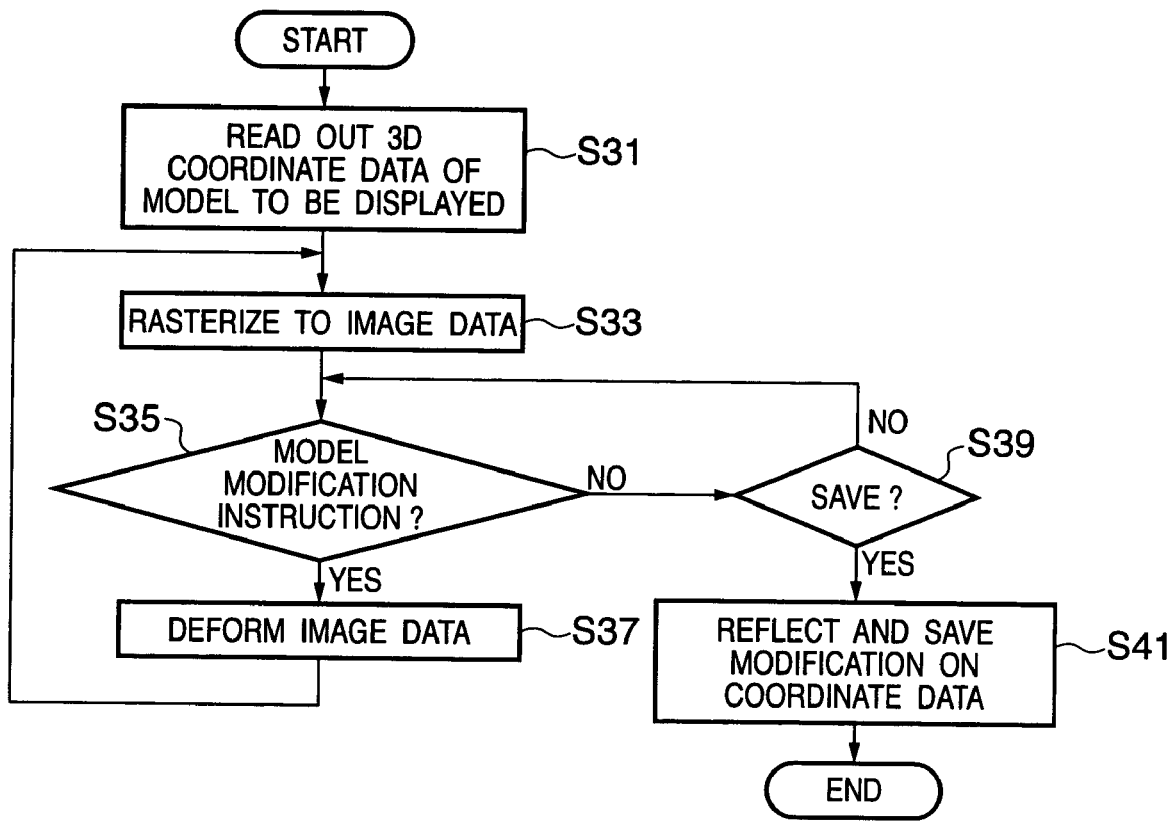
FIG. 27 is a flow chart showing a simulation method after the planning process is determined.

FIG. 25 is a view for explaining a planning process of a new model vehicle, which is determined before a simulation according to this embodiment. FIGS. 26 and 27 are flow charts showing the simulation method after the planning process is determined.

In the planning process shown in FIG. 25, planning requisites are determined. As the planning requisites, for example, the total length, total width, total height, wheel base, front-row seat hip point, floor height, suspension system, engine layout, seat arrangement, drive system, vehicle type, place of destination, other novel techniques, and the like are determined.

After that, the presence/absence of diversion of a platform, derivation from an existing vehicle model, new conditions, and the like are determined as preconditions.

These preconditions are classified into levels 1 to 3 according to the degrees of diversion of the platform, and level 4 as a new condition.

In the preconditions, level 1 corresponds to a case of platform full diversion. For example, level 1 has contents in which the total length, total width, total height, wheel base, front-row seat hip point, floor height, suspension system, engine layout, and the like are common to those of the existing vehicle model.

Level 2 corresponds to a case of platform partial diversion. For example, level 2 has contents in which the total height and engine layout are common to those of the existing vehicle model, the total width, front-row seat hip point, and floor height are conditionally changed, and the wheel base, suspension system, and the like are changed.

Level 3 corresponds to a case of platform limited diversion. For example, level 3 has contents in which only the engine layout is common to that of the existing vehicle model, and the total length, total width, total height, wheel base, front-row seat hip point, floor height, suspension system, and the like are changed.

Level 4 has contents in which all requisites, i.e., the total length, total width, total height, wheel base, front-row seat hip point, floor height, suspension system, engine layout, and the like are changed.

After the planning requisites and preconditions are determined, the planning support program is launched, as shown in FIGS. 26 and 27 to verify planning of a new model vehicle.

Figure 28:
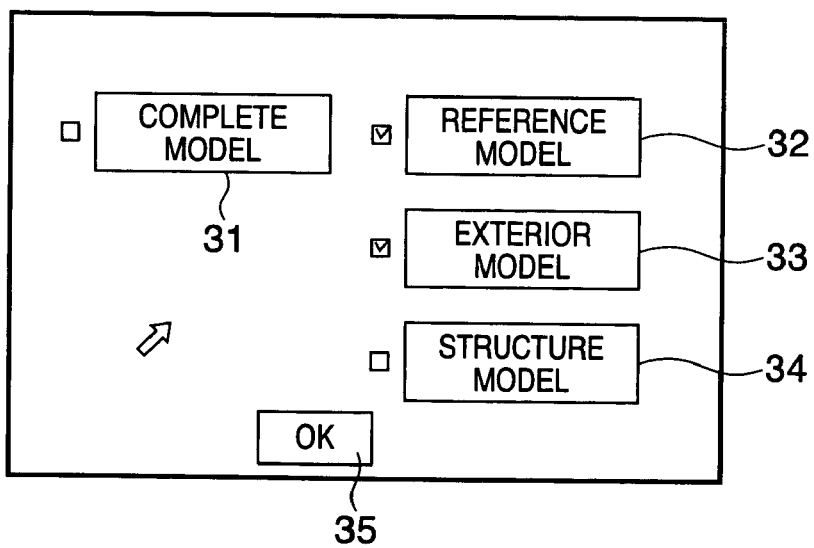
FIG. 28 shows an operation window example at the beginning of the simulation shown in FIGS. 26 and 27.
Figure 29:
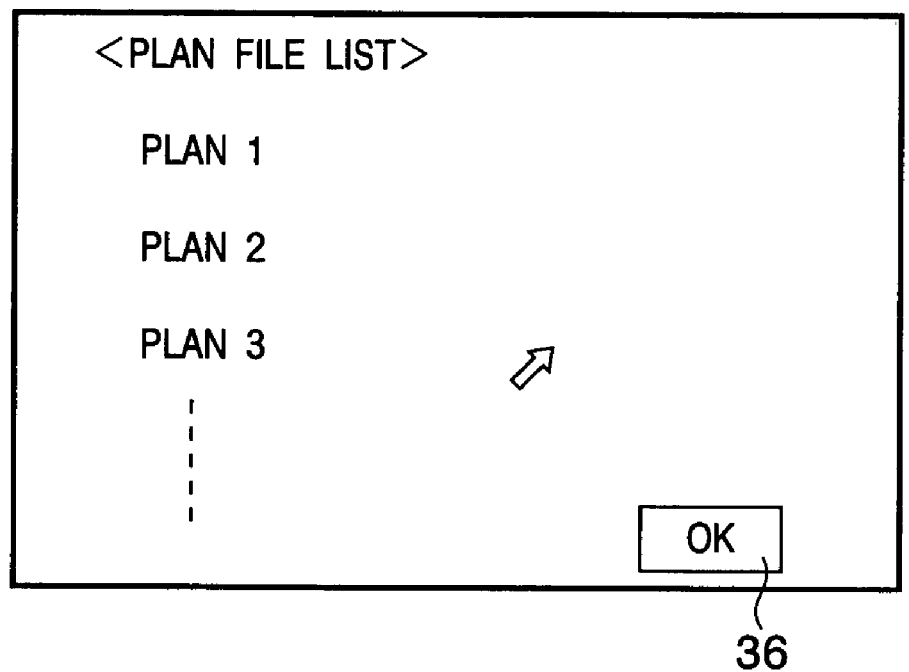
FIG. 29 shows a display screen example upon selection of a complete model button on the operation window shown in FIG. 28.

Referring to FIG. 26, the planning support program (especially, 3D CAD software) shown in FIG. 40 is read out from the external storage unit in FIG. 1, and is launched in step S1. As a result, a start screen shown in, e.g., FIG. 28 is displayed. If the user checks a check box of "complete model" 31 and presses an OK button 35, the flow advances from step S3 to step S5, and a review process of a complete model that has already undergone planning verification starts. In step S5, a list of plurality of plan files stored in the database as complete models is displayed on the screen, as shown in FIG. 29. If the user selects one of the plan files and clicks an OK button 36, the flow advances to step S7 to read out the designated complete model from the database. The flow then advances to step S28 to display an image of the complete model.

Figure 30:
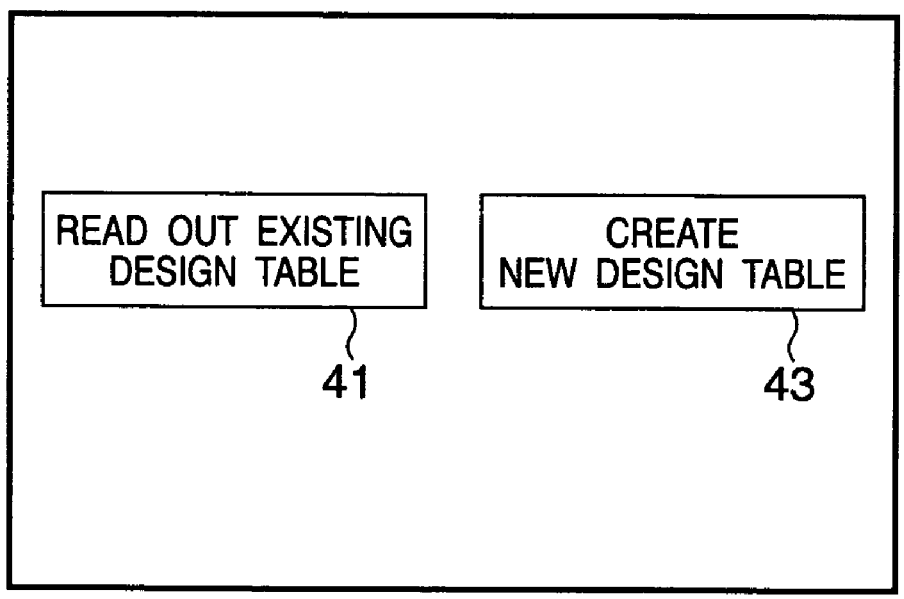
FIG. 30 shows a display screen example upon selection of a reference model button on the operation window shown in FIG. 28.

If a model other than "complete model" is selected on the screen of FIG. 28, since a new model is built from a design table, a screen shown in FIG. 30 is displayed to prompt the user to select whether the existing design table is read out or a new design table is created.

If the user selects a new design table creation button 43, the flow advances from step S9 to step S15, and the design table creation program is launched to input numerical values to respective parameters.

If the user selects an existing design table read-out button 41 in FIG. 30, the flow advances from step S9 to step S11 to start a design table select process. In this process, a design table stored in the database or a local external storage unit is specified. In this case, a design table which contains all parameters of an existing vehicle, a design table which contains parameters of only a platform, or a design table which is completed partially may be selected.

If one design table is selected in step S11, the selected design table is read out in step S13.

It is confirmed with the user in step S14 if parameters must be input to or changed in the design table. If the parameters need neither be input nor changed, the flow directly advances to step S17.

If the parameters must be input or changed, the flow advances to step S15 to launch the design table creation program, to open the selected table read out in step S13, and to input numerical values to the parameters.

In steps S17 to S27, the model selected on the screen of FIG. 28 is built. In FIG. 28, one or a combination of a reference model, exterior model, and structure model can be selected.

Upon completion of reading of the complete model to be displayed, or building of a reference model and/or exterior model and/or structure model, images of these models are displayed in step S28.

FIG. 27 shows the detailed process in this image display state.

The image generation/display program reads out 3D coordinate data of a model to be displayed in step S31, and rasterizes the readout data to image data in step S33. In this case, when some models are to be superimposed, they are displayed so that predetermined reference points overlap each other, and their interference state is verified. An image process may be made to display a 3D image obtained by superimposing respective models as a moving image. In such case, the visibility from the passenger room, visibility assurance reference range, and oppressive feeling suppression reference range can be evaluated in every vehicle travel scenes. Also, interference portions and mismatches among the reference model, exterior model, and structure model may be displayed in different colors, or may be displayed while generating an alert tone.

In this state, the user can issue a model modification instruction (local deformation instruction) by selecting a deformation point of the displayed model using a pointing device, and moving that deformation point.

Upon detection of the model modification instruction, the flow advances from step S35 to step S37 to deform image data. The flow then returns to step S33 to re-display the deformed image on the display.

The deformation points are prepared on all of the reference model, exterior model, and structure model, and the respective models can be deformed on a 3D image.

If the user inputs a save instruction upon completion of modification, the flow advances from step S39 to step S41, and the modification is reflected on coordinate data corresponding to the respective models to save the coordinate data. If the user issues a save instruction in the complete model display state, the data can be saved in the database.

<Verification>

The verification process in step S33 in FIG. 27 will be described below.

FIGS. 31A and 31B show display screen examples that display the exterior model before its wheel base is changed as front and rear perspective views, and FIGS. 32A and 32B show display screen examples that display the exterior model after its wheel base has been changed according to the deformation rules from the states shown in FIGS. 31A and 31B as front and rear perspective views. On the display screen images in FIGS. 31A and 31B, the third-row seat passenger protrudes in the rear of the vehicle, and it is visually easily verified that the wheel base or rear overhang is too short. Therefore, it is easy to determine that a change which increases the parameter of the wheel base or rear overhang is required, and the states after the wheel base has been changed can be confirmed from FIGS. 32A and 32B in real time.

Figure 33A:
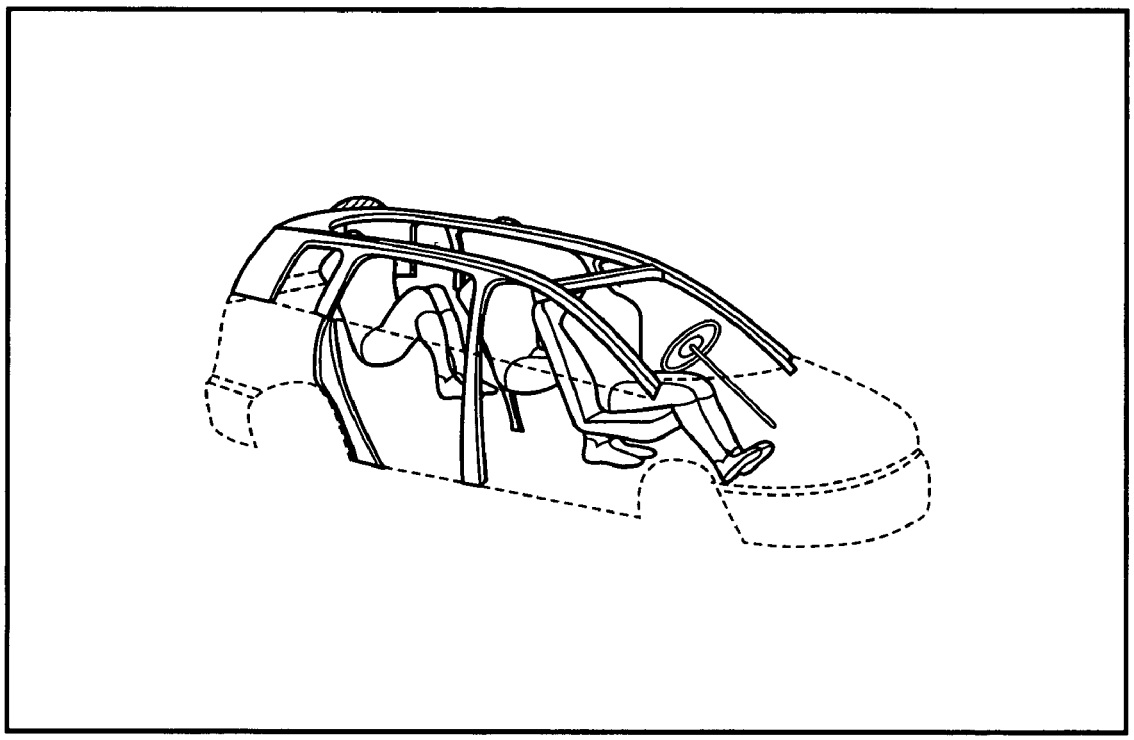
FIG. 33A shows a display screen example that displays an exterior model before its vehicle width is changed as a front perspective view.
Figure 33B:
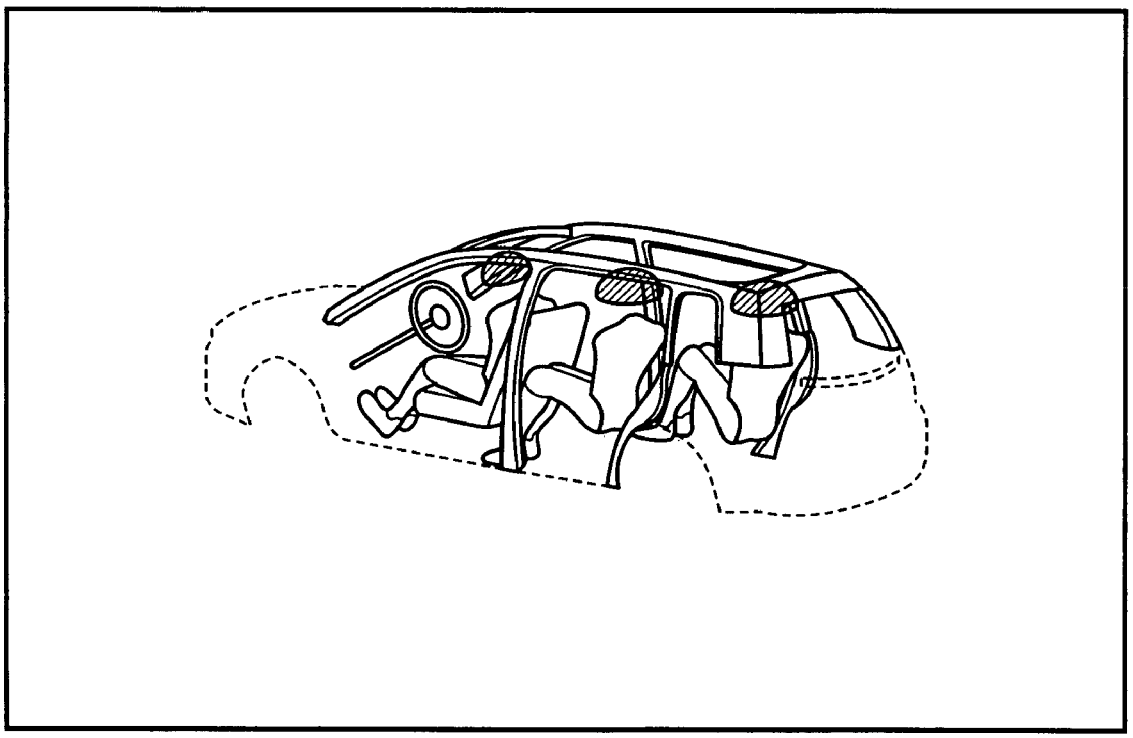
FIG. 33B shows a display screen example that displays an exterior model before its vehicle width is changed as a rear perspective view.
Figure 34A:
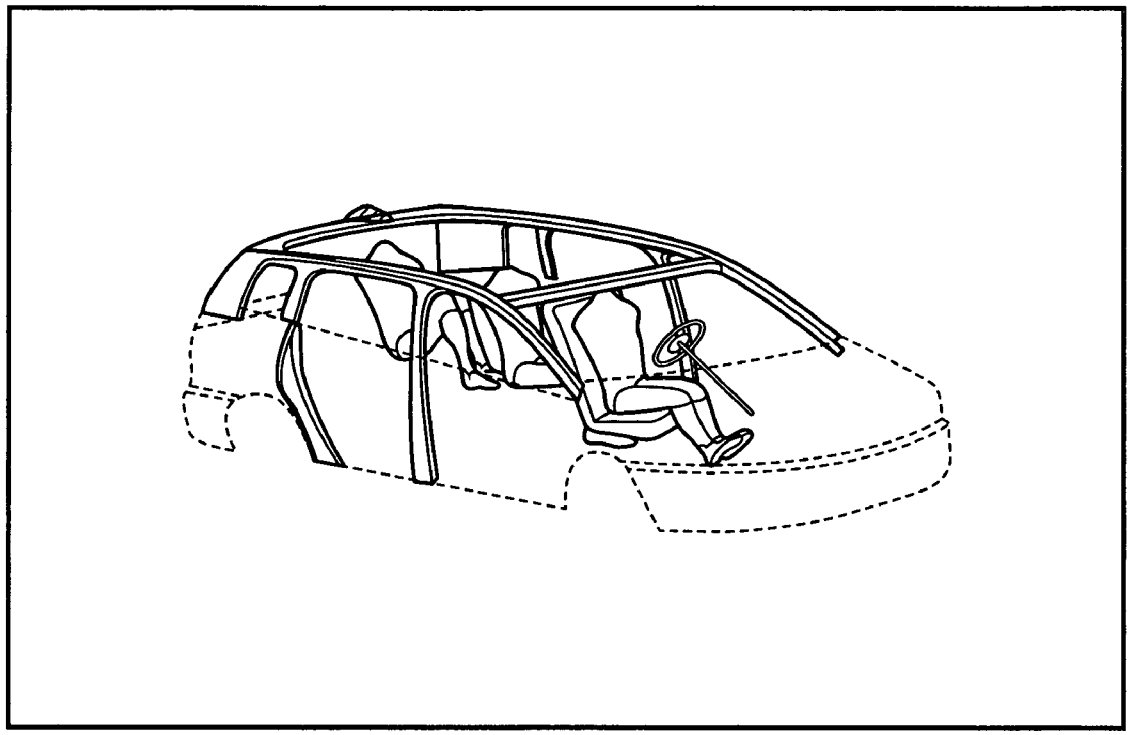
FIG. 34A shows a display screen example that displays an exterior model after its vehicle width has been changed according to the deformation rules from the state shown in FIG. 33A as a front perspective view.
Figure 34B:
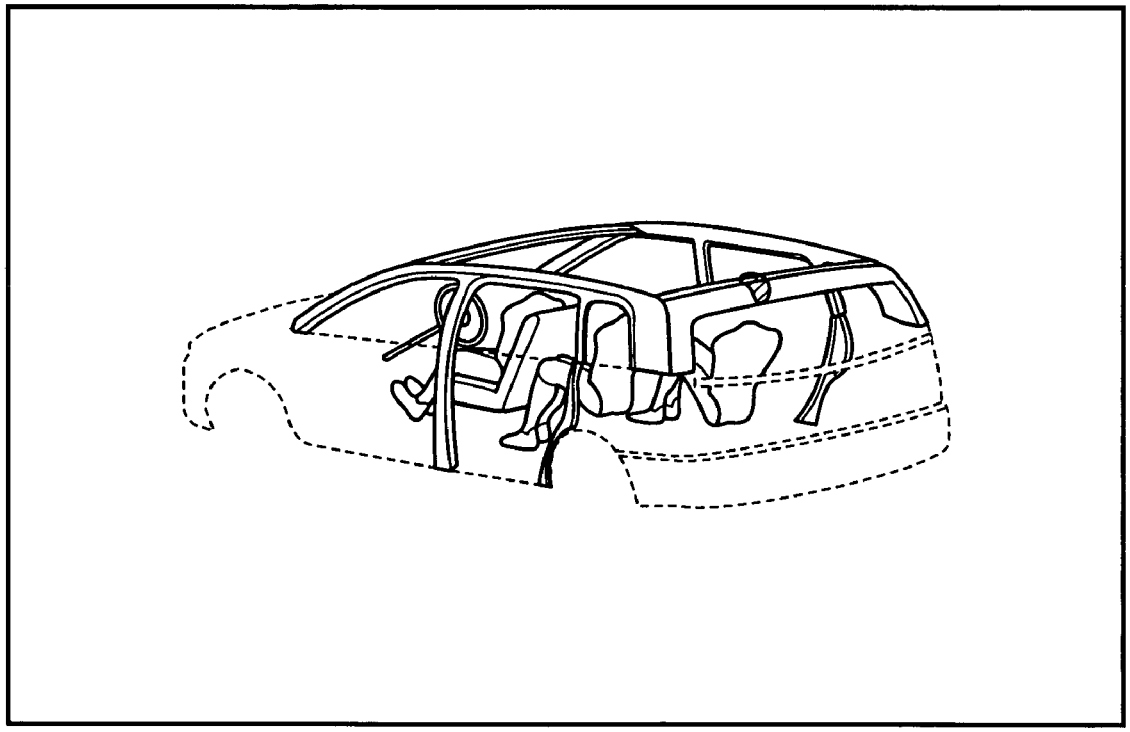
FIG. 34B shows a display screen example that displays an exterior model after its vehicle width has been changed according to the deformation rules from the state shown in FIG. 33B as a rear perspective view.

FIGS. 33A and 33B show display screen examples that display the exterior model before its vehicle width is changed as front and rear perspective views, and FIGS. 34A and 34B show display screen examples that display the exterior model after its vehicle width has been changed according to the deformation rules from the states shown in FIGS. 33A and 33B as front and rear perspective views. From the display screen images shown in FIGS. 33A and 33B, the seat widths from the front to third rows are too short to allow two to three passengers to sit per row, and it is visually easily confirmed that the vehicle width is too small. Therefore, it is easy to determine that a change which increases the parameter of the vehicle width is required, and the states after the vehicle width has been changed can be confirmed from FIGS. 34A and 34B in real time.

FIGS. 35A and 35B show display screen examples that display the exterior model before its total height is changed as front and rear perspective views, and FIGS. 36A and 36B show display screen examples that display the exterior model after its total height has been changed according to the deformation rules from the states shown in FIGS. 35A and 35B as front and rear perspective views. On the display screen images in FIGS. 35A and 35B, the head clearances from the front to third rows are small, and the heads of passengers of these rows protrude from a head clearance line. In this state, since the heads of the passengers are displayed in a different color, or an alert tone is generated to call the operator's attention, it is easily visually confirmed that the total height is too low. Therefore, it is easy to determine that a change which increases the parameter of the total height is required, and the states after the total height has been changed can be confirmed from FIGS. 36A and 36B in real time.

Figure 37:
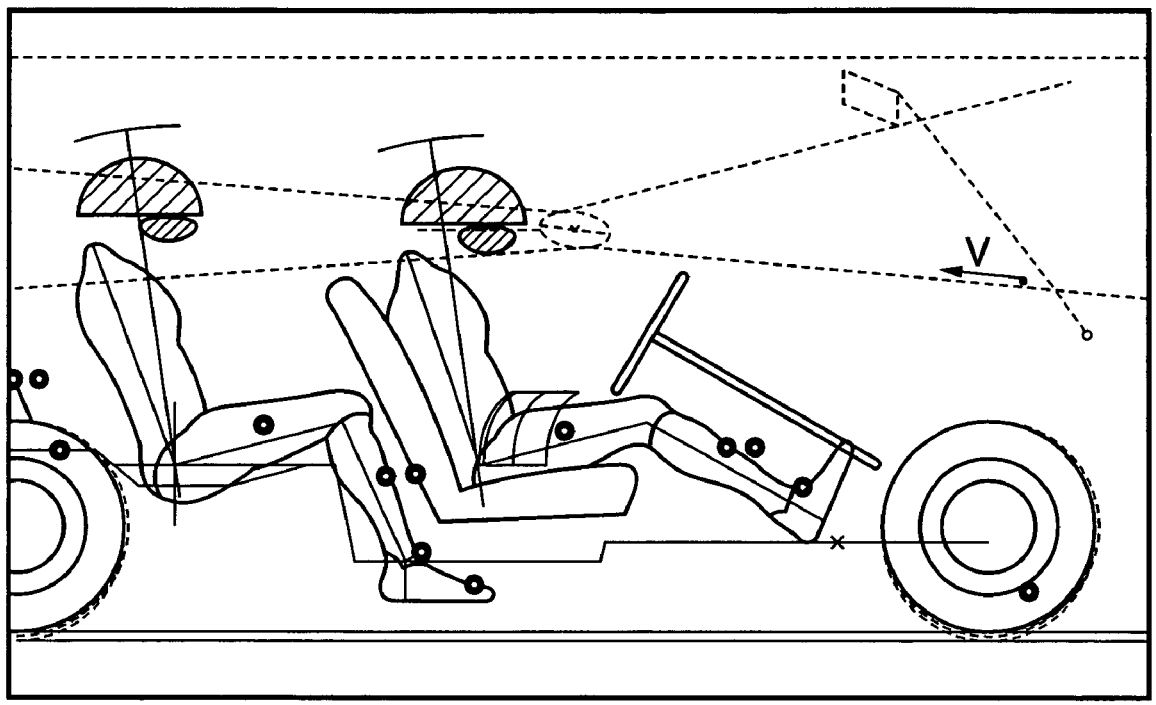
FIG. 37 shows a display screen example that displays an exterior model before a hip point of a passenger in the front seat is changed as a side view.
Figure 38:
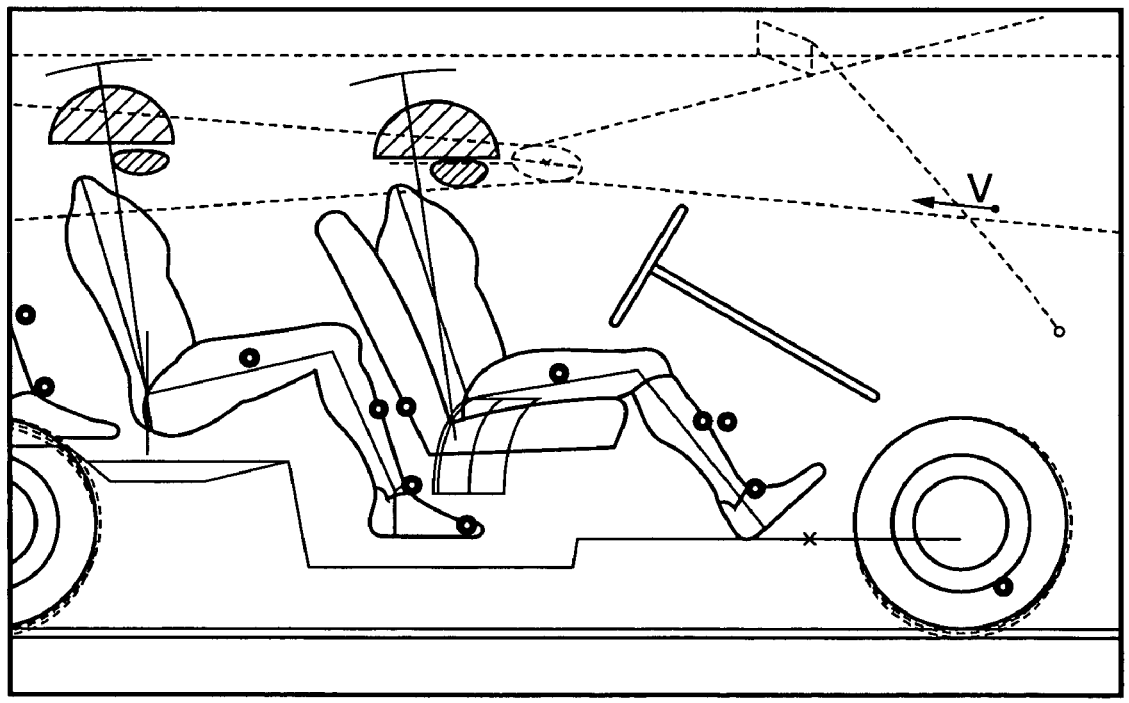
FIG. 38 shows a display screen example that displays an exterior model before the hip point of a passenger in the front seat has been changed from the state in FIG. 37 as a side view.

FIG. 37 shows a display screen example that displays an interior model before a hip point of a passenger in the front seat is changed as a side view, and FIG. 38 shows a display screen example that displays an interior model before the hip point of a passenger in the front seat has been changed according to the deformation rules from the state in FIG. 37 as a side view. On the display screen image in FIG. 37, the leg of the second-row seat passenger protrudes from the floor. In this state, since the passenger's leg is displayed in a different color or an alert tone is generated to call operator's attention, it is visually easily verified that the hip point of the front-row seat passenger is too low. Therefore, it is easy to determine that a change which increases the parameter of the hip point is required, and the state after the hip point has been changed can be confirmed from FIG. 38 in real time.

Figure 39:
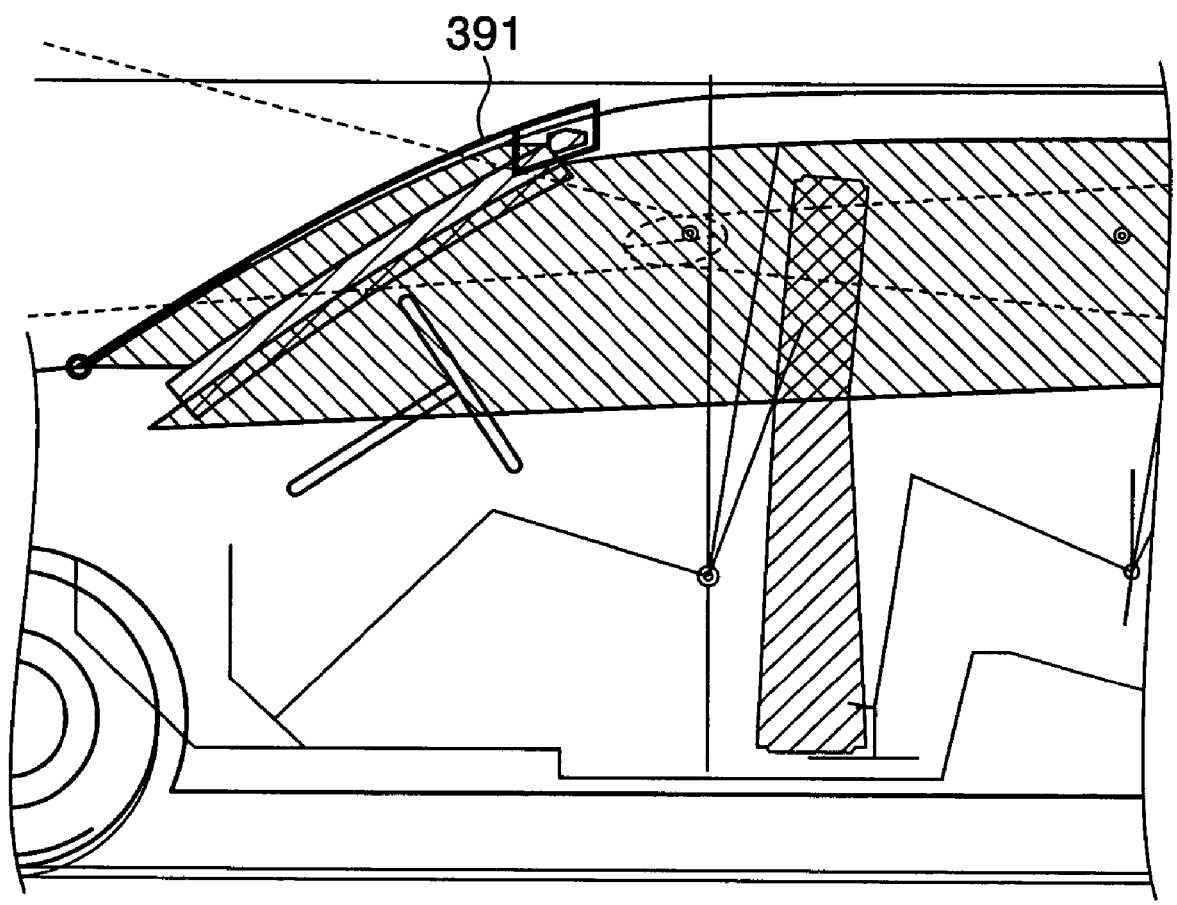
FIG. 39 shows an interference state between a windshield model and exterior model.

FIG. 39 shows a superimposed image of a windshield model 391 included in a reference model, and an exterior model. Using this image, it can be verified whether or not the windshield included in the exterior model disturbs the field of view of the passenger. In this example, if the structure model falls within a nearly parallelogram-shaped frame of the front header, it can be determined that the structure model and exterior model which correspond to the reference model are set, and there is no problem.

On the other hand, if the structure model is located in the rear of the front header frame inside the passenger room, it is determined that there is a problem of oppressive feelings. If the structure model is located below the front header frame, it is determined that the passenger's field of view is disturbed.

According to this embodiment, the conventional system requires 10 persons/day as manpower to create 3D CAD data, and 5 persons/day to finish one plan, while this embodiment requires 20 persons/day as manpower to create models, but only 0.3 persons/day to finish one plan. Although the manpower required to create models increases, 3D CAD data need not be created from scratch for each plan unlike in the conventional system. Hence, once models are created, the need for creating models can be obviated, and very high work efficiency can be achieved.

The determination process of specification values of a new model vehicle, evaluation of packaging feasibility, and the like can be speeded up. Also, if a 3D image model is displayed as a moving image, visibility from the passenger room and the like can also be evaluated.

Since a vehicle model is divided into a reference model, exterior model, and structure model, and an image process for superimposing these models is done, the passenger sitting posture, exterior (packaging, visibility, outer appearance), structure (rigidity), and the like of a new model vehicle can be individually verified without complicating the programs required to implement this simulation, thus improving the work efficiency. In other words, since references can be examined without being obsessed by the influences of the exterior and structure, no compromises need be made in the middle of planning before the total picture is seen, and an ideal planning process can be implemented.

According to the present invention, an exterior parameter group associated with the exterior of a vehicle is read out, and exterior parameters included in the readout exterior parameter group are changed, thus building an exterior model of the vehicle. Also, a passenger parameter group associated with the sitting states of passengers in the vehicle are read out, and passenger parameters included in the readout passenger parameter group are adjusted to build an interior model. These exterior model and interior model can be superimposed.

Therefore, when the exterior of the vehicle is to be reconsidered upon thinking a plan again, the exterior parameters need only be changed. On the other hand, when the interior of the vehicle is to be reconsidered, the passenger parameters need only be changed. Hence, the works can be made more efficient than the conventional system.

That is, in the conventional system, the exterior shape is determined on a 2D drawing so as not to disturb the driver's field of view, and not to give any oppressive feelings to passengers. However, since the present invention can build the exterior model independently of the interior model, and can adjust the interior model, the exterior can be effectively set in free ideas without being restrained by the interior.

For example, even when the vehicle exterior may disturb the driver's field of view or give oppressive feelings to passengers, these problems can be avoided by adjusting the seat angles, interior colors, and the like without changing the exterior model. Furthermore, the vehicle may be designed to make passenger admit some oppressive feeling and cramminess. That is, interference between persons and objects poses a problem, and in the present invention, planning and verification can be made in an idea completely different from a case wherein the interference between persons and objects is avoided.

Furthermore, since the exterior model built in the exterior model building process and the interior model built in the interior model building process can be superimposed, packaging feasibility (e.g., whether or not passengers can fall within the interior) can be verified quickly.

Since a structure parameter group associated with the framework structure of the vehicle is read out, and structure parameters included in the readout structure parameter group are adjusted to set a structure model, the framework structure of the vehicle can be easily set. In addition, since the set structure model is superimposed on the exterior model and interior model, the influence of the framework structure of the vehicle on passengers, and the mechanical strength of the vehicle can be verified in the planning process.

Since the exterior parameters are changed on the basis of vehicle specification values associated with the exterior dimensions of the vehicle, a rough shape of the exterior model can be defined on the basis of the specification values. Since the set interior model is not influenced by the vehicle specification values, the independence of the exterior model and interior model can be guaranteed. Hence, the interior and outer appearance of the vehicle can be independently designed in free ideas.

Since the structure model deforms linked with the exterior model, the structure model and exterior model can be superimposed without any deviation, and the influence of the framework structure of the vehicle on passengers, and the mechanical strength of the vehicle can be adequately verified.

When the exterior model is transparently displayed, the layout of the interior model in the exterior model and a vehicle space to be formed in a vehicle exterior can be easily visually confirmed. Furthermore, since whether or not the exterior model and interior model interfere with each other can be identifiably displayed, the packaging state can be easily perceived. Then, high-quality planning can be achieved while removing the interference problem by changing or adjusting the parameters of the exterior model and interior model or recognizing and accepting the interference problem.

When a vehicle shape as a combination of the exterior model and structure model is transparently displayed, a vehicle space to be formed in a vehicle exterior and framework can be easily visually confirmed. Also, since display is made to easily identify whether or not the vehicle shape and the interior model interfere with each other, the packaging state can be easily perceived. Then, high-quality planning can be achieved while removing the interference problem by changing or adjusting the parameters of the exterior model, structure model, and interior model or recognizing and accepting the interference problem.

Furthermore, since the interior is expressed using human type models and seat models, the vehicle interior state can be displayed very plainly. For example, the difference in interior depending on difference in vehicle type (e.g., minivan type, sports type, or the like) can be clearly expressed.

Since the number of seats is input as a passenger parameter, and the interior model is built by combining human type models and seat models corresponding to the number of seats, interiors for various vehicle types (seven-seater, five-seater, two-seater, and the like) can be easily and plainly displayed using the human type models and seat models.

Since the sitting positions of passengers can be input for respective seats as passenger parameters, a vehicle with a novel seat arrangement can be planned. For example, a vehicle which has two seats in the front row, two seats in the second row, and three seats in the third row like a minivan, or a vehicle which has two seats in the front row and three seats in the second row like a general sedan can be easily planned.

Since the sitting posture of each passenger can be input as the passenger parameter, the driver's sitting posture can be planned independently of the exterior, and the interference state with the exterior model can then be verified.

Since the eye point information and visibility assurance reference range information that indicates a reference range to be assured as the visibility from that eye point are appended to the human type model at the vehicle driving position, when the interior model and exterior model are superimposed, the user can easily verify whether or not the exterior disturbs the driver's field of view in that vehicle to be planned. In this way, the work efficiency can be improved, and any drastic revisions after planning can be avoided.

Since the interior model has position information of a predetermined portion of the vehicle, which is specified by the reference range, whether or not the exterior disturbs the driver's field of view can be easily verified by visually confirming the positional relationship between that predetermined portion and exterior upon superimposing the interior model and exterior model.

Since the interior model has position information of a predetermined portion of the vehicle associated with oppressive feeling of passengers, and that position information is specified by the human type models, the exterior conditions that allow passengers to sit without any oppressive feeling can be recognized by inputting only the passenger parameters associated with the sitting states of passengers in the vehicle. Then, whether or not the exterior gives oppressive feeling to passengers can be easily verified by visually confirming the positional relationship between the predetermined portion and exterior upon superimposing the interior model and exterior model.

Since a vehicle portion as a reference for visibility and that as a reference for oppressive feelings include at least one of the front header, rear header, pillars, and windshield lower end portion, assurance of the driver's field of view and the presence/absence of oppressive feeling can be precisely verified.

Furthermore, the vehicle framework can be planned parallel to the exterior and interior, and the influences of the framework on passengers (e.g., influences on oppressive feelings and visibility) can be easily verified by superimposing display.

Since the structure parameters include information associated with the mechanical strength of the vehicle framework, the crash performance, vibration evaluation, and the like of the vehicle can be easily verified. In this manner, the quality of the vehicle to be planned can be improved very much.

Since the structure parameters include information associated with the weight of the vehicle framework, the weight balance, barycentric position, and the like of the vehicle can be easily verified. In this manner, the quality of the vehicle to be planned can be improved very much.

Since the structure parameters include information associated with the material of the vehicle framework, the mechanical strength, weight, productivity (cost), and the like can be easily verified. In this manner, the quality of the vehicle to be planned can be improved very much.

Since the structure parameters include information associated with the thickness of a steel plate used in the vehicle framework, the mechanical strength, weight, productivity (cost), and the like can be easily verified. In this manner, the quality of the vehicle to be planned can be improved very much.

Since the framework includes at least one of a front pillar, center pillar, rear pillar, side roof rail, front header, and rear header, the vehicle framework can be specifically planned, and the influences of the framework on passengers ((e.g., influences on oppressive feelings and visibility) can be verified in detail.

Since the structure model building process builds the structure model by selectively reading out one of a plurality of structure parameter groups which are prepared in correspondence with vehicle types, the user can narrow down structure parameter groups by selecting the vehicle type, thus improving the planning efficiency.

Since the shape of the framework which forms the structure model changes in correspondence with the exterior model, the structure model and exterior model can be superimposed without any deviations, and the interference problem between these models and the interior model can be precisely verified.

As many apparently widely different embodiments of the present invention can be made without departing from the spirit and scope thereof, it is to be understood that the invention is not limited to the specific embodiments thereof except as defined in the appended claims.

What is claimed is:

1. A planning support apparatus for supporting planning of a vehicle, comprising:
   exterior model building means for building an exterior model that expresses an outer appearance of the vehicle by reading out an exterior parameter group associated with an exterior shape of a vehicle, and changing exterior parameters included in the readout exterior parameter group;
   interior model building means for building an interior model that expresses interior comfort of passengers by inputting passenger parameters associated with sifting states of the passengers in the vehicle; and
   display means for superimposing the exterior model built by said exterior model building means, and the interior model built by said interior model building means.

2. The apparatus according to claim 1, wherein said interior model building means builds the interior model by reading out and deforming human type models that express the passengers and seat models that express seats in accordance with the passenger parameters.

3. The apparatus according to claim 1, further comprising:
   structure model building means for reading out a structure parameter group associated with a structure of a framework of the vehicle, and building a structure model by adjusting structure parameters included in the readout structure parameter group, and
   wherein said display means superimposes the exterior model built by said exterior model building means, the interior model built by said interior model building means, and the structure model built by said structure model building means.

4. A planning support system for supporting planning of a vehicle, comprising:
   a database for storing a plurality of exterior parameter groups associated with exterior shapes of a vehicle;
   selection means for selecting one of the exterior parameter groups from said database;
   exterior model building means for building an exterior model that expresses an outer appearance of the vehicle by changing exterior parameters included in the selected exterior parameter group;
   input means for inputting passenger parameters associated with sitting states of passengers in the vehicle;
   interior model building means for building an interior model that expresses interior comfort of the passengers on the basis of the input passenger parameters; and
   display means for superimposing the exterior model built by said exterior model building means, and the interior model built by said interior model building means.

5. The system according to claim 4, wherein said interior model building means builds the interior model by reading out and deforming human type models that express the passengers and seat models that express seats in accordance with the passenger parameters.

6. The system according to claim 4, wherein said database further stores a plurality of structure parameter groups associated with structures of frameworks of the vehicle said planning support system further comprises: selection means for selecting one of the structure parameter groups from said database; and structure model building means for building a structure model by adjusting structure parameters included in the selected structure parameter group, and said display means superimposes the exterior model built by said exterior model building means, the interior model built by said interior model building means, and the structure model built by said structure model building means.

* * * * *

UNITED STATES PATENT AND TRADEMARK OFFICE
CERTIFICATE OF CORRECTION

PATENT NO. : 7,295,959 B2  Page 1 of 1
APPLICATION NO. : 10/608080
DATED : November 13, 2007
INVENTOR(S) : Kohji Noma et al.

It is certified that error appears in the above-identified patent and that said Letters Patent is hereby corrected as shown below:

Title page, Column 1 (Inventors), Line 7, after "Hiroshima" insert ---ken--.

Title page, Column 2 (Foreign Patent Documents), Line 7, change "5/1999" to --5/1989--.

Column 31, Line 57, change "sifting" to --sitting--.

Column 32, Line 47, after "vehicle" insert --,--.

Signed and Sealed this

Fifteenth Day of April, 2008

JON W. DUDAS
*Director of the United States Patent and Trademark Office*